United States Patent [19]
Sato

[11] Patent Number: 5,930,051
[45] Date of Patent: Jul. 27, 1999

[54] ZOOM LENS SYSTEM FOR INNER FOCUSING

[75] Inventor: Haruo Sato, Kawaguchi, Japan

[73] Assignee: Nikon Corporation, Tokyo, Japan

[21] Appl. No.: 08/958,674

[22] Filed: Oct. 27, 1997

[30] Foreign Application Priority Data

Oct. 25, 1996 [JP] Japan ..................................... 8-301087
Oct. 25, 1996 [JP] Japan ..................................... 8-301088
Jan. 14, 1997 [JP] Japan ..................................... 9-015988

[51] Int. Cl.$^6$ .................................................. G02B 15/14
[52] U.S. Cl. ........................................... 359/690; 359/689
[58] Field of Search ..................................... 359/687, 688, 359/689, 690, 691, 692

[56] References Cited

U.S. PATENT DOCUMENTS 5,543,970   8/1996   Hata ......................................... 359/690

Primary Examiner—Georgia Epps
Assistant Examiner—Michael A Lucas
Attorney, Agent, or Firm—Michael N. Meller

[57] ABSTRACT

A large high zoom ratio lens system having a large field angle with a zoom ratio of over 3.5 and an F number of about 2.8 to about 3.5 which includes at least a first lens group G1 having a positive refractive power and a second lens group G2 having a negative refractive power. The second lens group G2 includes a negative lens component L2A having at least one aspherical surface, a positive composite lens component L2B, and a negative lens component L2C having a concave surface facing toward the object end wherein the positive cemented lens component L2B is preferably formed of a positive lens having a convex surface facing toward the object end and a negative lens.

69 Claims, 33 Drawing Sheets

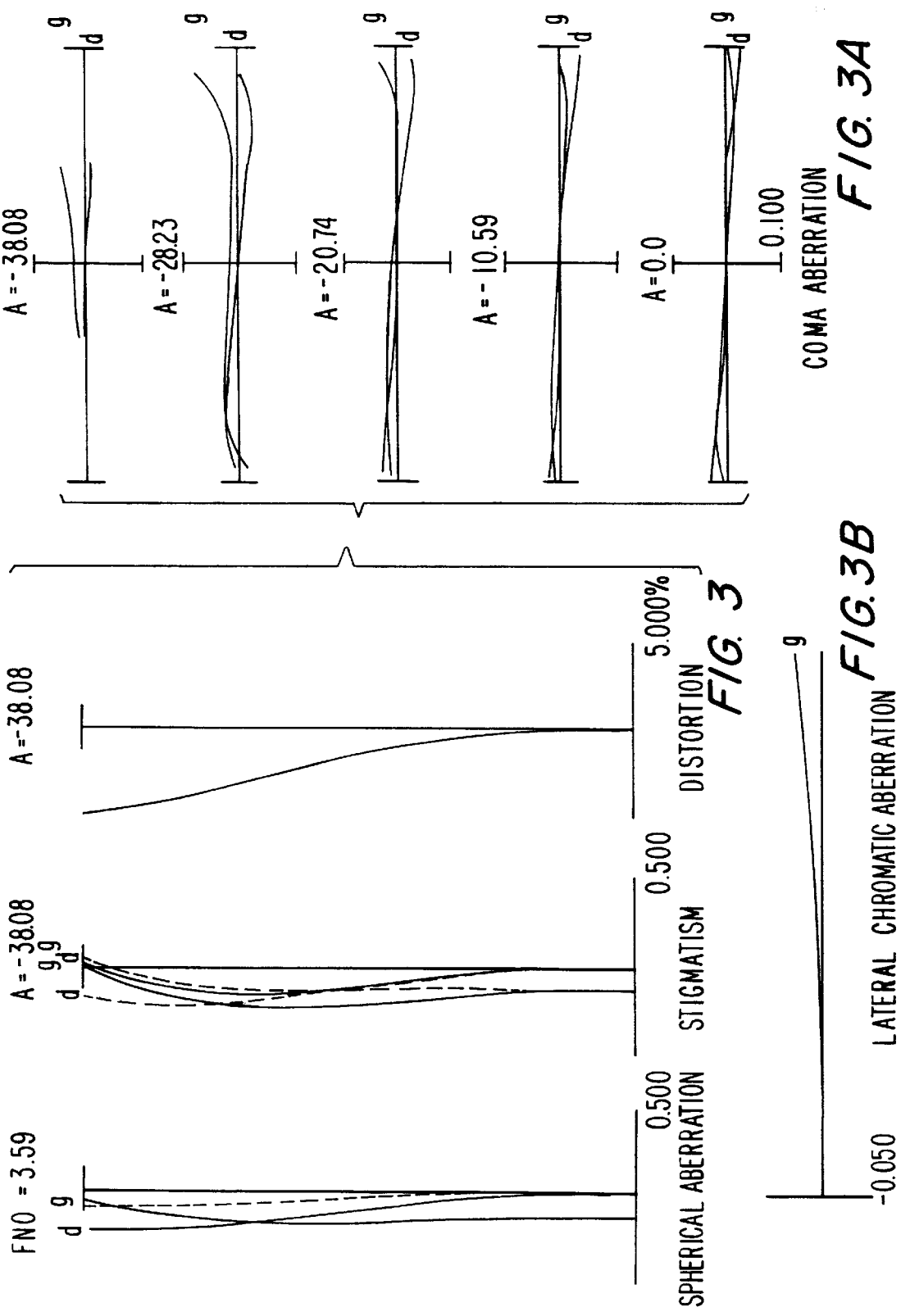

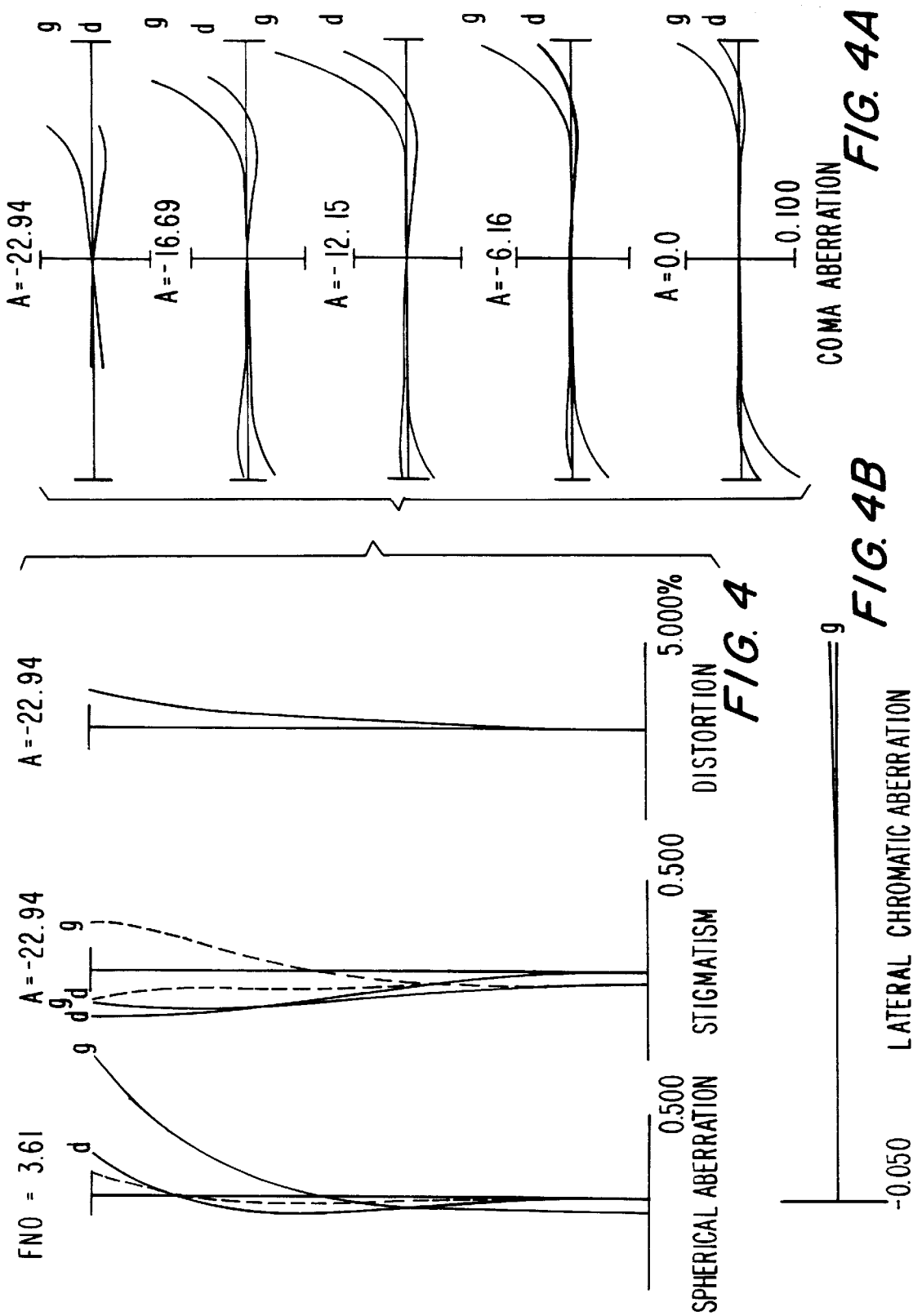

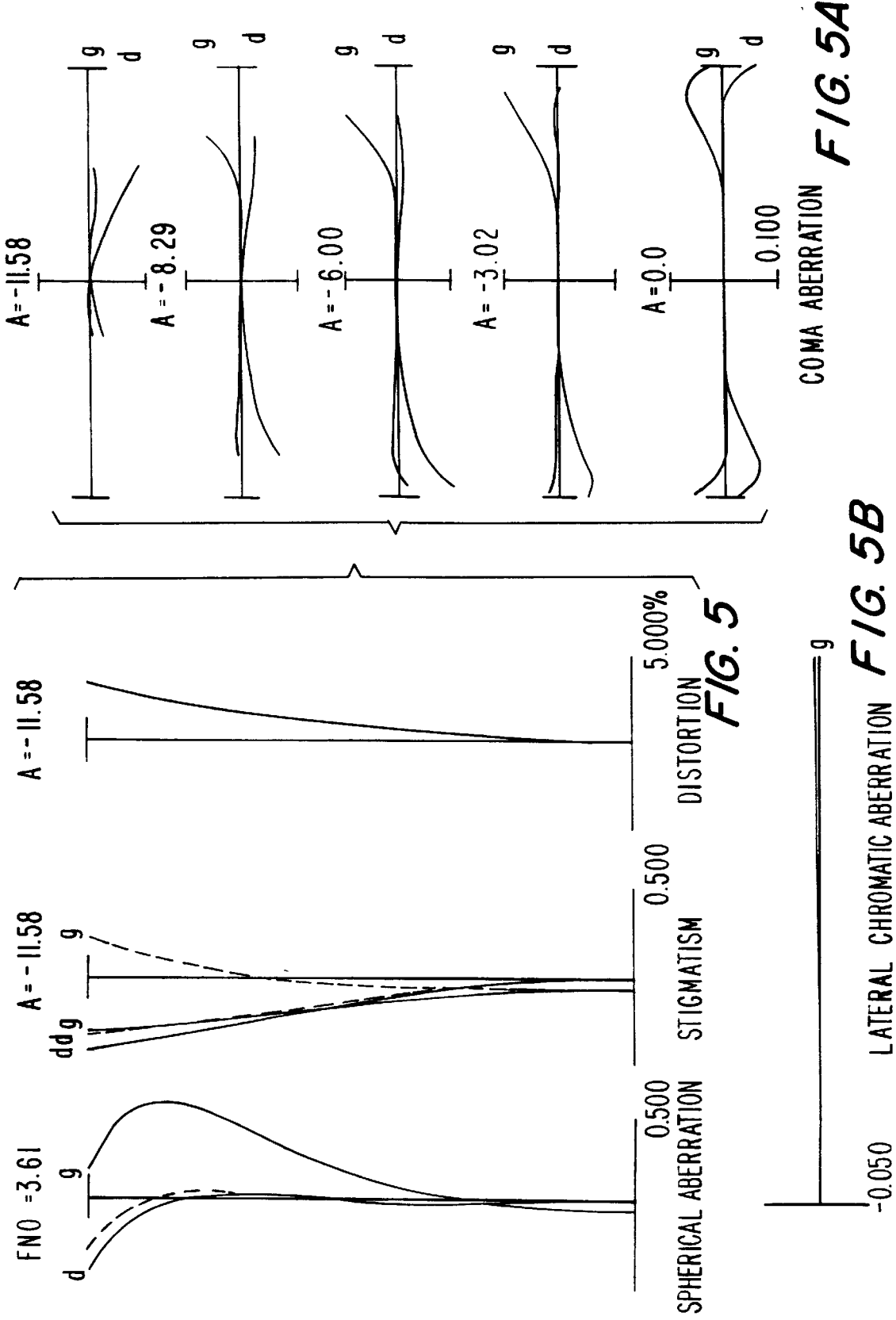

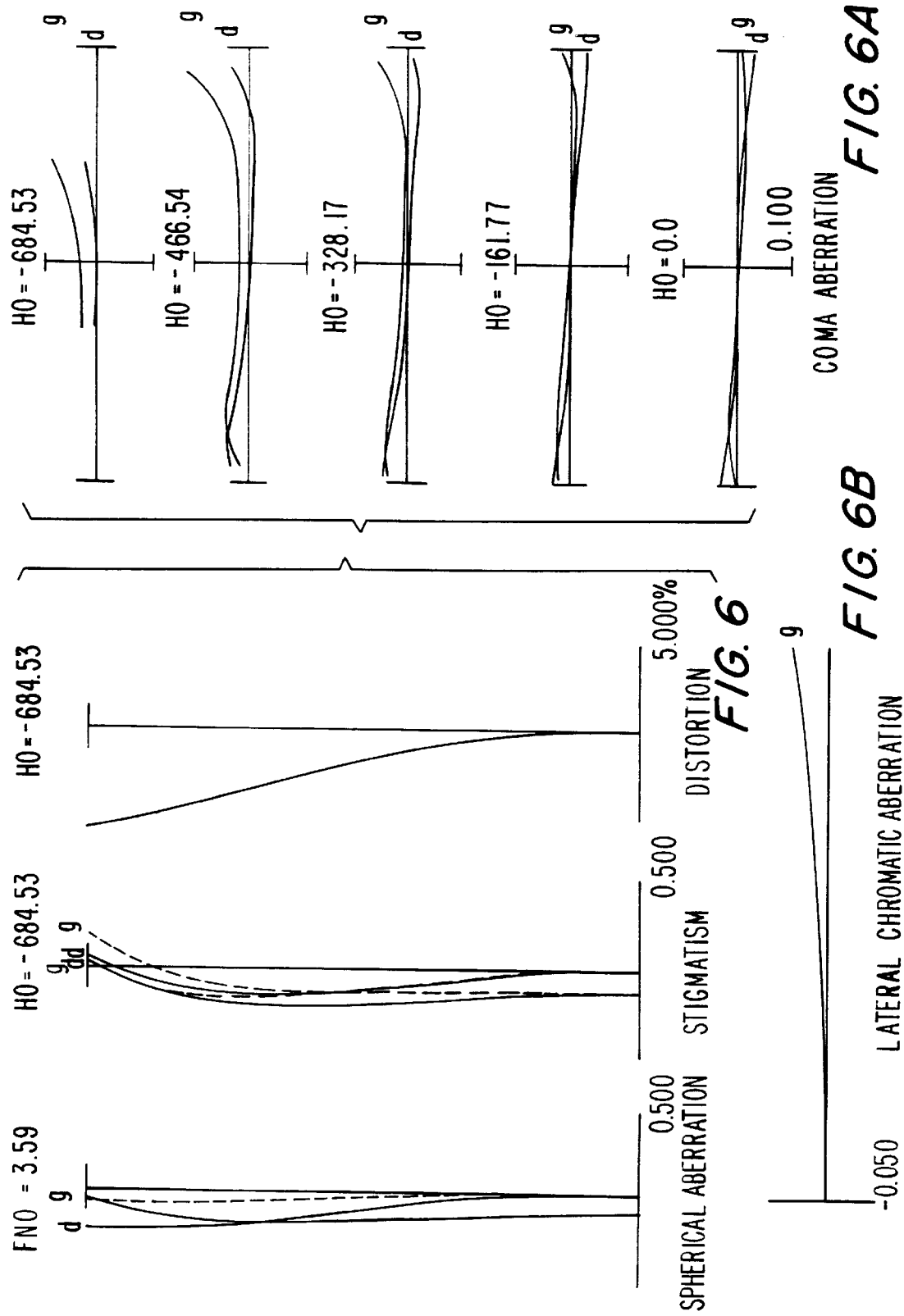

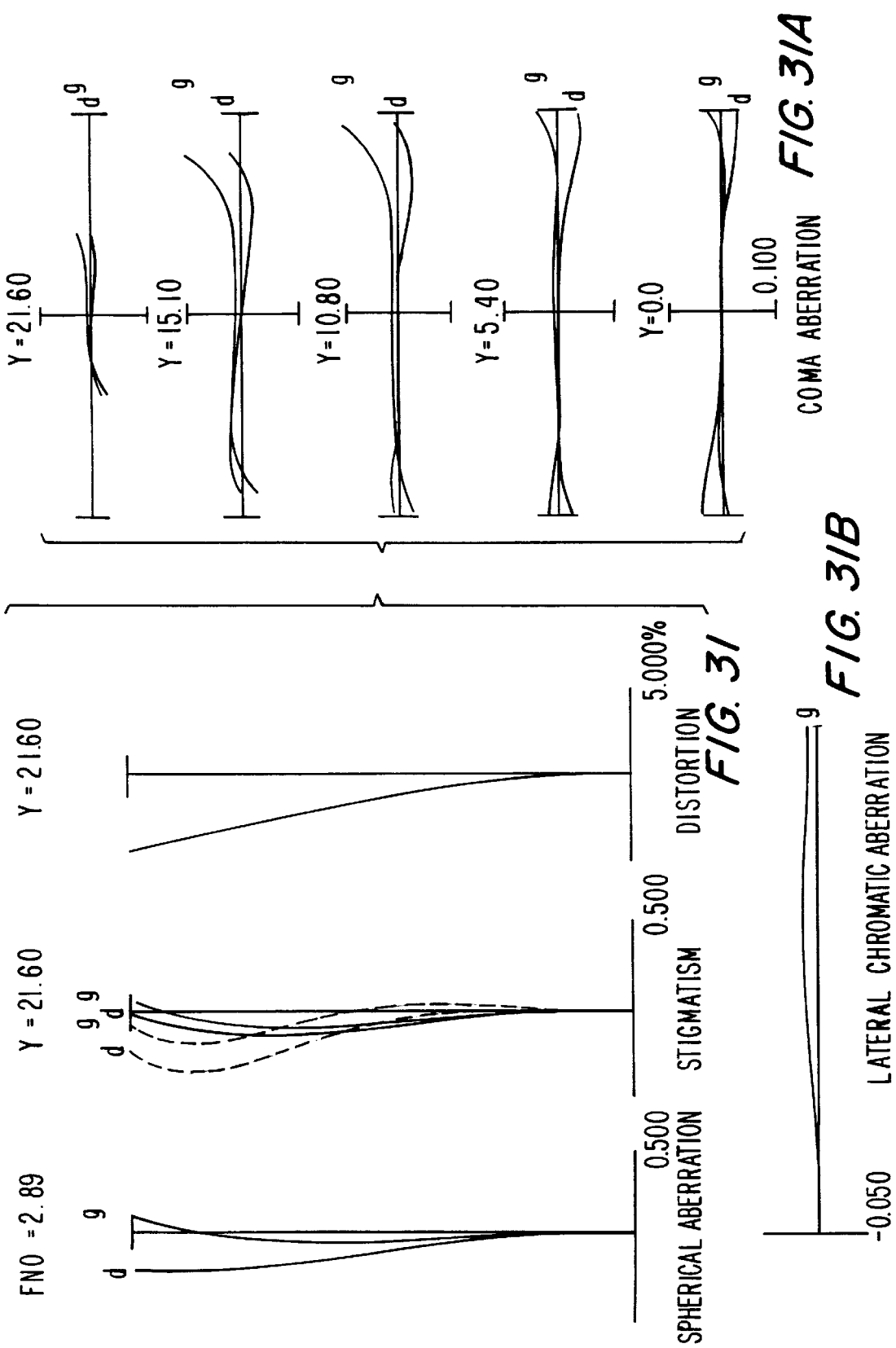

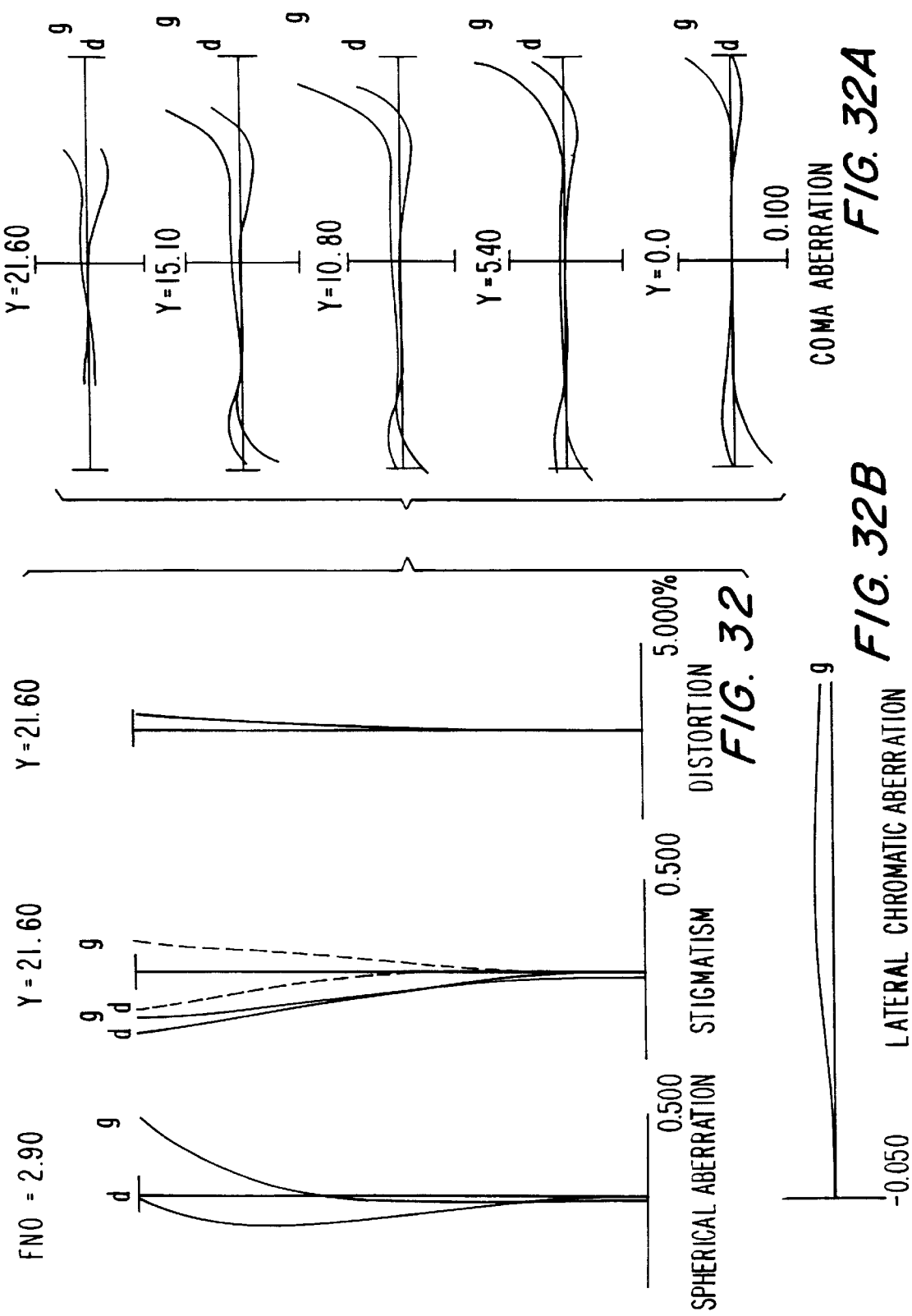

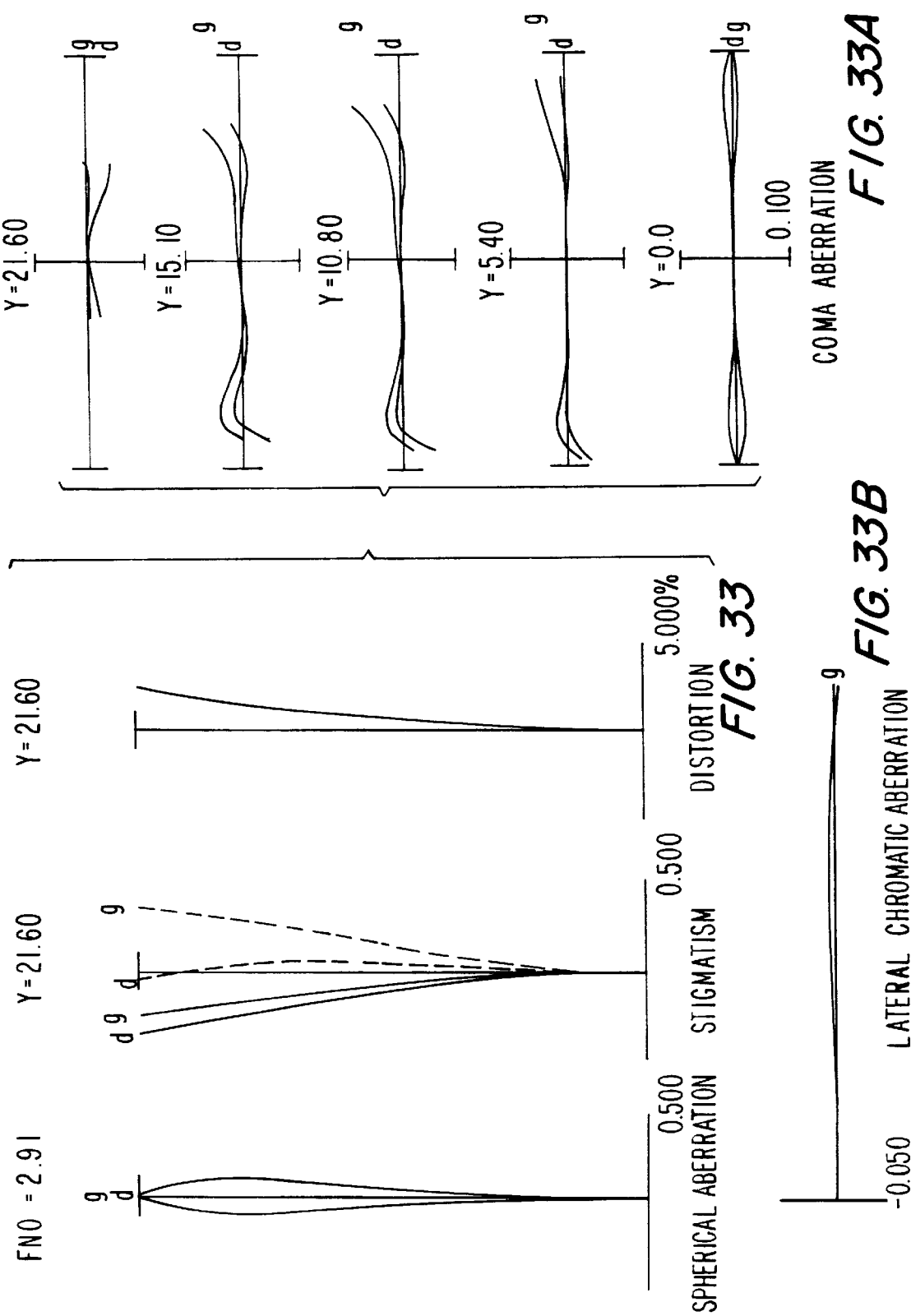

ZOOM LENS SYSTEM FOR INNER FOCUSING

BACKGROUND OF THE INVENTION

The present invention relates to a zoom lens having a large aperature or high zoom ratio with an inner focusing function. It especially relates to a zoom lens system having a relatively large lens i.e., having a large aperature and a relatively large field angle of at least 62° and preferably over 75°.

Conventionally, most zoom lens systems which have been proposed are standard zoom lenses which comprise: in order from the object end,
 a positive lens group;
 a negative lens group; and
 a positive lens group.

More specifically, Japanese laid open patents S58-30709 and S58-179810 disclose a compact zoom lens system having a zoom ratio of about 3× and a maximum field angle 2ω of 62°.

In the related arts, a large aperature high zoom ratio lens system is proposed in the Japanese laid open patents H4-208911 and H4-208912. The high zoom ratio lens system disclosed in these patents has a maximum field angle 2ω of 62°, a zoom ratio of about 2×, and the F number for the overall zoom range area is 2.8, which is large for a standard zoom lens system. In these high zoom ratio lens systems, focusing is performed by moving the second lens group and the third lens group.

Also, Japanese laid open patent S63-294,506 discloses a compact zoom lens system having a zoom ratio of about 3× and a maximum field angle 2ω of 76°. Further, Japanese laid open H4-317,020 discloses a zoom lens system having an aspherical surface introduced to most of the lens surfaces which construct the second lens group.

The zoom lens disclosed in Japanese laid open patents S58-30709 and S58-17981 has an F number of 3.5, which is a relatively large aperature (relatively high speed). However, the zoom ratio is about 3× and the maximum field angle is only about 62°. In terms of aberrations, the zoom lens does not correct spherical aberration. With the zoom lens, astigmatism fluctuates during zoom ratio. Coma aberration fluctuates as well. This, in turn, can be interpreted to mean that it is difficult to make a large aperature high zoom ratio lens having a field angle of over 75° with a high zoom ratio and which is preferably able to correct for spherical aberrations. Note that focusing technique is not described in detail in these laid open patents.

With the large aperature zoom lens disclosed in Japanese laid open patents H4-208911 and H4-208912, aberrations are corrected efficiently. The F number is 2.8, which is high speed for a standard zoom lens system. However, the zoom ratio is about 3× and the maximum field angle 2ω is only 62°.

As described above, the zoom lenses of conventional technology are not perfect and a higher zoom ratio and wider field angle is demanded in the current technology. For the focusing technique, a technique which provides a constant aberration and focusing with a simple mechanism, is desired.

The zoom lens system disclosed in Japanese laid open patent S63-294506 has an F number of 3.5 to 4.5, which is a small aperature. Coma aberration fluctuates as well. Therefore, with this optical system configuration, it is very difficult to obtain a large aperature and wide-angle zoom lens system which can provide an F number of over 2.8 throughout the zoom range.

The zoom lens system disclosed in Japanese laid open patent H4-317020 has an aspherical surface. However, the aspherical surface is introduced to reduce the size and cost of the lens system. In view of allowing increased aperature size and wide-angle for a high zoom ratio lens system, the way the aspherical surface is used and the way aberrations are corrected are fundamentally different from the present invention. As a result, the zoom lens system has an F number of 4 to 5.8, which is a small aperature. In terms of aberration correction, spherical aberration and stigmatism still fluctuate during zooming. Therefore, with this optical system configuration, it is very difficult to obtain a large aperature and wide-angle zoom lens system which can provide an F number of over 2.8 throughout the zoom range.

In the large aperature zoom lens system disclosed in Japanese laid open patents H4-208911 and H4-208912, aberrations are corrected very well. The F number is 2.8, which is high speed but the maximum field angle is about 62°, which is small. As a result, a larger field angle has been desired for the zoom lens system of conventional technology.

The present invention intends to resolve the above problem. It intends to provide a high zoom ratio large aperature zoom lens system with a large field angle, a zoom ratio of over 2.6×, and an F number of about 2.8.

The present invention also intends to provide a high zoom ratio lens system with a large aperature (e.g. F number: 2.8 to 3.5) which can provide a zoom ratio of over 3.5×.

SUMMARY OF THE INVENTION

The present invention is a zoom lens system facing an object end and an image end comprising, in order from said object end:
 a) a first lens group having a positive refractive power; and
 b) a second lens group having a negative refractive power; wherein the second lens group comprises, in order from the object end,
  i) a negative lens component having at least one aspherical surface;
  ii) a composite positive lens component; and
  iii) a negative lens component having at least a concave surface facing the object end.

Each aspherical surface of the zoom lens system of the present invention is defined by the following equation:

$$S(y)=(y^2/R)/\{1+(1-K\cdot y^2/R^2)^{1/2}\}+C_2\cdot y^2+C_4\cdot y^4+C_6\cdot y^6+C_8\cdot y^8+C_{10}\cdot y^{10}$$

where
 y: is a height in a direction perpendicular to an optical axis;
 S (y): is a displacement amount along the optical axial direction at the height y (a sag amount: a distance along the optical axis between tangent planes at peaks of each aspherical surface);
 R: is a paraxial radius of curvature;
 K: is a conic constant; and
 $C_n$: is a n-order aspherical surface constant.

It is to be noted that the conic constant K in the above equation represents a generic conic constant selected from the group of conic constants $K_a$, $K_c$ and K corresponding to the lens component in the lens group G2 and the lens group G3 or G4 respectively for all of the embodiments of the present invention.

BRIEF DESCRIPTION OF THE DRAWINGS

FIG. 3 is a diagram showing various aberrations of the zoom lens of Embodiment 1 measured at the wide-angle end in the infinitely far objective length state.

FIG. 4 is a diagram showing various aberrations of the zoom lens of Embodiment 1 measured at the infinitely far objective distance in the mid focal length state.

FIG. 5 is a diagram showing various aberrations of the zoom lens of Embodiment 1 measured at the telephoto end in the infinitely far objective distance state.

FIG. 6 is a diagram showing various aberrations of the zoom lens of Embodiment 1 at the wide-angle end at 1/30×.

FIG. 31 is a diagram showing various aberrations of the zoom lens system of Embodiment 6 measured at the wide-angle end in the infinitely far objective length state.

FIG. 32 is a diagram showing various aberrations of the zoom lens system of Embodiment 6 measured at the infinitely far objective distance in the mid focal length state.

FIG. 33 is a diagram showing various aberrations of the zoom lens system of Embodiment 6 at the telephoto end in the infinitely far objective distance state.

BRIEF DESCRIPTION OF THE PREFERRED EMBODIMENTS

Figure 1:
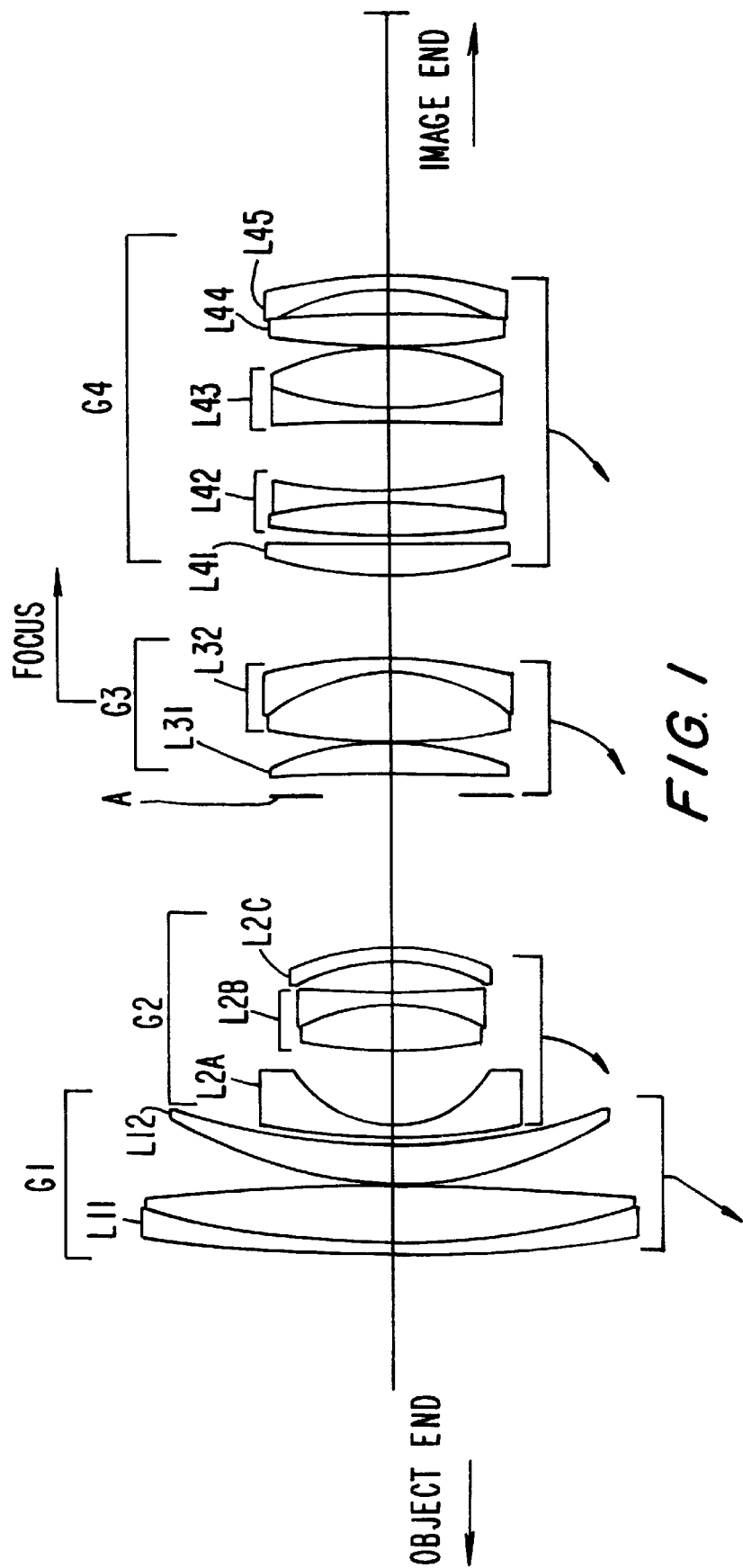
FIG. 1 is a diagram showing a lens layout of the zoom lens of Embodiment 1 of the present invention.

Basic to each embodiment of the present invention is a first lens group G1 having a positive refractive power and a second lens group G2 having a negative refractive power. The second lens group G2 basically comprises three lens components with at least one lens component having an aspherical surface.

The three lens components of the second lens group G2, in order from the object end, comprises:

a negative lens component;

a positive lens component; and a negative lens component.

In the second lens group, G2, refractive powers are arranged relatively symmetrical. The positive lens component L2B lies in the middle of the three lens components having overall positive refractive powers and is a positive cemented lens formed from a positive lens having a convex surface facing toward the object end and a negative lens. The positive cemented lens component L2B is spaced apart from the negative lens component L2A of the second lens group G2 by a large spatial distance. Because of this large lens separation, the principal ray has a large field angle near the wide-angle end and can be pushed up in the optical axial direction. A compact spatial filter size can be used in this configuration. Also, by maintaining an appropriate lens separation, the dead space (variable air space) between the first lens group G1 and the second lens group G2 can be adjusted to help miniaturize a high zoom ratio lens.

However, if one tries to obtain the same effect as the present invention with a zoom lens of conventional technology, using a negative/negative/negative; negative/negative/positive; or negative/negative/positive/negative construction of refractive powers (convexity comes first), the thickness on the axis of the second lens group must be increased to accomodate so many lenses. Also, the dead air space occupied by the lenses behind the second lens group must be decreased. As a result, the overall size of the zoom lens is increased due to the increased thickness of the lens group. The size of the spatial filter increases also due to the little dead space left, which is the case for the first lens group G1 and the second lens group G2.

The middle positive lens component of the second lens group G2 should preferably be constructed with a positive cemented lens component L2B formed by bonding a positive lens having a convex surface facing toward the object end to a negative lens. The negative lens component L2A has a concave surface of strong curvature at the image end thereof and has a relatively strong refractive power. The convex surface at the object end of the positive cemented lens component L2A will effectively correct downward coma aberration basically at the wide-angle end. In order to further enforce the effect, the negative lens component L2A should have a concave surface with a strong curvature facing toward the image end and an appropriate refractive power.

By providing the middle positive lens component L2B with a positive lens having a convex surface facing toward the object end, the downward coma aberration at the wide-angle end and spherical aberration and downward coma aberration at the telephoto end will be effectively corrected due to both the relatively stronger refractive power of the negative lens component L2A facing toward the object end and the convex surface of the middle positive lens component L2B facing the object end. For advanced correction of aberration, the negative lens component L2A at the object end must have an appropriate refractive power.

The aspherical surface formed on the negative lens group L2A effectively corrects distortion at the wide-angle end and corrects the downward coma aberration throughout the zoom range. In addition, the negative lens group L2A should have a convex surface facing toward the object end. If the negative lens group L2A has a concave surface facing toward the object end, basically astigmatism at the wide-angle end and the lower level coma aberration will increase. Under this condition, the zoom lens system cannot have a large field angle.

It is also desirable for the negative lens component L2C to have an aspherical surface at the image end. In a large aperature wide-angle zoom lens system to which this invention applies with the zoom lens having an F number of 2.8 to 3.5 throughout the zooming range, the second lens group corrects aberrations by allocating its lenses as follows:

the lens component L2A, which is at the object end in the second lens group G2, corrects the off axial aberrations basically at the wide-angle end; and the lens component L2C, which is at the image end in the second lens group G2, corrects the off axial aberration, particularly the lower level coma aberration at the wide angle end. Simultaneously, it needs to correct spherical aberration and the off axial aberration, particularly, the lower level coma aberration at the telephoto end.

EMBODIMENT 1

FIG. 1 is a diagram showing a lens layout of the zoom lens of Embodiment 1 of the present invention.

The lens layout of FIG. 1 is shown at the wide-angle end. When magnified toward the telephoto end, all lens groups move toward the object end such that the spatial distance between the first lens group G1 and the second lens group G2 increases while that between the second lens group G2 and the third lens group G3 decreases. The third lens group G3 is an optional lens group which is preferred particularly for correction of aberration fluctuation due to change in objective distance from far to near which will minimize the image curvature and stigmatism. In addition, when changing the focus from an object at an infinitely far distance to one at a near distance, the third lens group G3 and an aperture stop A move integrally toward the image end along the optical axis.

In the zoom lens as shown in FIG. 1, the first lens group G1 comprises, in order from the object end, a positive cemented lens L11 made up of a negative meniscus lens having a convex surface facing toward the object end and a bi-convex lens and, a positive meniscus lens L12 having a convex surface facing toward the object end.

The second lens group G2 comprises: in order from the object end, a negative meniscus lens L2A having an aspherical surface facing toward the image end and having a convex surface facing toward the object end;

a positive cemented lens L2B made up of a bi-convex lens and a bi-concave lens; and a negative meniscus lens L2C having an aspherical surface at the object end and a concave surface at the object end.

The second lens group G2 should possess a strong refractive power and should be arranged at the object end (convexity is placed first) and should preferably possess a large field angle, a large aperature, and a high power. The combination of a novel lens configuration and a superior refractive power arrangement make the invention work so well.

It is also desirable that the negative lens component L2C has a concave surface facing toward the object end, where the aspherical surface is formed. With this configuration, a convex spatial lens can be formed between the lens at the object end in the negative lens component L2C and the positive lens group L2B which is in the middle of the second lens group G2. Combined with the correction by the convex spatial lens, the off axial aberration at the wide-angle end, particularly the lower level coma aberration at the wide angle end, can be corrected even more effectively. Simultaneously, spherical aberration and the off axial aberration, particularly, the lower level coma aberration at the telephoto end can be corrected excellently.

In order to construct the negative lens component L2A with a single lens, basically, an aspherical surface must be introduced to the negative lens component L2A. The aspherical surface can correct distortion at the wide-angle end and coma aberration throughout the lower end. No increase in thickness will be required for the negative lens component L2A and the positive composite lens component L2B which are separated with a large spatial distance. This configuration is advantageous in making a smaller zoom lens with a smaller diameter. When the overall lens system is constructed with thin lenses to reduce its size, it is also desirable for the aspherical surface to be shaped such that a negative refractive power decreases or a positive refractive power increases as it moves from the optical axis to the periphery of the aspherical surface.

The negative lens component L2A has an aspherical surface preferably on the concave surface which has a strong curvature at its image end. If the negative lens component L2A has an aspherical surface at its image end, then the number of lenses and thickness required for the negative lens component L2A are reduced. Also, the aberration correction surface is given more degree of freedom in correcting distortion and coma aberration throughout the lower end. A deflection of a marginal ray (parallel to the optical axis), is large at the telephoto end on the surface at the image end of the negative lens component L2A. If the surface is aspherical, the surface then will obtain more degree of freedom in correcting spherical aberration at the telephoto end, which is preferable. In addition, if the aspherical surface is shaped based on a conic constant K, the aspherical surface displacement amount can then be controlled from a low order to a high order with high accuracy, which is preferable.

It is also desirable that the convex surface of the negative lens component L2A faces toward the object end. If the concave surface of the negative lens component L2A is facing toward the object end, basically, astigmatism at the wide-angle end or coma aberration at the lower end will increase, which makes it impossible to correct aberrations for a large field angle. It is also advantageous that, in the positive composite lens component L2B, the negative lens has a larger index of refraction than the positive lens. It is further advantageous that the concave surface of the negative lens component L2C face towards the object end forming a convex spatial lens (aerial lens) between the negative lens component L2C and the positive composite lens component L2B. A bi-convex aerial lens has a negative refractive power, because its surfaces are surfaces of concave lens surfaces. With the presence of the convex spatial lens, spherical aberration at the telephoto end and coma aberrations and the like can be corrected. This provides an advantageous factor for a high zoom ratio lens of a large aperature.

Overviewing the second lens group G2, the positive composite lens component L2B is sandwiched between the negative lens component L2A and the negative lens component L2C. This in turn can be interpreted that the overall second lens group G2 is arranged nearly symmetrical. Even if the second lens group G2 has a relatively strong refractive power, the magnitude of various aberrations, which are generated in the second lens group G2, can be minimized. This configuration of the second lens group G2 is suitable for the high power zoom lens which is given a large aperature lens and a large field angle at the same time. In addition, employing an aspherical surface for both the negative lens component L2A and the negative lens component L2C, the second lens group G2 having relatively strong refractive powers can be made even smaller.

The above configuration of the second lens group can be applied to focusing of a zoom lens system using the inner focus method. Aberration, and its fluctuation can be suppressed effectively in the inner focus zoom lens system. That is, by configuring the second lens group G2 according to the present invention, the residual aberration which impacts the fluctuation mostly during focusing can be suppressed to the utmost degree.

To realize the benefits of the present invention, the large aperature zoom lens system of embodiment 1 should preferably fulfill each of the conditions (1–13) as follows:

$$(Rar+Raf)/(Rar-Raf) \leq -1 \tag{1}$$

where

Raf: is the paraxial radius of curvature R of the surface at the object end of the lens component L2A;

Rar: is the paraxial radius of curvature R of the surface at the image end of the negative lens component L2A.

The second condition is:

$$0.28 \leq dAB/d2 \leq 0.8 \tag{2}$$

where dAB: is the lens separation on the axis of the negative lens component L2A from the positive composite lens component L2B; and d2: is the total thickness on the axis from the surface at the object end of the second lens group G2 to the image end.

It is important to note that condition (1) defines shape factors for the negative lens component L2A.

If the upper limit of condition (1) is exceeded, the shape of the negative lens component L2A becomes bi-concave. It will be difficult for a bi-concave negative lens component L2A to correct particularly off axial monochromatic aberration such as astigmatism at the wide-angle end and coma aberrations at the lower end and the like. It will also be difficult to correct lateral chromatic aberration. As a result, a high zoom ratio lens having a large field angle will not be obtained. Note that if a spherical surface is introduced to the negative lens component L2A, condition (1) can be calculated based on the paraxial curvature radius. If the negative lens component L2A is constructed with a cemented lens, condition (1) can be calculated based on the surface at the object end where Raf is the curvature radius of the surface at the object end and Rar is the curvature radius of the surface at the image end.

Condition (2) defines an appropriate range for the spatial distance on the axis between the negative lens component L2A and the positive cemented lens component L2B.

As described above, by separating negative lens component L2A and the positive lens component L2B with a large lens separation, the primary light beams at a large field angle near the wide-angle end can be guided in the optical axial direction. A compact spatial filter can be used in this configuration. Also, by maintaining an appropriate lens separation, the dead space (variable spatial distance) can be manipulated between the first lens group G1 and the second lens group G2, which helps miniaturize a high zoom ratio lens.

If the lower limit of condition (2) is exceeded, the spatial distance on the axis dAB becomes too small, which significantly reduces the amount of correction by pushing up the principal ray at a large field angle near the wide-angle end in the optical axial direction. As a result, a large spatial filter is required and the peripheral illumination amount will be short. This will be an obstacle to making a high zoom ratio lens having a large field angle.

If the lower limit of condition (2) is set at 0.32, a smaller high zoom ratio lens of a smaller diameter can be obtained. If the lower limit is set at 0.34, the advantageous effect of the present invention can be maximized.

If the upper limit of condition (2) is exceeded, the spatial distance on the axis dAB becomes too large. This makes it difficult to provide a dead space (variable lens separation) required between the second lens group G2 and the lens group following its image end. As a result, the zoom lens becomes large sized and will not have capability of high zoom ratio. Other lens components will be too thin to correct critical aberrations. Particularly, the zoom lens having a large aperature with a large field angel, may not correct spherical aberration at the telephoto end very much. If this is the case, a large aperature zoom lens of excellent performance will not be realized.

If the upper limit of condition (2) is set at 0.6, a larger aperature zoom lens may be manufactured. If the upper limit of condition (2) is set at 0.5, the advantageous effect of the present invention can be optimized.

The following condition (3) defines the index of refraction relationship between the composite lens component L2B and the negative lens:

$$nbp-nbn<0 \text{ or } n2p-n2n<0 \tag{3}$$

where n2p or nbp: is the index of refraction on the d line of the positive lens of the positive composite lens component L2B and n2n or nbn: is the index of refraction on the d line of the negative lens of the positive composite lens component L2B.

As described above, in the positive composite lens component L2B of a larger aperature zoom lens, the negative lens has a larger index of refraction than the positive lens. With this arrangement, especially spherical aberration at the telephoto-end can be corrected excellently. This also makes it possible for the zoom lens to have lenses of a large aperature. Note that the positive composite lens component L2B is a positive lens component in the second lens group G2 having an overall negative refractive power. In order to have an appropriate Petzval sum value, it is required that the negative lens has a larger index of refraction than the positive lens. If condition (3) is fulfilled, the Petzval sum can be set to an appropriate value. The curvature of field and astigmatism can also be corrected excellently. Note that if the upper limit of condition (3) is set at −0.015, the effect of the present invention can be optimized.

A third lens group G3 is desirable for focus control to correct the aberration fluctuation due to the change in objective distance from far to near. If a third lens group G3 is used it should be located nearest to the aperture stop. Therefore, even if the third lens group G3 is moved, the curvature of field and stigmatism fluctuate little. This is preferable for a focusing lens group.

The third lens group G3 comprises:
in order from the object end,
a positive lens L31 having a concave surface facing toward the object end;
a positive cemented lens L32 made up of a bi-convex lens and a negative meniscus lens having a concave surface facing toward the object end.
Conditions 4–5 are shown below:

$$-0.8 < f2/fT < -0.1 \quad (4)$$

and $$0.3 < f3/fT < 1 \quad (5)$$

where f2: is the focal length of the second lens group G2 and fT: is the focal length of the overall system at the telephoto end.

f3: is the focal length of the third lens group G3 and fT: is the focal length of the overall system at the telephoto end.

Condition (4) defines an appropriate range for the focal length of the second lens group G2.

Condition (5) defines an appropriate range for the focal length of the third lens group G3.

If the lower limit of condition (4) is exceeded, the refractive power of the second lens group becomes too small. If the lower limit of condition (5) is exceeded, the refractive power of the third lens group becomes too large. Particularly, a lens with a larger diameter unfavorably impacts spherical aberration at the telephoto end, which is not preferable. If excellent aberration is desired under these conditions, a large lens must be used, which is also unfavorable. Note that if the upper limit of condition (5) is set to 0.8, the effect of the present invention can be optimized. Particularly, slanted light beams at the wide-angle end are kept largely off the optical axis. To compensate for this, the zoom lens system must have a large front end lens. As magnification advances in a large zoom lens system, the displacement movement amount from the optical axis increases. An overall zoom lens must be large to catch the optical axis. The large zoom lens may not be suited to a high power zoom lens. Note that if the lower limit of condition (4) is set to −0.5, the zoom lens is advantageous for the reduction of the overall zoom lens size using small diameter lenses. This is also effective in high power magnification. If the lower limit of condition (4) is set at −0.3, the effect of the present invention can be optimized.

If the upper limit of condition (4) is exceeded, the refractive power of the second lens group G2 increases. This will be advantageous for reducing of the size of the overall zoom lens with a small lenses. However, coma aberration at the lower level at the wide-angle end will not be corrected well. It will be difficult to set an appropriate value for the Petzval sum and the image plane curvature. Astigmatism will be impacted badly. If the upper limit of condition (4) is set at −0.15, the effect of the present invention will be optimized.

Condition (6) is as follows:

$$0.8 < fa/f2 < 4 \quad (6)$$

where fa: is the focal length of said negative lens component L2A.

Condition (6) defines an appropriate range for the refractive power of the negative lens component L2A.

If the lower limit of condition (6) is exceeded, the refractive power of the negative lens component L2A increases. As a result, the primary light beams in a large field angle near the wide-angle end are guided off the optical axial direction. A small spatial filter can be used taking advantage of this effect. Consequently, a small high power zoom lens with small lenses can be produced under the condition. If the lower limit of condition (6) is set to 2.0, the effect of the present invention can be optimized.

Condition (7) is as follows:

$$-20 < fb/f2 < -0.5 \quad (7)$$

where fb: is the focal length of said positive lens component L2B of the positive cemented lens component and Condition (7) defines an appropriate range for the refractive power of the positive cemented lens component L2B.

If the lower limit of condition (7) is exceeded, the refractive power of the positive cemented lens component L2B becomes too small to correct aberration as an overall positive lens group. As a result, the magnitude of coma aberration at a lower level at the wide-angle end, curvature of field, and astigmatism will increase, making it difficult to correct spherical aberration at the telephoto end. If the lower limit of condition (7) is set at −15, aberrations can be corrected better. A smaller high zoom ratio lens system with smaller lenses will be produced. If the lower limit of condition (7) is set at −13, the effect of the present invention can be optimized.

If the upper limit of condition (7) is exceeded, the refractive power of the positive lens component L2B becomes too strong. It will be difficult to correct spherical aberration at the telephoto end. In addition, each of the lens components will be configured with lenses of strong refractive powers, causing manufacturing eccentricity, which is not preferable. If the upper limit of condition (7) is set at −1.0, aberrations can be corrected better. A smaller high power zoom lens system with smaller lenses may also be produced. If the upper limit of condition (7) is set at −2.5, more preferably −3.0, the effect of the present invention can be optimized.

The aspherical surface of the negative lens component L2A for this embodiment of the present invention is expressed by the following Mathematical Equation (a).

Mathematical Equation (a)

$$S(y)=(y^2/R)/\{1+(1-K_a \cdot y^2/R^2)^{1/2}\}+C_2 \cdot y^2+C_4 \cdot y^4+C_6 \cdot y^6+C_8 \cdot y^8+C_{10} \cdot y^{10} \tag{a}$$

It is desirable that the conic constant Ka fulfills the following condition (8):

$$K_a<1.0 \tag{8}$$

where y: is the height in the direction perpendicular to the optical axis;

S(y): is the displacement amount along the optical axial direction at the height y (the sag amount: the distance along the optical axis between the tangent planes at the peaks of each of the aspherical surfaces);

R: is the reference curvature radius;

$K_a$: is the conic constant; and $C_n$: is the n-order aspherical surface constant.

Condition (8) defines an appropriate range for a conic constant Ka associated with the aspherical surface of the negative lens component L2A by aspherical surface equation (a).

As described, by employing a conic constant $K_a$, the aspherical surface displacement expressed by the aspherical constant can be controlled highly accurately from low order to high order constant levels. Particularly, if a conic constant $K_a$ is set smaller than 1, the curvature radius decreases as it is distanced from the center of the spherical surface, which no longer is spherical. That is, a relatively large deviation from a spherical surface is created. Therefore, if the upper limit of condition (8) is exceeded, a large high zoom ratio lens with a large field angle of the present invention will not be able to correct particular distortion at the wide-angle end or coma aberration and spherical aberration at the telephoto end accurately.

In this embodiment of present invention, it is desirable that at least one of the front and back surfaces, i.e. on the object side and image side respectively, of the negative lens component L2C be formed aspherically with the aspherical surface of the negative lens component L2C expressed by the following Mathematical Equation (b).

Mathematical Equation (b)

$$S(y)=(y^2/R)/\{1+(1-KC \cdot y^2/R^2)^{1/2}\}+C_2 \cdot y^2+C_4 \cdot y^4+C_6 \cdot y^6+C_8 \cdot y^8+C_{10} \cdot y^{10} \tag{b}$$

It is desirable that the conic constant $K_c$ of condition (c) fulfills the following condition (9):

$$K_c<1.0 \tag{9}$$

where y: is the height in the direction perpendicular to the optical axis;

S(y): is the displacement amount along the optical axial direction at the height y (the sag amount: the distance along the optical axis between the tangent planes at the peaks of each of the aspherical surfaces);

R: is the reference curvature radius;

$K_c$: is the conic constant; and $C_n$: is the n-order aspherical surface constant.

Condition (9) defines an appropriate range for a conic constant $K_c$ which is employed when the aspherical surface of the negative lens component L2C is expressed in a generic aspherical surface equation (b).

In the same manner as the aspherical surface introduced to the negative lens component L2A, if the aspherical surface introduced to the negative lens component L2C is expressed by employing a conic constant $K_c$, the aspherical surface displacement can be controlled highly accurately from low order to high order constant levels by controlling the aspherical constant. Particularly, if a conic constant $K_c$ is set smaller than 1, the curvature radius decreases as it is distanced from the center of the aspherical surface. That is, a relatively large deviation from a spherical surface is created. Therefore, if the upper limit of condition (9) is exceeded, a large high zoom ratio lens with a large field angle of the present invention will not be able to correct particular distortion at the wide-angle end or coma aberration and spherical aberration at the telephoto end accurately. In addition, as is the case for the negative lens component L2A, it is desirable that an aspherical surface is introduced to the concave surface (facing toward at the object end) in the negative lens component L2C. If this is done, if the conic constant $K_c$ is set smaller than 1, aberrations can be corrected freely not only at the wide-angle end but also at the telephoto end.

Condition (10) is as follows:

$$1 \leq (Rcr+Rcf)/(Rcr-Rcf) \tag{10}$$

where

Rcf: is the paraxial radius of curvature of the surface facing toward the object end of the negative lens component L2C and Rcr: is the paraxial radius of curvature of the surface facing toward the image end of the negative lens component L2C.

Condition (10) defines shape factors for the negative lens component L2C.

If the upper limit of condition (10) is exceeded, the shape of the negative lens component L2C becomes bi-concave. As described, in the present invention, the concave surface at the object end in the negative lens component L2C is faced toward the object end to create a convex spatial lens between the positive composite lens component L2B and the concave surface. Basically, spherical aberration and coma aberration and the like are corrected excellently by the convex spatial lens.

Overviewing the second lens group G2, the positive composite lens component L2B is sandwiched between the negative lens component L2A and the negative lens component L2C. This in turn can be interpreted that the overall second lens group G2 is arranged nearly symmetrical. Even if the second lens group G2 has a relatively strong refractive power, the magnitude of various aberrations, which are generated in the second lens group G2, can be minimized. It is important that the surface at the image end in the negative lens component L2A and the surface at the object end in the negative lens component L2C are concave. Therefore, if condition (10) is not fulfilled, basically, spherical aberration at the telephoto end and coma aberration and the like will not be corrected freely, which is not preferable.

Condition (11) is as follows:

$$0.03 \leq dBC/d2 \leq 0.3 \tag{11}$$

where dBC: is the lens separation on the axis of said positive composite lens component L2B from said negative lens component L2C.

Condition (11) defines an appropriate range for the spatial distance on the axis between the negative lens component L2B and the positive composite lens component L2C.

As described above, with the spatial lens formed between the negative lens component L2B and the positive lens component L2C, basically, spherical aberration at the telephoto end and coma aberration and the like are corrected. In addition, the size of the lens separation on the axis impacts the lens separation of the second lens group G2 and the lens group which follows the second lens group G2 very much. Therefore, if the lower limit of condition (11) is exceeded, the refraction power of the spatial lens formed between the positive cemented lens component L2B and the negative lens component L2C becomes too weak to correct the above mentioned aberrations. This is not preferable. Note that if the lower limit of condition (11) is set at 0.05, the effect of the present invention can be maximized.

If the upper limit of condition (11) is exceeded, the second lens group G2 and the lens group which follows the second lens group G2 will not be able to obtain a sufficient lens separation. This is not preferable. If the upper limit of condition (11) is set at 0.25, a larger lens separation can be obtained for the second lens group G2 and the following lens group. If the upper limit of condition (11) is set at 0.2, the effect of the present invention can be maximized.

It is desirable that the negative lens component L2C is a negative composite lens made up by bonding a negative lens and a positive lens. By constructing the negative lens component L2C with a negative lens with the negative-positive construction, the Petzval sum can be set to an appropriate value. Spherical aberration can be corrected freely as well.

When the negative lens component L2C is constructed with a negative lens made up by bonding a negative lens and a positive lens, it is desirable that the following condition (12) is fulfilled:

$$ncp - ncn < 0 \qquad (12)$$

where ncn: is the index of refraction on the d line of the negative lens of the negative lens component L2C and ncp: is the index of refraction on the d line of the positive lens of the negative lens component L2C.

Condition (12) defines the index of refraction relationship between the composite lens component L2C and the negative lens.

Fulfilling condition (12) means that the negative lens in the negative lens component L2C has a larger index of refraction ncn than the positive lens (ncp) in the positive lens. If condition (12) is fulfilled, the Petzval sum can be set to an appropriate value, making the curvature of field and stigmatism aberration easier.

It is desirable in the present invention that the third lens group G3 comprises at least one positive composite lens, which is made up by bonding a positive lens and a negative lens and fulfills the following condition:

$$n3p - n3n < 0 \qquad (13)$$

where n3p: is the index of refraction on the d line of the positive lens of the composite lens and n3n: is the index of refraction on the d line of the negative lens of the positive composite lens.

Condition (13) defines the relationship between the index of refraction for the positive lens in the positive composite lens in the third lens group G3 and the index of refraction of the negative lens.

By setting a larger index of refraction for the negative lens than the positive lens in the positive composite lens, especially spherical aberration at the telephoto end can be corrected excellently, which is advantageous for a zoom lens of a large lens diameter. It is also required for the negative lens to have a larger index of refraction to set an Petzval sum value. By fulfilling condition (13), the Petzval sum can be set appropriately and curvature of field and astigmatism can be corrected excellently.

If the upper limit of condition (13) is set to −0.1, the effect of the present invention can be optimized.

As described, an aspherical surface is introduced in the second lens group G2. However, if an aspherical surface is introduced to the third lens group G3 or the fourth lens group G4, spherical aberration and coma aberration at the upper end can be spread over the aspherical surface, which works advantageously for a large zoom lens having a large field angle. This makes high zoom ratio magnification possible as well.

As is apparent from what is described above, an aspherical surface is introduced to the second lens group G2 in the present invention. However, it is also possible that an aspherical surface is introduced to the third lens group G3 or the optional fourth lens group G4 described below to spread spherical aberration or coma aberration at the upper level over the aspherical surface. This can promote making a large high zoom ratio lens with a large field angle. In this regard the zoom lens system may further comprise in addition to the first lens group G1 having a positive refractive power, the second lens group G2 having a negative refractive power and a third lens group G3 having a positive refractive power; at least, in order from the object end, a fourth lens group G4 having a positive refractive power; wherein the lens separation of the first group G1 from the second lens group G2 is changed for zoom ratio and wherein the second lens group G2 comprises, in order from the object end:

a negative lens component L2A at least one of whose surface is aspherical;

a composite positive lens component L2B which is made up by bonding a positive lens having a convex surface facing toward the object end and a negative lens; and a negative lens component L2C having a concave surface facing toward the object end.

The aspherical surface for the third or fourth lens group may be expressed by the following mathematical equation (c):

Mathematical Equation (c)

$$S(y) = (y^2/R)/\{1+(1-K\cdot y^2/R^2)^{1/2}\} + C_2\cdot y^2 + C_4\cdot y^4 + C_6\cdot y^6 + C_8\cdot y^8 + C_{10}\cdot y^{10} \qquad (c)$$

where y: is the height in the direction perpendicular to the optical axis;

S(y): is the displacement amount along the optical axial direction at the height y (the sag amount: the distance along the optical axis between the tangent planes at the peaks of each of the aspherical surfaces);

R: is the paraxial radius of curvature;

K: is the conic constant; and $C_n$: is the n-order aspherical surface constant. The paraxial curvature radius r of a spherical surface can be expressed by the following mathematical equation (d).

$$r = 1/(2 \cdot C_2 + 1/R) \quad (d)$$

It should be noted that in the Table for each of the embodiments, an aspherical surface is noted with an *.

It is noted that the fourth lens group G4 comprises: in order from the object end,

- a positive meniscus lens L41 having a convex surface facing toward the object end;
- a negative composite lens L42 made up of a bi-convex lens and a bi-concave lens;
- a positive composite lens L43 made up of a negative meniscus lens having a convex surface facing toward the object end and a bi-convex lens L44; and
- a negative meniscus lens L45 having a concave surface facing toward the object end.

Note that an aperture stop A is arranged between the second lens group G2 and the third lens group G3. The aperture stop A moves integral with the third lens group G3 during zooming.

WORKING EXAMPLE OF EMBODIMENT 1

Table 1 shows various values of the Embodiment 1 of the present invention. In Table 1, f is the focal length, F NO is the F number, $2\omega$ is the field angle, Bf is the back focus, $\beta$ is the magnification, DO is the object point distance (the distance between the surface at the utmost object end and the object measured along the optical axis). The surface number is the number of the lens surfaces counted from the object end in the direction light is progressing. d is the lens separation between each of the lenses. r is the curvature radius (paraxial curvature radius in case of an aspherical surface). n is the index of refraction on the d line ($\lambda$=587.6 nm), and $\nu$ is the Abbe number.

TABLE 1 f = 29 to 102
F NO = 3.6
$2\omega$ = 76.2 to 23.2°

| Surface No. | r | d | $\nu$ | n |
|---|---|---|---|---|
| 1) | 209.1994 | 2.0000 | 25.50 | 1.804581 |
| 2) | 123.3916 | 8.0000 | 82.52 | 1.497820 |
| 3) | −344.5143 | 0.1000 | | |
| 4) | 56.5074 | 5.4000 | 82.52 | 1.497820 |
| 5) | 93.2641 | (d5 = variable) | | |
| 6) | 109.1250 | 1.7000 | 49.45 | 1.772789 |
| 7*) | 15.6692 | 10.6649 | | |
| 8) | 60.4809 | 7.0000 | 28.19 | 1.740000 |
| 9) | −25.6142 | 1.4000 | 49.45 | 1.772789 |
| 10) | 115.3664 | 4.5000 | | |
| 11*) | −26.1284 | 2.0000 | 49.45 | 1.772789 |
| 12) | −37.3890 | (d12 = variable) | | |
| 13) | aperture stop | 2.5000 | | |
| 14) | −1254.9023 | 4.5000 | 58.90 | 1.518230 |
| 15) | −47.1898 | 0.1000 | | |
| 16) | 62.0105 | 10.0000 | 61.09 | 1.589130 |
| 17) | −30.8950 | 2.0000 | 28.56 | 1.795040 |
| 18) | −89.4354 | (d18 = variable) | | |
| 19) | 47.1402 | 5.0000 | 58.90 | 1.518230 |
| 20) | 716.9156 | 1.0000 | | |
| 21) | 132.5979 | 4.5000 | 64.10 | 1.516800 |
| 22) | −106.3722 | 1.6000 | 45.37 | 1.796681 |
| 23) | 59.7794 | 10.0000 | | |
| 24) | 443.3049 | 1.7000 | 37.20 | 1.834000 |
| 25) | 39.5548 | 9.0000 | 48.97 | 1.531721 |
| 26) | −38.1373 | 0.1000 | | |
| 27) | 74.7573 | 5.0000 | 64.10 | 1.516800 |
| 28) | −164.5801 | 3.2000 | | |
| 29) | −37.2162 | 2.0000 | 49.45 | 1.772789 |
| 30) | −82.4474 | (Bf) | | |

Aspherical Surface Data

| | k | $C_2$ | $C_4$ |
|---|---|---|---|
| Surface 7 | 0.9234 | 0.0000 | −6.92030 × 10$^{-6}$ |

| | $C_6$ | $C_8$ | $C_{10}$ |
|---|---|---|---|
| | −7.94420 × 10$^{-9}$ | −8.61250 × 10$^{-11}$ | 5.54370 × 10$^{-15}$ |

| | k | $C_2$ | $C_4$ |
|---|---|---|---|
| Surface 11 | 0.2639 | 0.0000 | 1.59190 × 10$^{-6}$ |

| | $C_6$ | $C_8$ | $C_{10}$ |
|---|---|---|---|
| | 1.20720 × 10$^{-8}$ | 4.25920 × 10$^{-11}$ | 7.42530 × 10$^{-14}$ |

TABLE 1-continued (Variable Separation during Zooming)

| f | 29.00000 | 50.00000 | 102.00000 |
|---|---|---|---|
| D0 | ∞ | ∞ | ∞ |
| d5 | 1.15591 | 21.97167 | 52.32140 |
| d12 | 21.87071 | 9.69582 | 0.86248 |
| d18 | 11.97487 | 3.33400 | 4.98721 |
| Bf | 37.99217 | 61.34587 | 88.37687 |

(Variable Separation during the Focusing Motion)

| β | −0.03333 | −0.03333 | −0.03333 | −0.06115 | −0.10262 | −0.18993 |
|---|---|---|---|---|---|---|
| D0 | 811.7554 | 1405.3091 | 2865.2578 | 415.8415 | 392.4877 | 342.2873 |
| d5 | 1.15591 | 21.97167 | 52.32140 | 1.15591 | 21.97167 | 52.32140 |
| d12 | 22.86712 | 10.36319 | 1.49373 | 23.72175 | 11.76692 | 4.47978 |
| d18 | 10.97846 | 2.66663 | 4.35597 | 10.12383 | 1.2629 | 1.36991 |
| Bf | 37.99796 | 61.35165 | 88.38261 | 38.01177 | 61.40104 | 88.56586 |

(Corresponding Values)

| (1) (Rar + Raf)/(Rar − Raf) = | −1.34 |
|---|---|
| (2) dAB/d2 = | 0.391 |
| (3) nbp − nbn = | −0.0328 |
| (4) f2/fT = | −0.196 |
| (5) f3/fT = | 0.448 |
| (6) fa/f2 = | 1.193 |
| (7) fb/f2 = | −10.62 |
| (8) Ka = | 0.9234 |
| (9) KC = | 0.2639 |
| (10) (Rcr + Rcf)/(Rcr − Rcf) = | 5.64 |
| (11) dBC/d2 = | 0.165 |
| (12) ncp − ncn = | −0.2560 |
| (13) n3p − n3n = | −0.2059 |

EMBODIMENT 2

Now, other conditions of the present inventions are described.

In the present invention, at least one of the aspherical surfaces of the negative lens component L2C in the second lens group G2 can fulfill the following additional condition:

$$0 < |ASc-Sc|/fw \leq 0.1 \tag{14}$$

where

ASc−Sc: is the deviation of said aspherical surface in the optical axial direction around the periphery of its effective diameter from a reference spherical surface having a predetermined paraxial curvature radius;

fw: is the focal length of the overall zoom lens system at the wide angle end.

Condition (14) defines the optimal range of deviation in the optical axial direction for the aspherical surface around the periphery of its effective diameter from a reference spherical surface having a predetermined paraxial curvature radius.

If the upper limit of condition (14) is exceeded, the aspherical deviation increases significantly. This, in turn, generates high order spherical aberrations and the like, which are not preferable. In addition, the aspherical surface specification becomes too stringent, which is not preferable in terms of manufacturing efficiency. Furthermore, the lens surface will be required to have a highly stringent eccentricity specification, which is not desirable. If the upper limit of condition (14) is set at equal to or less than 0.05, aberration can be corrected excellently with an easy-to manufacture configuration. If the upper limit is set at equal to or less than 0.035, the effect of the present invention can be maximized.

In accordance with this embodiment, at least one of the aspherical surfaces included in the negative lens component L2A in the second lens group G2 is shaped such that the lens negative refractive power is decreased or its positive refractive power is increased moving toward the periphery of the aspherical surface.

For this embodiment it is desirable that the aspherical surface of at least one of the negative lenses in component L2A in the second lens group G2 fulfills the following condition:

$$0 < |ASa-Sa|/fw \leq 0.15 \tag{15}$$

where

ASa−Sa: is the deviation of the aspherical surface in the optical axial direction around the periphery of its effective diameter from a reference spherical surface having a predetermined paraxial curvature radius;

fw: is the focal length of the overall zoom lens system at the wide angle end.

Condition (15) defines the optimal range of deviation in the optical axial direction for the aspherical surface, which is included in the negative lens component L2A in the second lens group, around the periphery of its effective diameter from a reference spherical surface having a predetermined paraxial curvature radius.

If the upper limit of condition (15) is exceeded, the aspherical deviation increases significantly. This, in turn, generates distortion and downward coma aberrations and the like at the wide-angle end, which are not preferable. In addition, the aspherical surface specification becomes too stringent, which is not preferable in terms of manufacturing efficiency. Furthermore, the lens surface will be required to have a highly stringent eccentricity specification, which is not desirable. If the upper limit of condition (15) is set at equal to or less than 0.1, aberration can be corrected excellently with an easy-to manufacture configuration. If the upper limit is set at equal to or less than 0.08, the effect of the present invention can be maximized.

In accordance with this embodiment the positive lens component L2B has a positive refractive power and comprises at least a positive composite lens made up of positive lens L2Bp and a negative lens L2Bn and the following additional condition is preferably fulfilled:

$$nbp < nbn \tag{16}$$

where nbp: is the index of refraction on the d line of the positive lens L2Bp of the positive composite lens component L2B and nbn: is the index of refraction on the d line of the negative lens L2Bn of the positive composite lens component L2B.

Condition (16) defines the index of refraction relationship between positive lens L2Bp and negative lens L2Bn of the composite lens component L2B. The composite lens of the positive lens group L2B in the middle of the second lens group G2 effectively corrects spherical aberration, particularly at the telephoto end, by increasing the index of refraction for the concave (negative) lens component more than that of the convex (positive) lens component. This is advantageous to make a zoom lens system of a large aperature.

It is necessary that the lens group which is the positive lens group in the second lens group G2 has a negative refractive power and that, in order to have an appropriate Petzval sum value, its concave lens component has a larger index of refraction than the convex lens component. If condition (16) is fulfilled curvature of field and astigmatism can also be corrected excellently. Moreover, if the upper limit of condition (16) is set at equal to or larger than 0.015, the effect of the present invention can be maximized.

A further desirable condition for this embodiment of the present invention is as follows:

$$0.2 < X_2 / fw < 2 \tag{17}$$

where $X_2$: is the positive deviation of the second lens group G2, which moves from the wide-angle end to the telephoto end in the direction toward the object end for zoom ratio and fw: is the focal length of the overall system at the wide-angle end.

Condition (17) defines an appropriate range for the movement amount for the second lens group G2. The moving direction and the displacement amount of the second lens group G2 is largely related with the change in the overall length of the zoom lens system. In the zoom lens system of the present invention, the convex lens comes first (e.g. zoom lens system with four lens groups, for example, in order from the object end, the zoom lens system with the positive/negative/positive/positive construction). The overall length changes least in the zoom lens system in which the second lens group G2 does not move or it moves in the image plane direction toward the telephoto end. However, when increasing the field angle area at the wide-angle end, a large lens separation is required between the first lens group and the second lens group for zooming. This requires the front lens to have a larger diameter, which is not preferable. If the front lens does not have a diameter large enough, high magnification will not be obtained. Therefore, it is desirable that the second lens group moves in the object direction toward the telephoto end for zooming to obtain an appropriate moving amount.

If the lower limit of condition (17) is exceeded, as described, the front lens of a larger diameter is required. If the front lens does not have a diameter large enough, high magnification will not be obtained. If the lower limit of condition (17) is set at equal to or larger than 0.25, the zoom lens system is advantageous for the reduction of the overall zoom lens size using small diameter lenses. This is also effective in high zoom ratio magnification. If the lower limit of condition (17) is set at equal to or larger than 0.3, the effect of the present invention can be maximized.

If the upper limit of condition (17) is exceeded, the moving amount of the second lens group G2 increases. This will make it difficult to use a large diameter lenses particularly at the telephoto end. This will increases the size of the overall lens system, which is not preferable. This will also complicate the lens barrel structure, which is not preferable either. If the upper limit of condition (17) is set at equal to or less than 1.5, aberrations can be corrected excellently for a small zoom lens system. If the upper limit is set at equal to or less than 1, the effect of the present invention will be maximized.

Another desirable condition for this embodiment of the present invention is as follows:

$$-1.2 < f2/fw < -0.4 \tag{18}$$

where f2: is the overall focal length of said second lens group G2 and fw: is the overall focal length of said zoom lens system at the wide-angle end.

Condition (18) defines an appropriate range for the focal length f2 in the second lens group G2. If the lower limit of condition (18) is exceeded, the refractive power of the overall second lens group G2 decreases. As a result, particularly the slanted light beams at the wide-angle end are guided off the optical axial direction. Consequently, the front end lens diameter must be large. Also, the moving amount of the lens group increases to perform zooming and the zoom lens system become large. Consequently, a small high power zoom lens system cannot be produced under these conditions. If the lower limit of condition (18) is set at equal to or larger than −1, the condition becomes advantageous for reduction of size and diameter. It will be advantageous as well for high zoom ratio magnification. If the lower limit of condition (18) is set at equal to or larger than −0.85, the effect of the present invention can be maximized. If the upper limit of condition (18) is exceeded, the refractive power of the second lens group G2 becomes too large. This will be advantageous to the reduction of size and diameter for the zoom lens system but will be disadvantageous to the aberration correction. Particularly, for the lower coma aberration at the wide-angle end, distortion will be aggravated. It will also be difficult to set the Petzval value at an appropriate value, providing poor correction for curvature of field and astigmatism.

If the upper limit of condition (18) is set at equal to or less than −0.5, it will be advantageous for aberration correction. If the upper limit is set at equal to or less than −0.55 or −0.6, the effect of the present invention will be maximized.

Yet another desirable condition for this embodiment of the present invention is as follows:

$$0.8 < f2a/f2 < 2.5 \tag{19}$$

where f2a: is the focal length of the negative lens component L2A and f2: is the overall focal length of the second lens group G2.

Condition (19) defines an appropriate range for the refractive power of the negative composite lens component L2A. If the lower limit of condition (19) is exceeded, the refractive power of the negative composite lens component L2A becomes so large that the principal ray at a large field angle near the wide-angle end are guided in the optical axial direction. As a result, a smaller filter can be used for the zoom lens system, however, it will be particularly difficult to correct the downward coma aberration and distortion at the wide angle end.

If the lower limit of condition (19) is set at equal to or larger than 0.9, aberrations can be corrected excellently. A compact high power zoom lens system with small diameter lenses will be produced. If the lower limit of condition (19) is set at equal to or larger than 0.95, the effect of the present invention can be maximized.

If the upper limit of condition (19) is exceeded, the refractive power of the negative lens component L2A becomes too small. A smaller filter will not be able to be used in the zoom lens system, which is not preferable. If the upper limit of condition (19) is set at equal to or larger than 2.0, aberrations can be corrected better. A smaller high power zoom lens system with smaller diameter lenses may also be produced. If the upper limit of condition (19) is set at equal to or less than 1.5, the effect of the present invention can be optimized.

An even further desirable condition for this embodiment of the present invention is as follows:

$$1 < f2c/f2 < 5 \qquad (20)$$

where
- f2c: is the focal length of the negative lens component L2C; and
- f2: is the overall focal length of the second lens group G2.

Condition (20) defines an appropriate range for the refractive power of the negative lens component L2C. If the lower limit of condition (20) is exceeded, the refractive power of the negative lens component L2C increases, causing high order aberrations and the like. This will particularly make it difficult to correct spherical aberration at the telephoto end and lower level coma aberration. In addition, a manufacturing problem will be encountered. The specification for eccentricity will increase significantly, which is not preferable. If the lower limit of condition (20) is set at equal to or larger than 1.5, aberrations will be corrected better. More preferably, if the lower limit is set at equal to or larger than 1.85, the effect of the present invention will be optimized.

If the upper limit of condition (20) is exceeded the refractive power of the negative lens component L2C becomes small. In this case, the symmetricity in refractive powers is significantly lost in the second lens group. As a result, it will be difficult to correct spherical aberration at the telephoto end and the downward coma aberration as described. If the upper limit of condition (20) is set at equal to or less than 4, aberrations can be corrected better. If the upper limit of condition (20) is set equal to or less than 3.7, the effect of the present invention can be optimized.

Another desirable condition for this embodiment of the present invention is as follows:

$$-8 < f2b/f2 < -1.5 \qquad (21)$$

where
- f2b: is the focal length of said positive lens component L2B; and
- f2: is the overall focal length of said second lens group G2.

Condition (21) defines an appropriate range for an overall refractive power of the positive lens component L2B having a positive lens having a convex surface facing toward the object end. If the upper limit of condition (21) is exceeded, the overall refractive power of the positive lens component L2B will increase. This will make it difficult to correct aspherical aberration at the telephoto end. If upper limit of condition (21) is set at equal to or less than −7, aberration correction will be corrected. A compact zoom lens system with small diameter can also be obtained.

If the upper limit of condition (21) is exceeded, the overall refractive power of positive lens component L2B increases. This makes it difficult to correct spherical aberration at the telephoto end, which is not preferable. If the upper limit of condition (21) is set at equal to or less than −2, aberration can be corrected, providing a compact zoom lens system of the small diameter.

When the negative lens component L2C has a negative refractive power and comprises at least a negative composite lens L2Cn and a positive lens L2Cp the following additional condition (22) should desirably be fulfilled:

$$nCp < nCn \qquad (22)$$

where
- nCp: is the index of refraction on the d line of said positive lens L2Cp;
- nCn: is the index of refraction on the d line of said negative lens L2Cn.

Condition (22) defines an appropriate range for the index of refraction for positive lens L2Cp and negative lens L2Cn of the composite lens in the negative lens component L2C. It is required that the composite lens of the negative lens component L2C has a higher index of refraction for the concave (negative) lens component than the convex (positive) lens component to set an appropriate value for the Petzval sum. By fulfilling condition (22), the curvature of field and astigmatism can be corrected excellently. In addition, it is desirable that the zoom lens system employs a composite lens to correct chromatic aberration. Moreover, the composite lens of the negative lens component L2C has a difference in index of refraction equal to or larger than 0.1 between the convex (positive) lens component and the concave (negative) lens component to maximize the effect of the present invention.

Figure 2:
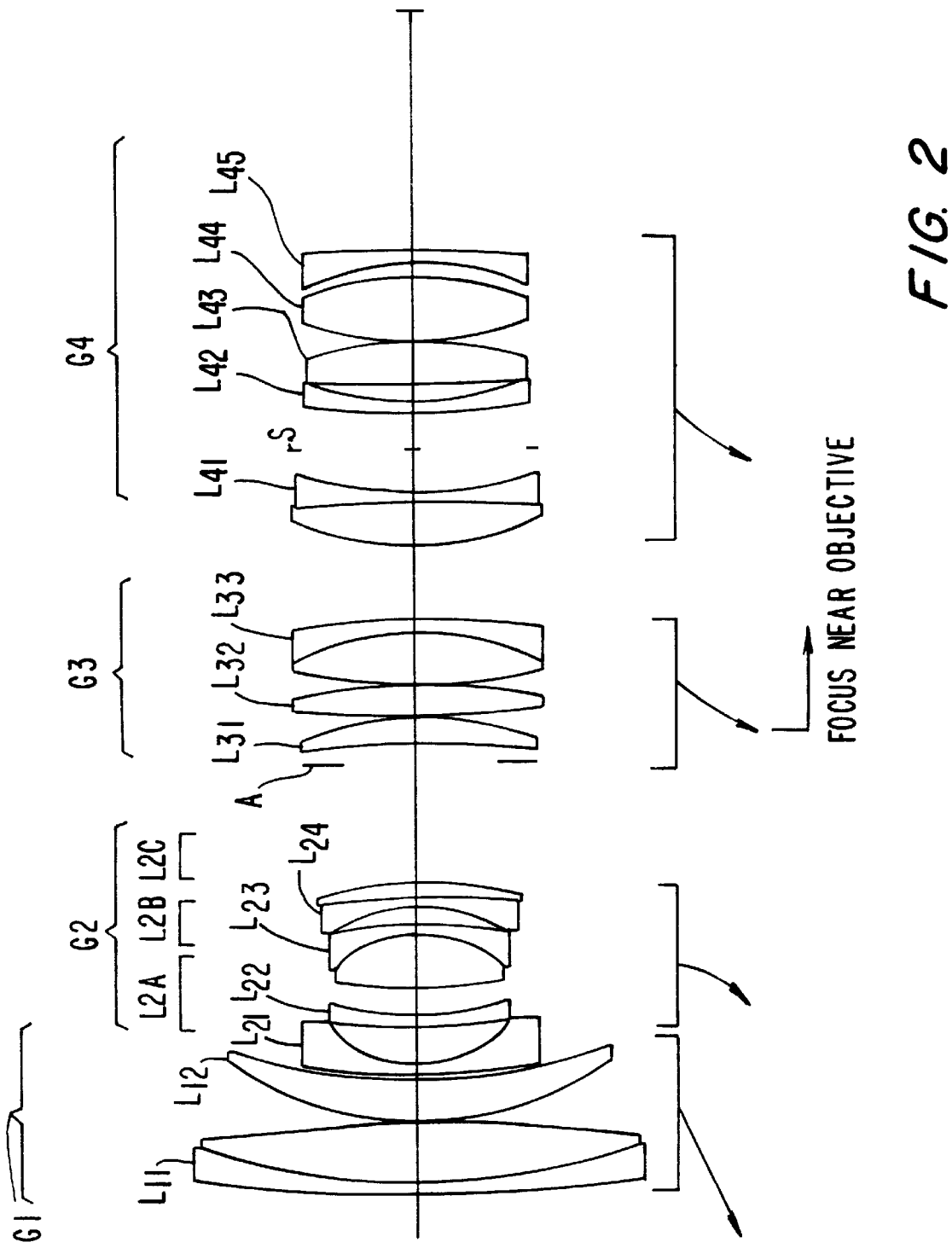
FIG. 2 is a diagram showing a lens layout and movement profile of the zoom lens system of Embodiment 2 of the present invention.

FIG. 2 shows the lens layout and movement profile of Embodiment 2 of the present invention.

The zoom lens system of this embodiment may further comprise in addition to a first lens group G1 having a positive refractive power and a a second lens group G2 having a negative refractive power, in order from the object end,
- a third lens group G3 having a positive refractive power; and
- a fourth lens group G4 having a positive refractive power.

The first lens group G1 comprises: in order from the object end,
- a positive composite lens L11 made up of a negative meniscus lens having a convex surface facing toward the object end and a positive lens and
- a positive meniscus lens L12 having a convex surface facing toward the object end.

The second lens group G2 comprises: in order from the object end,
- a negative meniscus aspherical surface lens L21 having an aspherical surface on its convex surface facing toward the object end , a negative meniscus lens L22 having a convex surface facing toward the object end:

a positive composite lens L23 made up of a positive lens having a convex surface facing toward the object end and a negative meniscus lens having a convex surface facing toward the image end;

a negative composite lens L24 made up of a negative meniscus aspherical surface lens having an aspherical surface on its concave surface facing toward the object end and a positive meniscus lens having a concave surface facing toward the object end.

Lens L2A is constructed with a negative meniscus aspherical surface lens L21 and a negative meniscus lens L22. Lens L2B is constructed with a positive composite lens L23. L2C is constructed with the composite negative lens L24.

Aperture stop A is formed near the object end in the third lens group G3. The third lens group G3 comprises:

a positive meniscus lens L31 having a convex surface facing toward the image end, a bi-convex lens L32, a positive composite lens L33 having a bi-convex lens and a negative meniscus lens having a convex surface facing toward the image end.

The fourth lens group G4 comprises:

a positive composite lens L41 made up of a bi-convex lens and a bi-concave lens;

a flare stopper S which changes its diameter according to a zooming motion, a negative meniscus lens L42 having a convex surface facing toward the object end;

a bi-convex lens L43;

a bi-convex lens L44; and a negative meniscus lens L45 having a convex surface facing toward the image end.

FIG. 2 shows a lens layout at the wide-angle end. When magnified toward the telephoto end, all lens groups move toward the object end such that the spatial distance between the first lens group G1 and the second lens group G2 increases while that between the second lens group G2 and the third lens group G3 decreases. In addition, when changing the focus from an object at an infinitely far distance to one at a near distance, the third lens group G3 and the aperture stop A move integrally toward the image end along the optical axis.

WORKING EXAMPLE OF EMBODIMENT 2

Table 2 shows various values of this embodiment of the present invention. In Table 2, f is the focal length, F NO is the F number, 2ω is the field angle, Bf is the back focus, β is the magnification ratio, DO is the object point distance (the distance between the surface at the utmost object end and the object measured along the optical axis). The surface number is the number of the lens surfaces counted from the object end in the direction light is progressing. d is the lens separation between each of the lenses. r is the curvature radius (paraxial curvature radius in case of an aspherical surface). n is the index of refraction on the d line (λ=587.6 nm), and the Abbe number is given as Abbe NO. In the table, the flare stop diameter, aperture stop diameter correspond to variable lens separations: F=29.00, 50.00, and 77.60.

For this embodiment, an aspherical surface is expressed by the earlier mentioned aspherical surface equation (c):

$$S(y)=(y^2/R)/\{1+(1-K \cdot y^2/R^2)^{1/2}\}+C_2 \cdot y^2+C_4 \cdot y^4+C_6 \cdot y^6+C_8 \cdot y^8+C_{10} \cdot y^{10} \qquad (c)$$

where y: is the height in the direction perpendicular to the optical axis;

S(y): is the displacement amount along the optical axial direction at the height y (the sag amount: the distance along the optical axis between the tangent planes at the peaks of each of the aspherical surfaces);

R: is the paraxial curvature radius;

K: is the conic constant; and $C_n$: is the n-order aspherical surface constant.

The paraxial curvature radius r of a spherical surface can be expressed by the earlier mentioned mathematical equation (d).

$$r=1/(2 \cdot C_2+1/R)$$

TABLE 2 f = 29 to 77.6
F NO = 2.9
2ω = 75.7° to 30.3°

| Surface No. | r | d | Abbe NO | N(d) |
|---|---|---|---|---|
|  |  | 0.0000 |  | 1.000000 |
| 1) | 271.4309 | 2.0000 | 37.35 | 1.834000 |
| 2) | 108.7819 | 10.0000 | 82.52 | 1.497820 |
| 3) | −260.4901 | 0.1000 |  | 1.000000 |
| 4) | 53.5997 | 7.0000 | 82.52 | 1.497820 |
| 5) | 99.9946 | (d5 = variable) |  | 1.000000 |
| *6) | 146.2345 | 1.7000 | 43.35 | 1.840421 |
| 7) | 19.1783 | 6.0000 |  | 1.000000 |
| 8) | 97.7506 | 1.8000 | 40.90 | 1.796310 |
| 9) | 43.7419 | 4.5000 |  | 1.000000 |
| 10) | 66.9585 | 9.0000 | 27.61 | 1.755200 |
| 11*) | −19.5475 | 1.7000 | 49.45 | 1.772789 |
| 12) | −76.6193 | 2.5000 |  | 1.000000 |
| *13) | −29.2863 | 1.7000 | 43.35 | 1.840421 |
| 14) | −201.8791 | 2.5000 | 64.10 | 1.516800 |
| 15) | −64.3344 | (d15 = variable) |  | 1.000000 |
| 16) | aperture stop. | 3.0000 |  | 1.000000 |
| 17) | −207.9098 | 4.5000 | 64.10 | 1.516800 |
| 18) | −53.0815 | 0.1000 |  | 1.000000 |

TABLE 2-continued

| | | | | |
|---|---|---|---|---|
| 19) | 143.8793 | 5.0000 | 64.10 | 1.516800 |
| 20) | −102.5909 | 0.1000 | | 1.000000 |
| 21) | 82.8636 | 8.5000 | 82.52 | 1.497820 |
| 22) | −45.7961 | 2.0000 | 25.50 | 1.804581 |
| 23) | −181.8396 | (d23 = variable) | | 1.000000 |
| 24) | 48.1959 | 7.0000 | 58.54 | 1.612720 |
| 25) | −410.9511 | 1.8000 | 53.93 | 0.713000 |
| 26) | 66.2294 | 7.0000 | | 1.000000 |
| 27) | flare stop | 5.5500 | | 1.000000 (Variable Diameter) |
| 28) | 82.8754 | 2.0000 | 45.37 | 1.796681 |
| 29) | 46.0863 | 3.0000 | | 1.000000 |
| 30) | 243.6005 | 7.0000 | 58.54 | 1.612720 |
| 31) | −60.6420 | 0.1000 | | 1.000000 |
| 32) | 56.8389 | 10.0000 | 70.41 | 1.487490 |
| 33) | −59.1395 | 2.6500 | | 1.000000 |
| 34) | −43.8742 | 2.0000 | 43.35 | 1.840421 |
| 35) | −324.6336 | (bf) | | 1.000000 |

Flare stop diameter (surface 27)    Fai = 29.06 to 29.06 to 35.54
Aperture stop diameter (surface 16)    Fai = 25.30 to 29.40 to 32.50

| Surface | | k | $C_2$ | $C_4$ |
|---|---|---|---|---|
| (1) | 6 | 25.1393 | $0.00000E+00$ | $3.41650E-06$ |

| | $C_6$ | $C_8$ | $C_{10}$ |
|---|---|---|---|
| | $-6.63940E-09$ | $2.83360E-12$ | $-2.13550E-16$ |

| Surface | | k | $C_2$ | $C_4$ |
|---|---|---|---|---|
| (2) | 13 | −0.7942 | $0.00000E+00$ | $-3.33400E-06$ |

| | $C_6$ | $C_8$ | $C_{10}$ |
|---|---|---|---|
| | $9.49270E-09$ | $-4.64130E-12$ | $2.43390E-14$ |

(Variable Separations)

| | 1-POS | 2-POS | 3-POS | 4-POS | 5-POS | 6-POS |
|---|---|---|---|---|---|---|
| F&β | 29.00000 | 50.00000 | 77.60000 | −0.3333 | −0.03333 | −0.03333 |
| D0 | 0.0000 | 0.000 | 0.0000 | 819.3889 | 1410.1899 | 2181.1889 |
| 1 d5: | 0.82610 | 22.24225 | 42.07060 | 0.82610 | 22.24225 | 42.07060 |
| 2 d15: | 19.46506 | 7.31749 | 1.45049 | 20.31051 | 7.96035 | 2.08379 |
| 3 d23: | 12.07313 | 4.19484 | 5.05013 | 11.22768 | 3.55198 | 4.41683 |
| 4 bf: | 38.33520 | 60.11634 | 76.15138 | 38.33520 | 60.11634 | 76.15138 |

| | 7-POS | 8-POS | 9-POS |
|---|---|---|---|
| F&β | −0.08097 | −0.13364 | −0.19385 |
| D0 | 307.5005 | 284.3292 | 253.4774 |
| 1 d5: | 0.82610 | 22.24225 | 42.07060 |
| 2 d15: | 21.53818 | 9.90646 | 5.13798 |
| 3 d23: | 10.00001 | 1.60587 | 1.36264 |
| 4 bf: | 38.33520 | 60.11634 | 76.16138 |

Corresponding Values

| | |
|---|---|
| (14) | $|ASc-Sc|/fw = 0.01014$ ($\phi = 27.88$ mm) |
| (15) | $|ASa-Sa|/fw = 0.01067$ ($\phi = 36.7$ mm) |
| (16) | nbn − nbp = 0.01759 |
| (17) | X2/fw = 0.441 (object side is positive) |
| (18) | f2/fw = −0.6897 |
| (19) | f2a/f2 = 0.9874 |
| (20) | f2c/f2 = 2.7103 |
| (21) | f2b/f2 = −2.5211 |
| (22) | nCp − nCn = −0.3236 |

Figures 7, 7A, 7B:
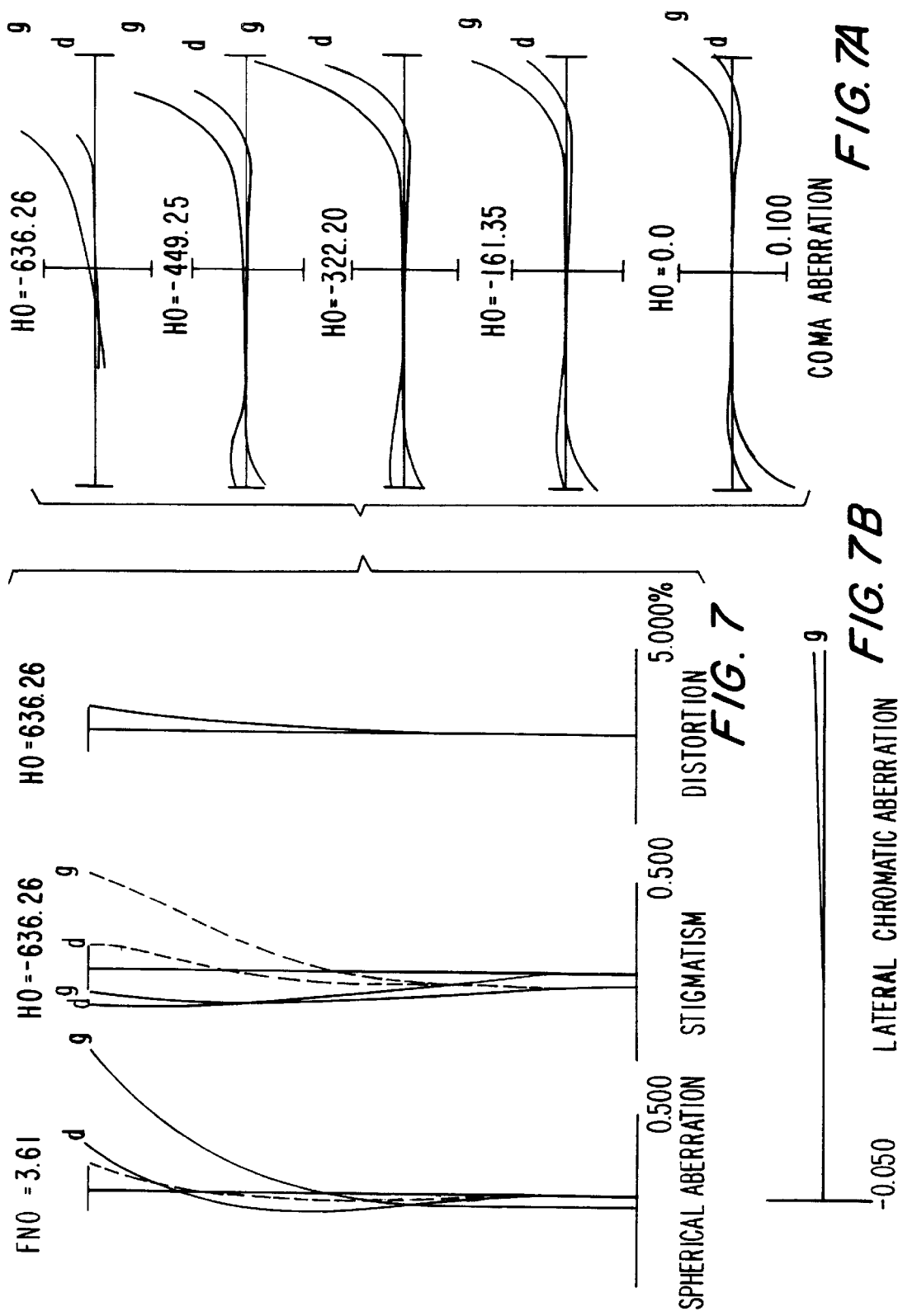
FIG. 7 is a diagram showing various aberrations of the zoom lens of Embodiment 1 in the mid focal length state at 1/30×.
Figure 8:
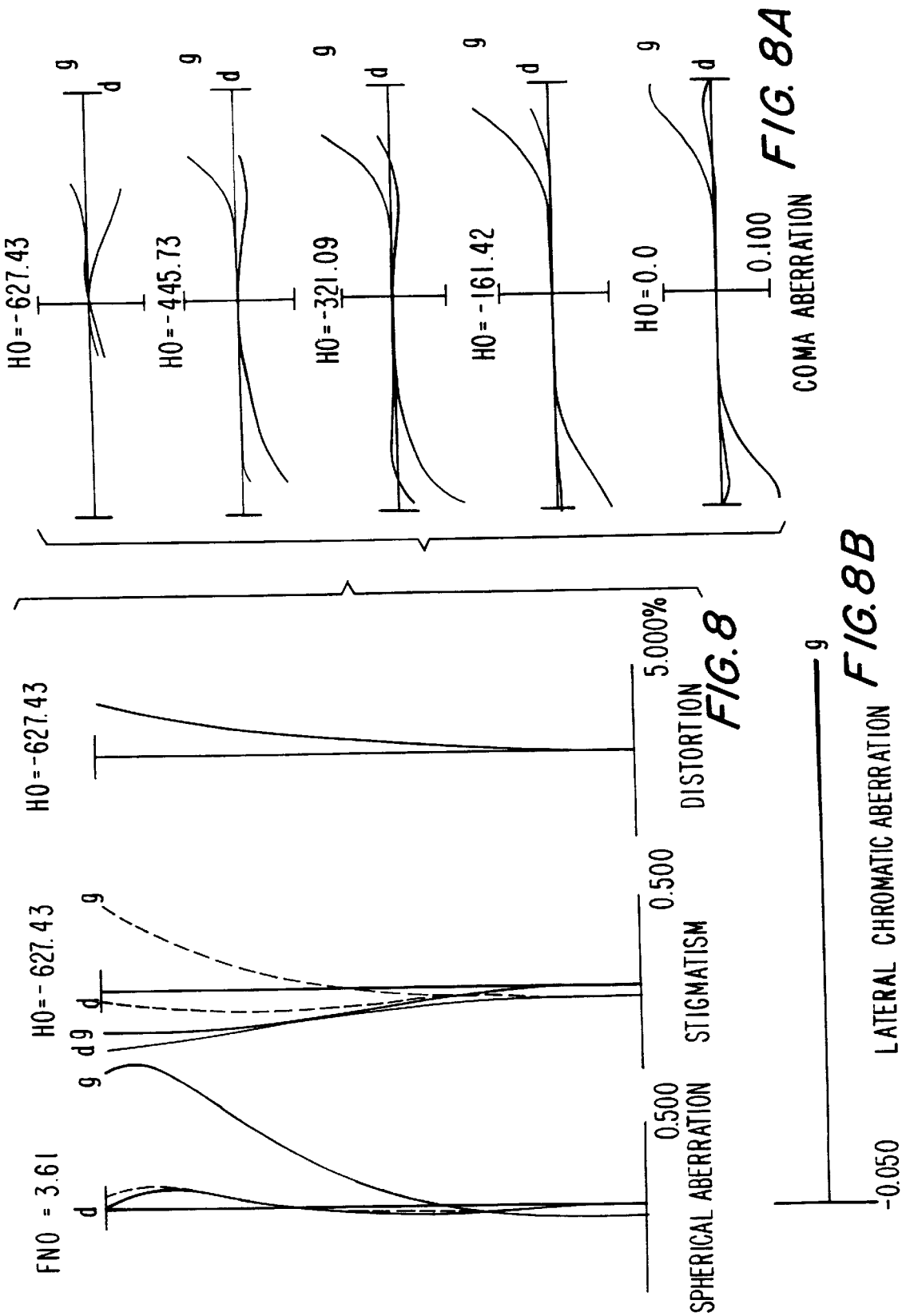
FIG. 8 is a diagram showing various aberrations of the zoom lens of Embodiment 1 at the telephoto end at 1/30×.

FIGS. 3 through 8 are diagrams showing various aberrations of Embodiment 1 of the present invention. That is, FIG. 3 is a diagram showing various aberrations in the state in which an object at an infinitely far distance is focused at the wide-angle end. FIG. 4 is a diagram showing aberration in the state in which an object at the middle range is focused. FIG. 5 is a diagram showing various aberrations in the state in which an object at the infinitely far end is focused at the telephoto end. FIG. 6 is a diagram showing various aberrations at the wide-angle end at 1/30×. FIG. 7 is a diagram showing various aberrations at the mid focal length state at 1/30×. FIG. 8 is a diagram showing various aberrations at the telephoto end at 1/30×.

In each of the aberration diagrams, FNO is the F number, A is the ½ field angle, HO or y is the object height, d is the d line ($\lambda$=587.6 nm), and g is the g line ($\lambda$=435.8 nm). In each of the diagrams showing astigmatism, a solid line shows the sagiftal image plane, a broken line shows the meridional image plane. In addition, in the aberration diagrams showing spherical aberration, a broken line shows the sine condition.

Figure 9:
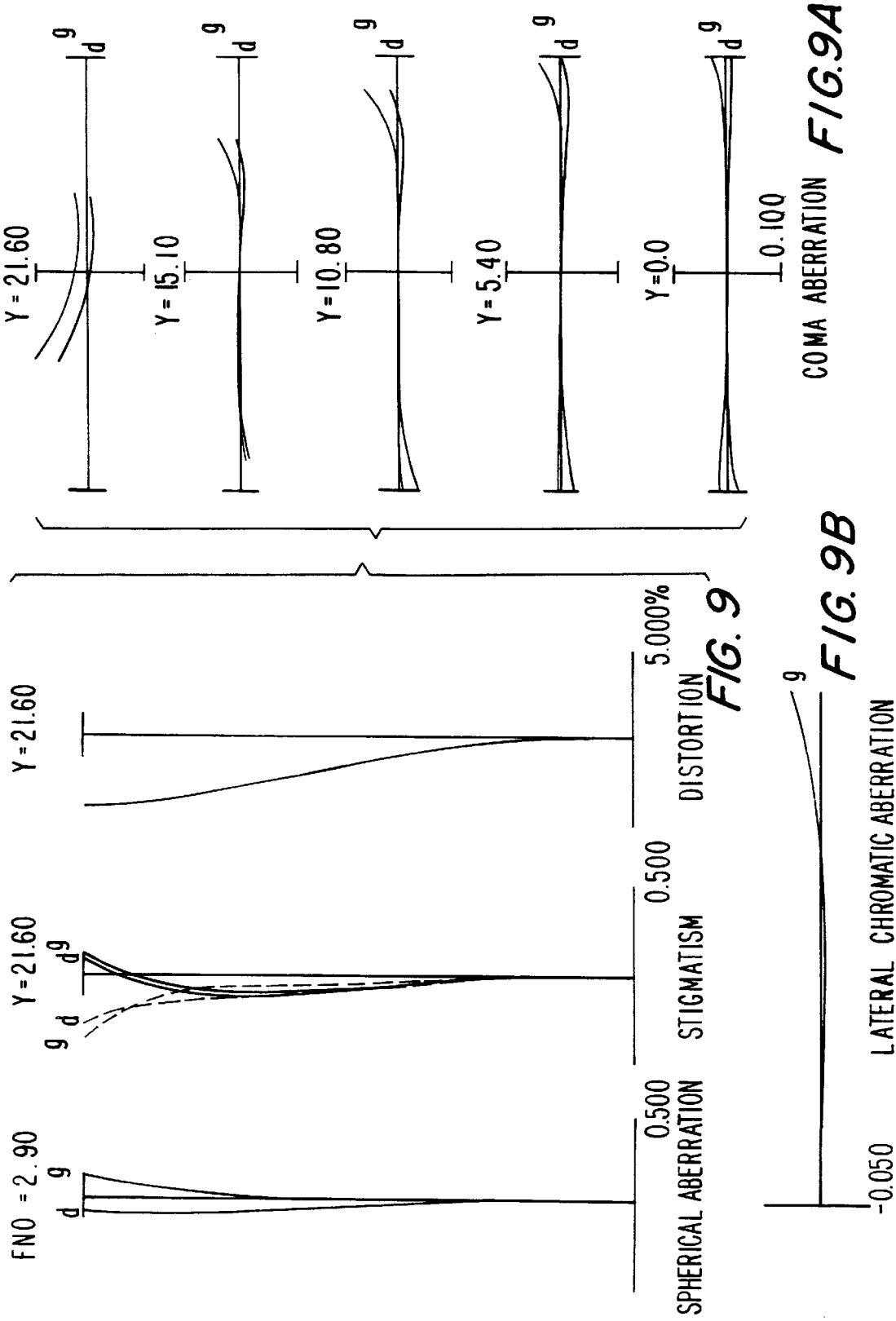
FIG. 9 is a diagram showing various aberrations of the zoom lens system of Embodiment 2 measured at the wide-angle end in the infinitely far objective length state.
Figure 10:
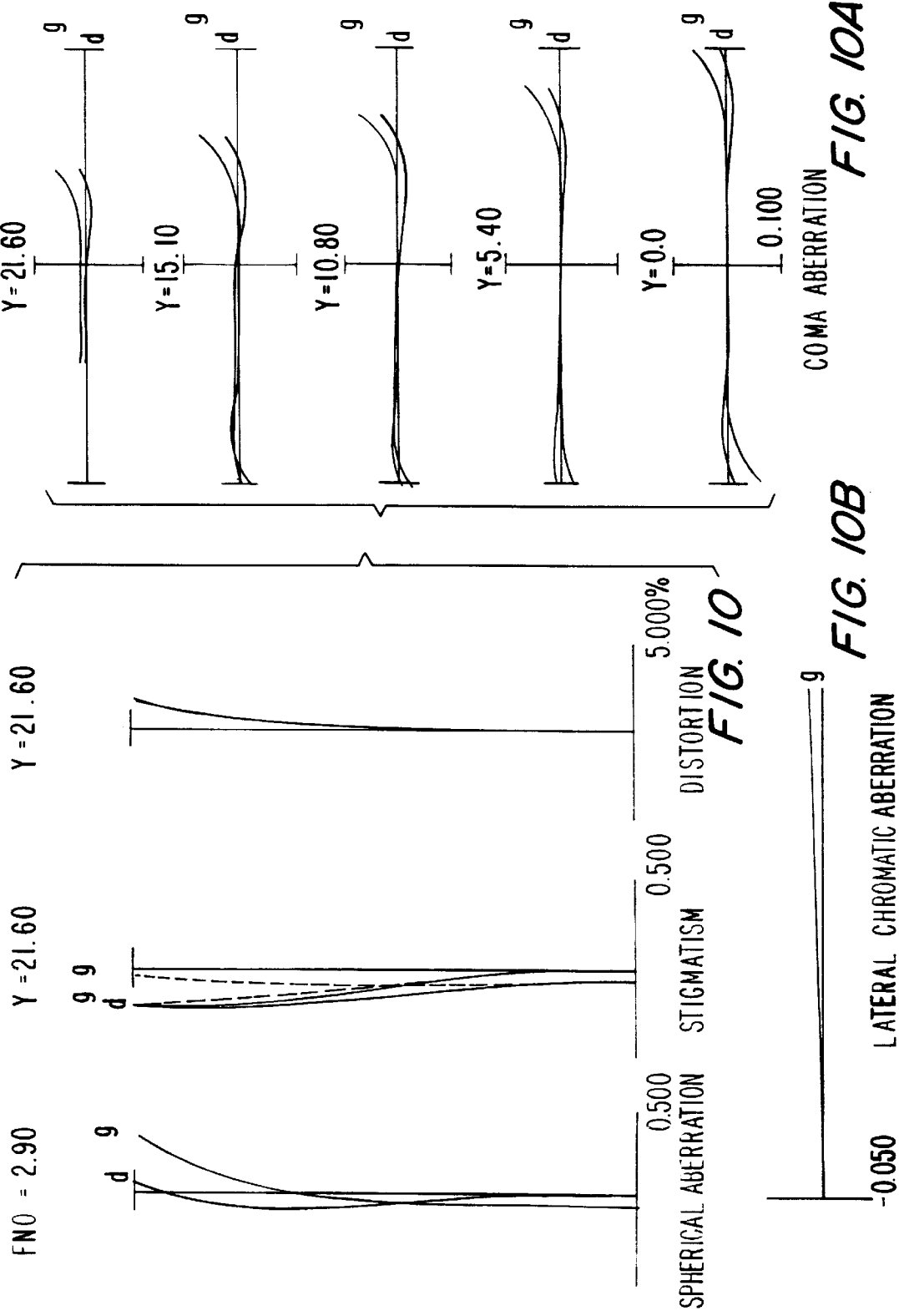
FIG. 10 is a diagram showing various aberrations of the zoom lens system of Embodiment 2 measured at the infinitely far objective distance in the mid focal length state.
Figure 11:
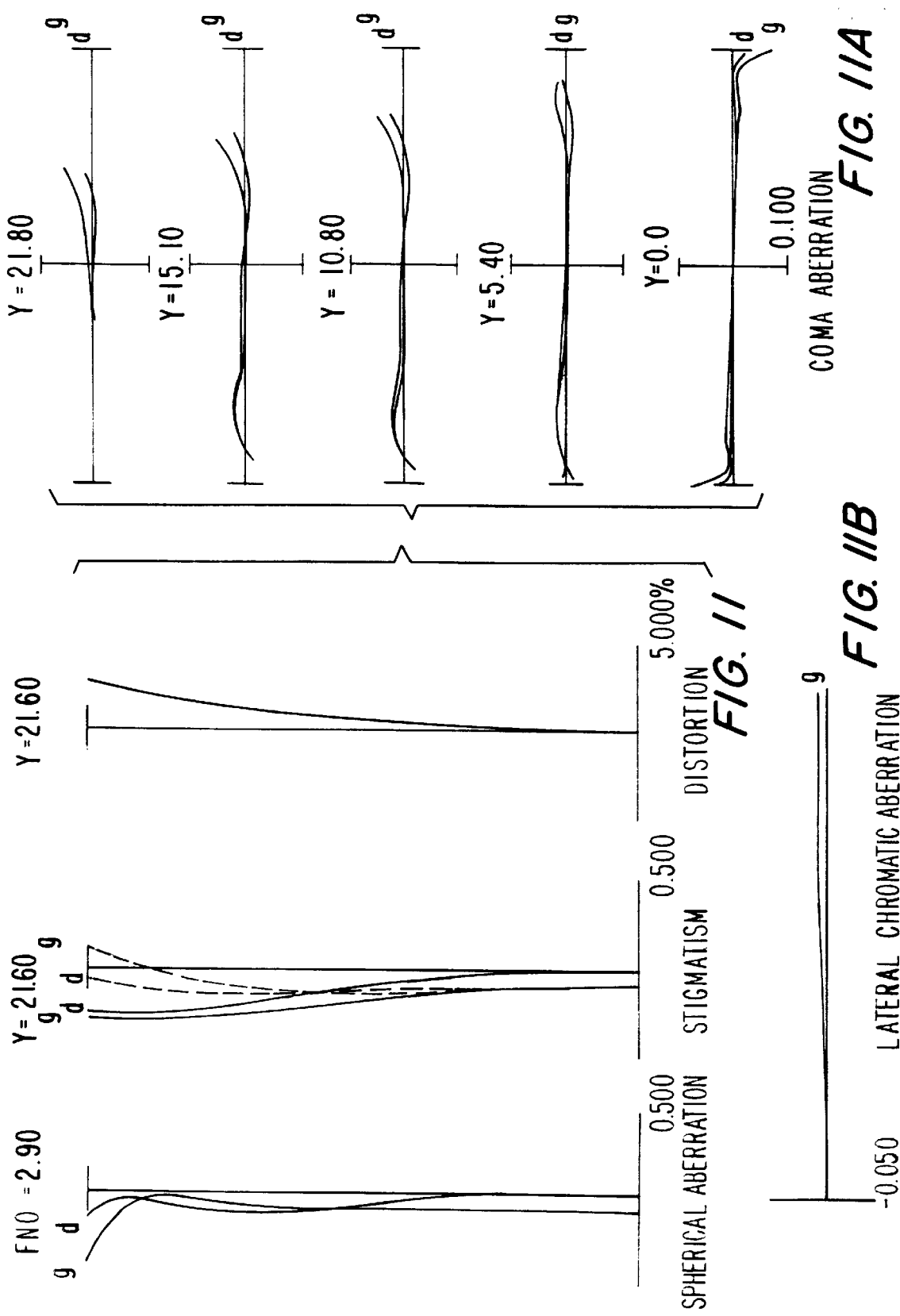
FIG. 11 is a diagram showing various aberrations of the zoom lens system of Embodiment 2 measured at the telephoto end in the infinitely far objective distance state.

FIGS. 9 through 11 are diagrams showing various aberrations of Embodiment 2. That is, FIG. 9 is a diagram showing various aberrations in the state in which an object at an infinitely far distance is focused at the wide-angle end. FIG. 10 is a diagram showing aberration in the state in which an object at the middle focal length is focused. FIG. 11 is a diagram showing various aberrations in the state in which an object at the infinitely far end is focused at the telephoto end.

It is apparent from the aberration diagram shown in FIG. 3 that various aberrations are corrected covering a large field angle at the wide-angle end. It is apparent from FIGS. 4 and 5, which are the aberrations diagrams that various aberrations are corrected as is the case at the wide-angle end.

Also, it is clear from FIG. 6 that various aberrations are corrected throughout a large field angle at the wide-angle end. Aberration diagrams in FIGS. 4 and 5 show little fluctuation at a near distance. As is the case at the wide-angle end, all aberrations are corrected with little fluctuation at the near distance.

As described, in Embodiment 1, all aberrations are corrected at all focusing states and objective distances.

EMBODIMENTS 3 & 4

It should be noted that the conditions which should desirably be fulfilled in Embodiment 1 also apply to Embodiment 3 and the conditions described in Embodiment 2 also apply to Embodiment 4. The aspherical surface equations (a), (b) and (c) also apply with the conic constants k, $k_c$ and $k_a$ applicable to the corresponding lens component in lens group G2 and/or lens group G3 or G4.

Figure 12:
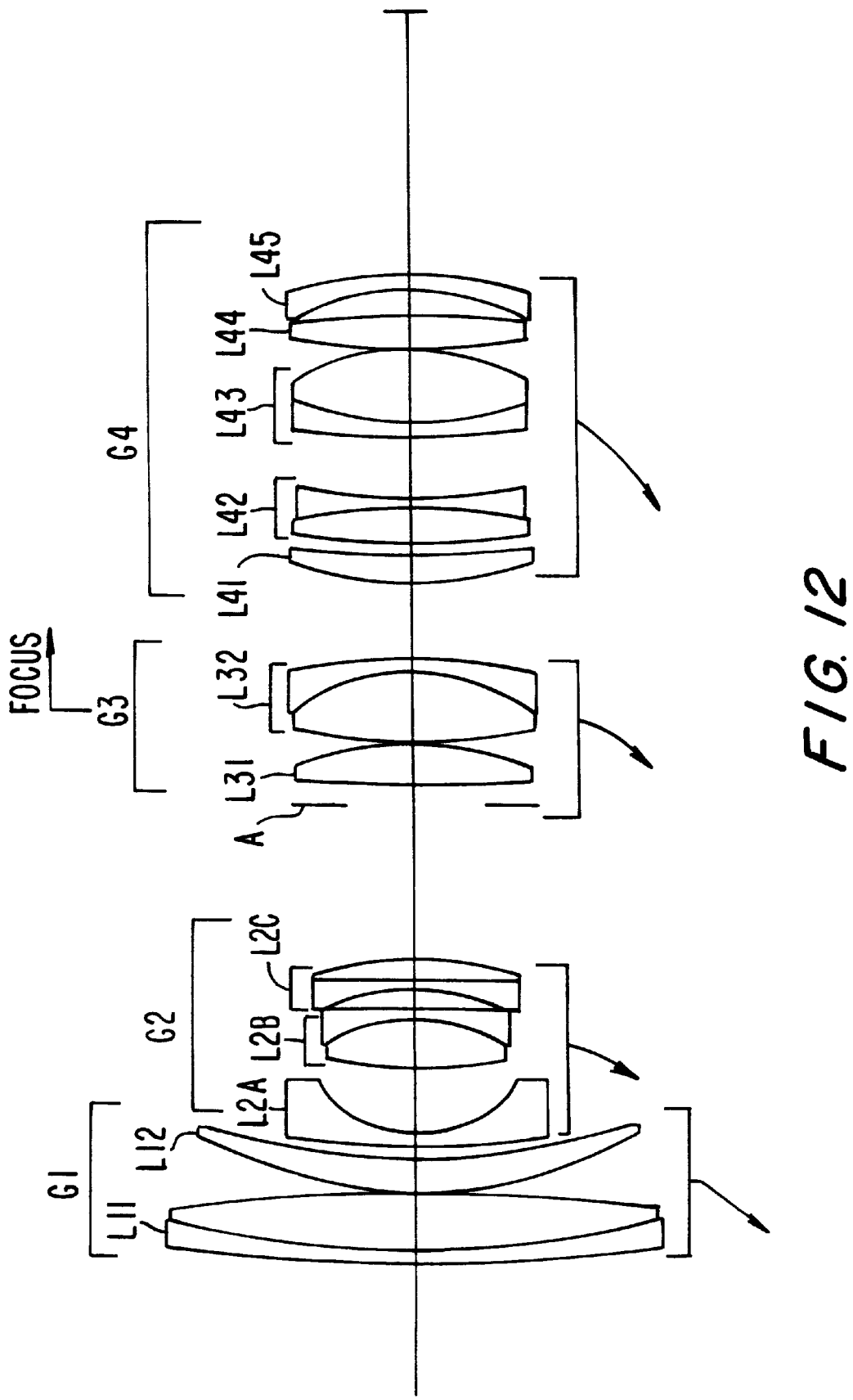
FIG. 12 is a diagram showing a lens layout of the zoom lens of Embodiment 3 of the present invention.
Figure 13:
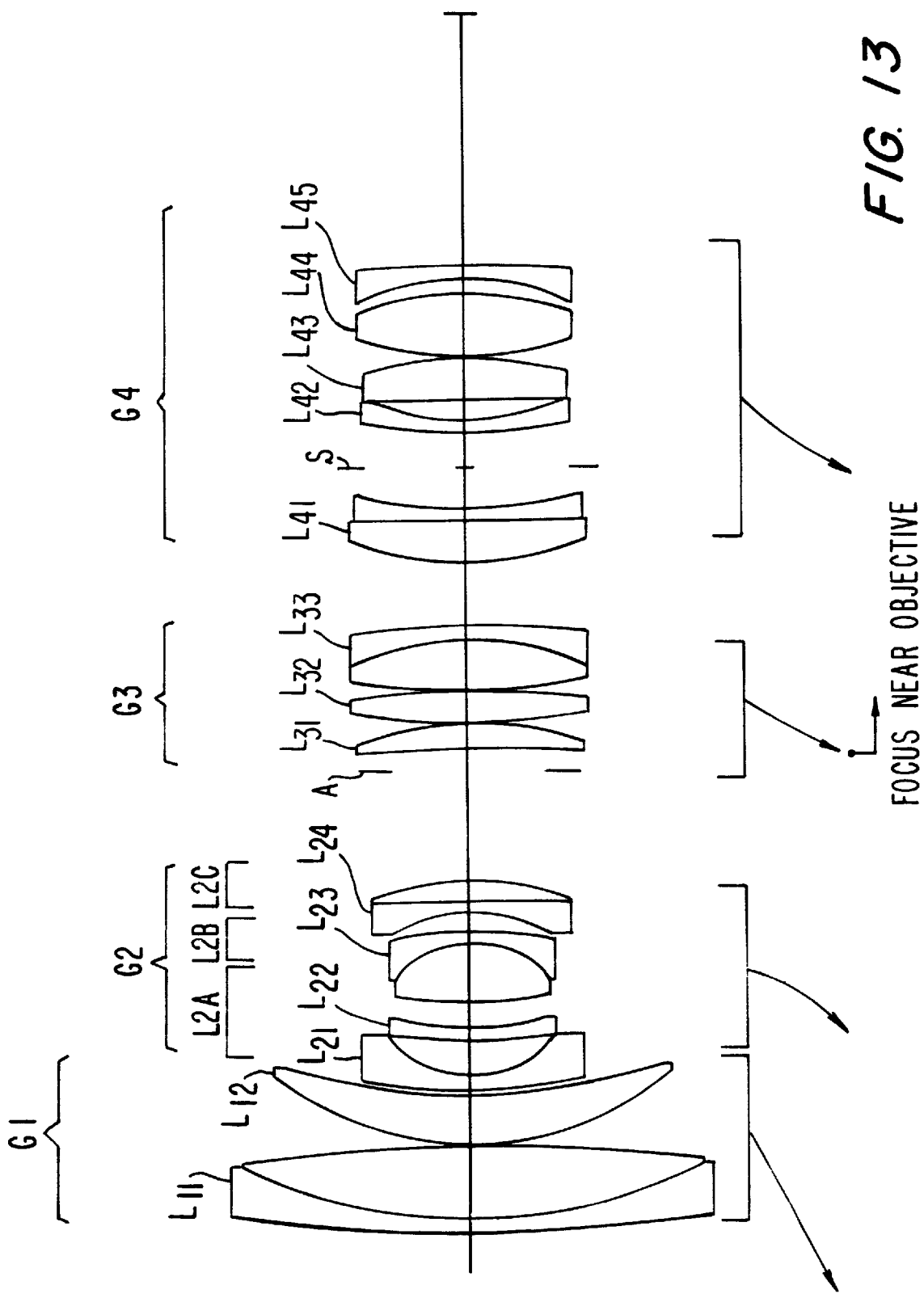
FIG. 13 is a diagram showing a lens layout and movement profile of the zoom lens system of Embodiment 4 of the present invention.

FIGS. 12 and 13 respectively correspond and are diagrams showing lens layouts and the movement profiles of the zoom lens systems of Embodiments 3 and 4 of the present invention.

In the zoom lens system of Embodiment 4, as shown in FIG. 13, zoom lens system comprises:
in order from the object end,
  a first lens group, G1 having a positive refractive power;
  a second lens group G2 having a negative refractive power;
  a third lens group G3 having a positive refractive power; and
  a fourth lens group G4 having positive refractive power.
More specifically, in the zoom lens systems shown in FIGS. 12 and 13, the first lens group G1 comprises, in order from the object end,
  a positive cemented lens L11 made up of a negative meniscus lens having a convex surface facing toward the object end and a bi-convex lens; and
  a positive meniscus lens L12 having a convex surface facing toward the object end.
The second lens group G2 of the zoom lens systems in Embodiments 3 and 4 comprise:
in order from the object end,
  a negative meniscus lens L2A having an aspherical surface facing toward the image end and having a convex surface facing toward the object end;
  a positive cemented lens L2B made up of a bi-convex lens and a negative meniscus lens having a concave surface facing toward the object end; and
  a negative cemented lens L2C made up of a bi-concave lens having an aspherical surface at the object end and a bi-convex lens, in Embodiment 3; or the second lens group G2 comprises: in order from the object end,
  a negative meniscus aspherical surface lens L21 having an aspherical surface facing toward the object end,
  a negative meniscus lens L22 having a convex surface facing toward the object end;
  a positive cemented lens L23 made up of a positive lens having a convex surface facing toward the object end and a negative meniscus lens having a convex surface facing toward the image end; and
  a negative cemented lens L24 made up of a bi-convex aspherical surface lens having a convex surface facing toward the object end and a bi-convex lens, in Embodiment 4.

Lens L2A is constructed of the negative meniscus aspherical surface lens L21 and the negative meniscus lens L22. Lens L2B is constructed of the positive composite lens L23. Lens L2c is constructed of the negative composite lens L24. Aperture stop A is formed near the object end in the third lens group G3 in Embodiment 4.

The third lens group G3 of Embodiments 3 and 4 comprise:
in order from the object end,
  a bi-convex lens L31 and
  a positive cemented lens L32 made up of a bi-convex lens and a negative meniscus lens having a concave surface facing toward the object end, in Embodiment 3; or
  the third lens group G3 comprises:
in order from the object end,
  a positive meniscus lens L31 having a convex surface facing toward the image end;
  a bi-convex lens L32; and
  a positive cemented lens L33 made up of a bi-convex lens and a negative meniscus lens having a concave surface facing toward the object end, in Embodiment 4.

The fourth lens group G4 of Embodiments 3 and 4 comprise:
in order from the object end,
  a positive meniscus lens L41 having a convex surface facing toward the object end;
  a negative cemented lens L42 made up of a bi-convex lens and a bi-concave lens;
  a positive cemented lens L43 made up of a negative meniscus lens having a convex surface facing toward the object end and a bi-convex lens;
  a bi-convex lens L44; and
  a negative meniscus lens L45 having a concave surface facing toward the object end, in Embodiment 3; or
  the fourth lens group G4 comprises:
in order from the object end,
  a positive cemented lens L41 made up of a positive meniscus lens having a convex surface facing toward the object end and a negative meniscus lens having a convex surface facing toward the object end;
  a flare stopper S;
  a negative meniscus lens L42 having a convex surface facing toward the object end;
  a bi-convex lens L43;
  a bi-convex lens L44; and
  a negative meniscus lens L45 having a convex surface facing toward the image end, in Embodiment 4.

Note that an aperture stop A is arranged between the second lens group G2 and the third lens group G3. The aperture stop A moves integral with the third lens group G3 during magnification, in Embodiment 3.

FIGS. 12 and 13 show the lens layout at the wide-angle end of Embodiments 3 and 4. When magnified toward the telephoto end, all lens groups move toward the object end such that the spatial distance between the first lens group G1 and the second lens group G2 increases while that between the second lens group G2 and the third lens group G3 decreases.

In addition, when changing the focus from an object at an infinitely far distance to one at a near distance, the third lens group G3 and an aperture stop A move integrally toward the image end along the optical axis.

WORKING EXAMPLES OF EMBODIMENTS 3 & 4

Tables 3 and 4 respectively correspond and show various values of the Embodiments 3 and 4 of the present invention. In Table 3, f is the focal length, F NO is the F number, $2\omega$ is the field angle, Bf is the back focus, $\beta$ is the magnification ratio, DO is the object distance (the distance between the surface at the utmost object end and the object measured along the optical axis). The surface number is the number of the lens surfaces counted from the object end along the direction light is progressing. "d" is the lens separation between each of the lenses. "r" is the curvature radius (paraxial curvature radius in case of an aspherical surface). "n" is the index of refraction on the d line ($\lambda$=587.6 nm), and "v" is the Abbe number.

TABLE 3 f = 29 to 102
F NO = 2.9 to 3.6
$2\omega$ = 76.2 to 23.2°

| Surface No. | r | d | v | n |
|---|---|---|---|---|
| 1) | 227.5952 | 2.0000 | 25.50 | 1.804581 |
| 2) | 128.3164 | 7.5000 | 82.52 | 1.497820 |
| 3) | −327.5485 | 0.1000 | | |
| 4) | 57.1487 | 5.6000 | 82.52 | 1.497820 |
| 5) | 97.6515 | (d5 = variable) | | |
| 6) | 116.5721 | 1.7000 | 49.45 | 1.772789 |
| 7*) | 15.3058 | 9.5846 | | |
| 8) | 66.3316 | 7.0000 | 28.19 | 1.740000 |
| 9) | −21.6039 | 1.4000 | 49.45 | 1.772789 |
| 10) | −306.6468 | 2.8000 | | |
| 11*) | −28.1291 | 1.4000 | 49.45 | 1.772789 |
| 12) | 2082.5010 | 3.0000 | 64.10 | 1.516800 |
| 13) | −44.8556 | (d13 = variable) | | |
| 14) | aperture stop | 2.5000 | | |
| 15) | 260.8368 | 5.5000 | 58.90 | 1.518530 |
| 16) | −49.6218 | 0.1000 | | |
| 17) | 62.8903 | 10.0000 | 61.09 | 1.589130 |
| 18) | −32.3570 | 2.0000 | 28.56 | 1.795040 |
| 19) | −117.0664 | (d19 = variable) | | |
| 20) | 57.3096 | 3.8000 | 58.90 | 1.518230 |
| 21) | 118.3217 | 2.0000 | | |
| 22) | 92.3253 | 5.0000 | 64.10 | 1.516800 |
| 23) | −98.6964 | 1.6000 | 45.37 | 1.796681 |
| 24) | 92.8815 | 9.0151 | | |
| 25) | 260.8967 | 1.7000 | 43.35 | 1.840421 |
| 26) | 42.1391 | 10.0000 | 54.55 | 1.514510 |
| 27) | −36.8490 | 0.1000 | | |
| 28) | 81.0309 | 5.0000 | 64.10 | 1.516800 |
| 29) | −149.2401 | 4.0000 | | |
| 30) | −34.9712 | 2.0000 | 49.45 | 1.772789 |
| 31) | −84.5986 | (Bf) | | |

Aspherical Surface Data

| | k | $C_2$ | $C_4$ |
|---|---|---|---|
| Surface 7 | 0.9470 | 0.0000 | −8.82590 × $10^{-6}$ |

| | $C_6$ | $C_8$ | $C_{10}$ |
|---|---|---|---|
| | −2.90580 × $10^{-8}$ | 2.48060 × $10^{-12}$ | −5.62310 × $^{-13}$ |

| | k | $C_2$ | $C_4$ |
|---|---|---|---|
| Surface 11 | 0.1111 | 0.0000 | 3.98310 × $10^{-6}$ |

| | $C_6$ | $C_8$ | $C_{10}$ |
|---|---|---|---|
| | 1.66440 × $10^{-8}$ | 2.65860 × $10^{-11}$ | 5.51280 × $10^{-14}$ |

(Variable Separation during Magnification)

| f | 29.00000 | 50.00000 | 102.00000 |
|---|---|---|---|
| D0 | ∞ | ∞ | ∞ |
| d5 | 1.83627 | 22.72541 | 53.09288 |

TABLE 3-continued

| | | | |
|---|---|---|---|
| d13 | 22.32971 | 10.19405 | 1.34451 |
| d19 | 11.31896 | 3.03864 | 4.67401 |
| Bf | 37.98123 | 61.16613 | 88.18752 |

(Variable Separation during the Focusing Motion)

| | | | | | | |
|---|---|---|---|---|---|---|
| β | −0.03333 | −0.03333 | −0.03333 | −0.06102 | −0.10242 | −0.18948 |
| D0 | 811.7788 | 1405.1221 | 2864.7992 | 416.9342 | 393.2761 | 343.1016 |
| d5 | 1.83627 | 22.72541 | 53.09288 | 1.83627 | 22.72541 | 53.09288 |
| d13 | 23.32611 | 10.86273 | 1.97746 | 24.17644 | 12.26510 | 4.96317 |
| d19 | 10.32256 | 2.36996 | 4.04106 | 9.47223 | 0.96759 | 1.05535 |
| Bf | 37.98702 | 61.17190 | 88.19330 | 38.00074 | 61.22108 | 88.37564 |

(Corresponding values)

| | | |
|---|---|---|
| (1) | (Rar + Raf)/(Rar − Raf) = | −1.30 |
| (2) | dAB/d2 = | 0.357 |
| (3) | nbp − nbn = | −0.0328 |
| (4) | f2/fT = | −0.196 |
| (5) | f3/fT = | 0.448 |
| (6) | fa/f2 = | 1.148 |
| (7) | fb/f2 = | −4.13 |
| (8) | ka = | 0.9470 |
| (9) | kC = | 0.1111 |
| (10) | (Rcr + Rcf)/(Rcr − Rcf) = | 4.36 |
| (11) | dBC/d2 = | 0.104 |
| (12) | ncp − ncn = | −0.2560 |
| (13) | n3p − n3n = | −0.2059 |

TABLE 4 f = 29 to 77.6
F NO = 2.9
2ω = 76° to 30.4°

| | r | d | Abbe NO | N(d) |
|---|---|---|---|---|
| | | 0.0000 | | 1.000000 |
| 1) | 307.9976 | 2.0000 | 35.72 | 1.902650 |
| 2) | 85.4992 | 12.0000 | 65.42 | 1.603001 |
| 3) | −276.5687 | 0.1000 | | 1.000000 |
| 4) | 50.3496 | 8.5000 | 65.42 | 1.603001 |
| 5) | 107.0732 | (d5 = variable) | | 1.000000 |
| *6) | 146.0277 | 1.7000 | 43.35 | 1.840421 |
| 7) | 18.0859 | 6.0000 | | 1.000000 |
| 8) | 103.2378 | 1.8000 | 40.90 | 1.796310 |
| 9) | 46.1503 | 4.6950 | | 1.000000 |
| 10) | 82.6765 | 9.0000 | 27.61 | 1.755200 |
| 11) | −16.4335 | 1.7000 | 49.45 | 1.772789 |
| 12) | −97.0615 | 3.0603 | | 1.000000 |
| *13) | −27.6059 | 1.7000 | 43.35 | 1.840421 |
| 14) | 3087.5860 | 4.0000 | 64.10 | 1.516800 |
| 15) | −40.2249 | (d15 = variable) | | |
| 16) | aperture stop. | 3.0000 | | 1.000000 |
| 17) | −916.5617 | 4.5000 | 64.10 | 1.516800 |
| 18) | −54.8179 | 0.1000 | | 1.000000 |
| 19) | 116.7400 | 5.0000 | 64.10 | 1.516800 |
| 20) | −156.4603 | 0.1000 | | 1.000000 |
| 21) | 96.8495 | 8.5000 | 82.52 | 1.497820 |
| 22) | −45.1757 | 2.0000 | 25.50 | 1.804581 |
| 23) | −167.2371 | (d23 = variable) | | 1.000000 |
| 24) | 47.4731 | 7.0000 | 58.54 | 1.612720 |
| 25) | 1002.6385 | 1.8000 | 53.93 | 1.713000 |
| 26) | 67.3927 | 7.0000 | | 1.000000 |
| 27) | flare stop | 5.5500 | | 1.000000 (Variable Diameter) |
| 28) | 90.2561 | 2.0000 | 45.37 | 1.796681 |
| 29) | 44.4569 | 3.0000 | | 1.000000 |
| 30) | 322.3737 | 7.0000 | 58.54 | 1.612720 |
| 31) | −68.7440 | 0.1000 | | 1.000000 |
| 32) | 49.0927 | 10.0000 | 70.41 | 1.487490 |
| 33) | −54.0200 | 2.6500 | | 1.000000 |
| 34) | −43.4308 | 2.0000 | 43.35 | 1.840421 |
| 35) | −255.6196 | (bf) | | 1.000000 |

Flare stop diameter (Surface 27)     Fai = 28.73 to 28.73 to 34.41
Aperture stop diameter (Surface 16)  Fai = 24.44 to 28.90 to 33.60

TABLE 4-continued

| Surface | | k | $C_2$ | $C_4$ |
|---|---|---|---|---|
| (1) | 6 | 26.4596 | 0.00000E + 00 | 3.11530E − 06 |

| | $C_6$ | $C_8$ | $C_{10}$ |
|---|---|---|---|
| | −8.28450E − 09 | 3.99590E − 12 | 2.92620E − 15 |

| Surface | | k | $C_2$ | $C_4$ |
|---|---|---|---|---|
| (2) | 13 | −0.7486 | 0.00000E + 00 | −3.51260E − 06 |

| | $C_6$ | $C_8$ | $C_{10}$ |
|---|---|---|---|
| | 1.08930E − 08 | 9.45320E − 12 | 2.50030E − 14 |

(Variable Separations)

| | 1-POS | 2-POS | 3-POS | 4-POS | 5-POS | 6-POS |
|---|---|---|---|---|---|---|
| F&β | 29.00000 | 50.00000 | 77.60000 | −0.03333 | −0.03333 | −0.03333 |
| D0 | 0.0000 | 0.0000 | 0.0000 | 818.9180 | 1406.8122 | 2172.3636 |
| 1 d5: | 1.03304 | 19.92290 | 36.32344 | 1.03304 | 19.92290 | 36.32344 |
| 2d 15: | 17.68828 | 6.97927 | 1.63342 | 18.44372 | 7.62691 | 2.33884 |
| 3d 23: | 10.33446 | 3.38074 | 4.51906 | 9.57902 | 2.73310 | 3.81364 |
| 4 bf: | 40.96360 | 60.18860 | 72.27731 | 40.96360 | 60.18860 | 72.27731 |

| | 7-POS | 8-POS | 9-POS |
|---|---|---|---|
| F&β | −0.07764 | −0.12653 | −0.17908 |
| D0 | 322.4252 | 301.9732 | 277.6914 |
| 1 d5: | 1.03304 | 19.92290 | 36.32344 |
| 2 d15: | 19.45996 | 9.44826 | 5.43293 |
| 3 d23: | 8.56278 | 0.91175 | 0.71955 |
| 4 bf: | 40.96360 | 60.18860 | 72.27731 |

Corresponding Values

| (14) | $|ASc-Sc|/fw = 0.009189$ ($\phi = 25.88$ mm) |
|---|---|
| (15) | $|ASa-Sa|/fw = 0.007254$ ($\phi = 34.58$ mm) |
| (16) | $nbn - nbp = 0.01759$ |
| (17) | $X2/fw = 0.3256$ |
| (18) | $f2/fw = -0.6207$ |
| (19) | $f2a/f2 = 1.0520$ |
| (20) | $f2c/f2 = 3.4068$ |
| (21) | $f2b/f2 = -3.5519$ |
| (22) | $nCp - nCn = -03236$ |

Figure 14:
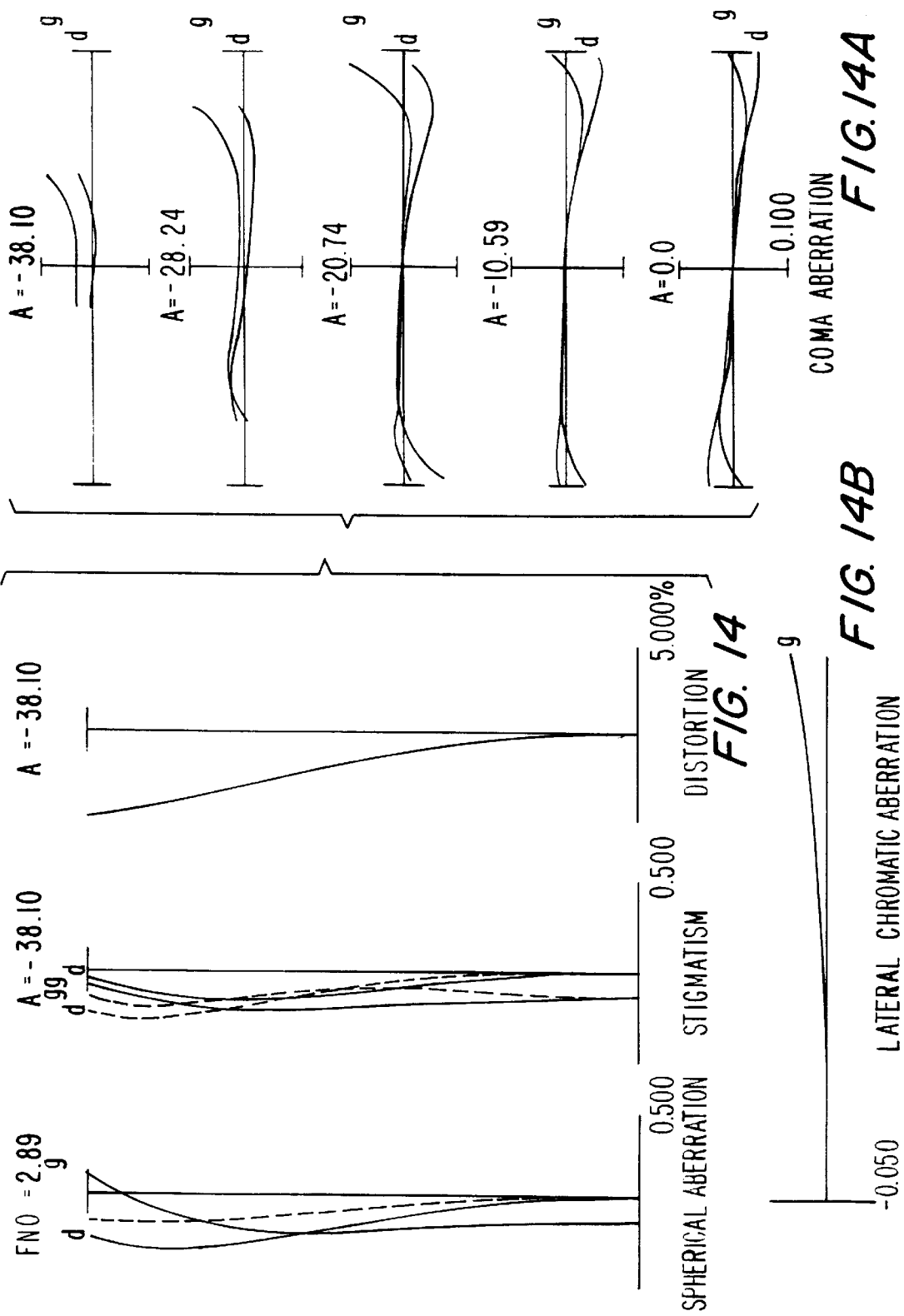
FIG. 14 is a diagram showing various aberrations of the zoom lens of Embodiment 3 measured at the wide-angle end in the infinitely far objective length state.
Figure 15:
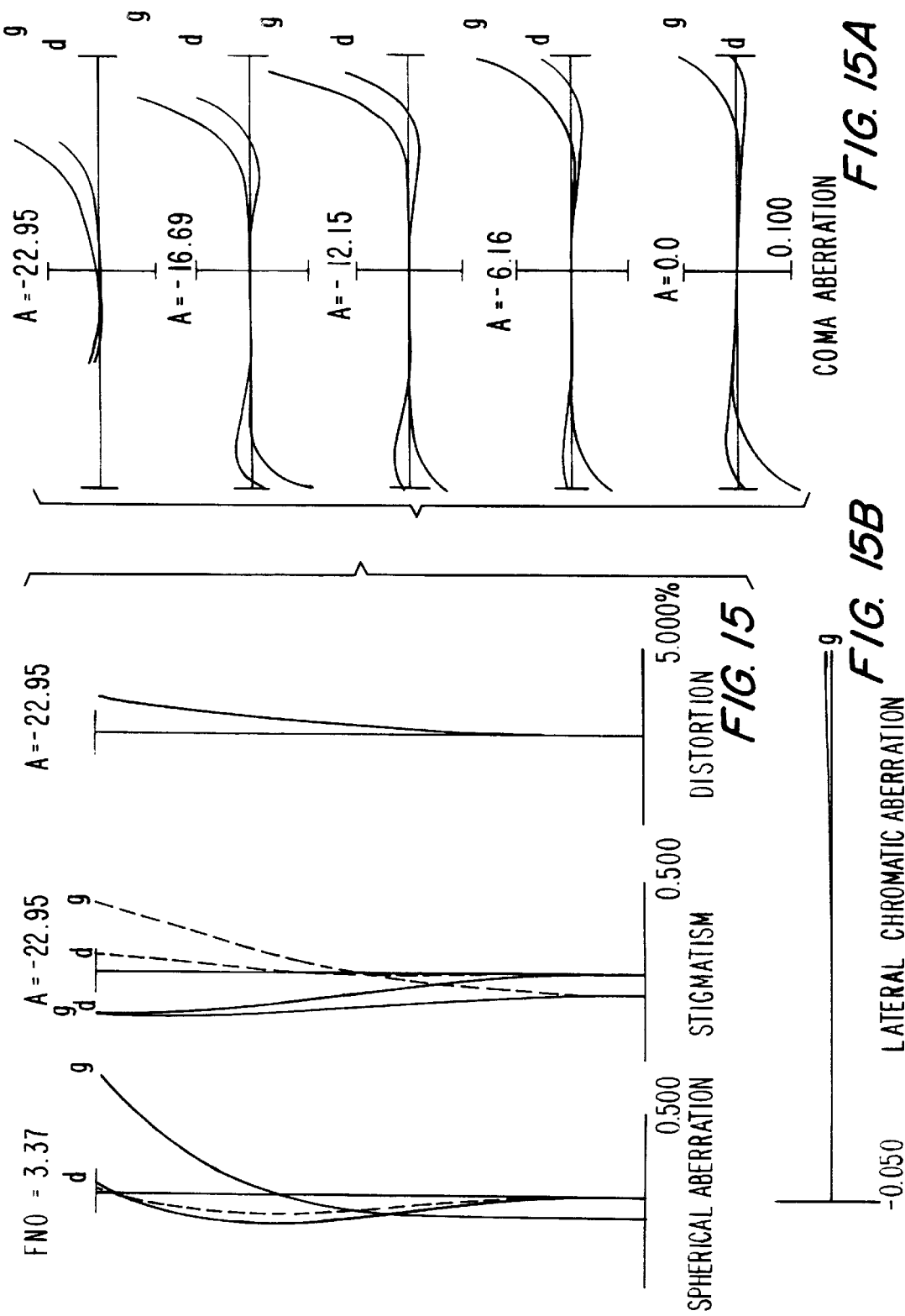
FIG. 15 is a diagram showing various aberrations of the zoom lens of Embodiment 3 measured at the infinitely far objective distance in the mid focal length state.
Figure 16:
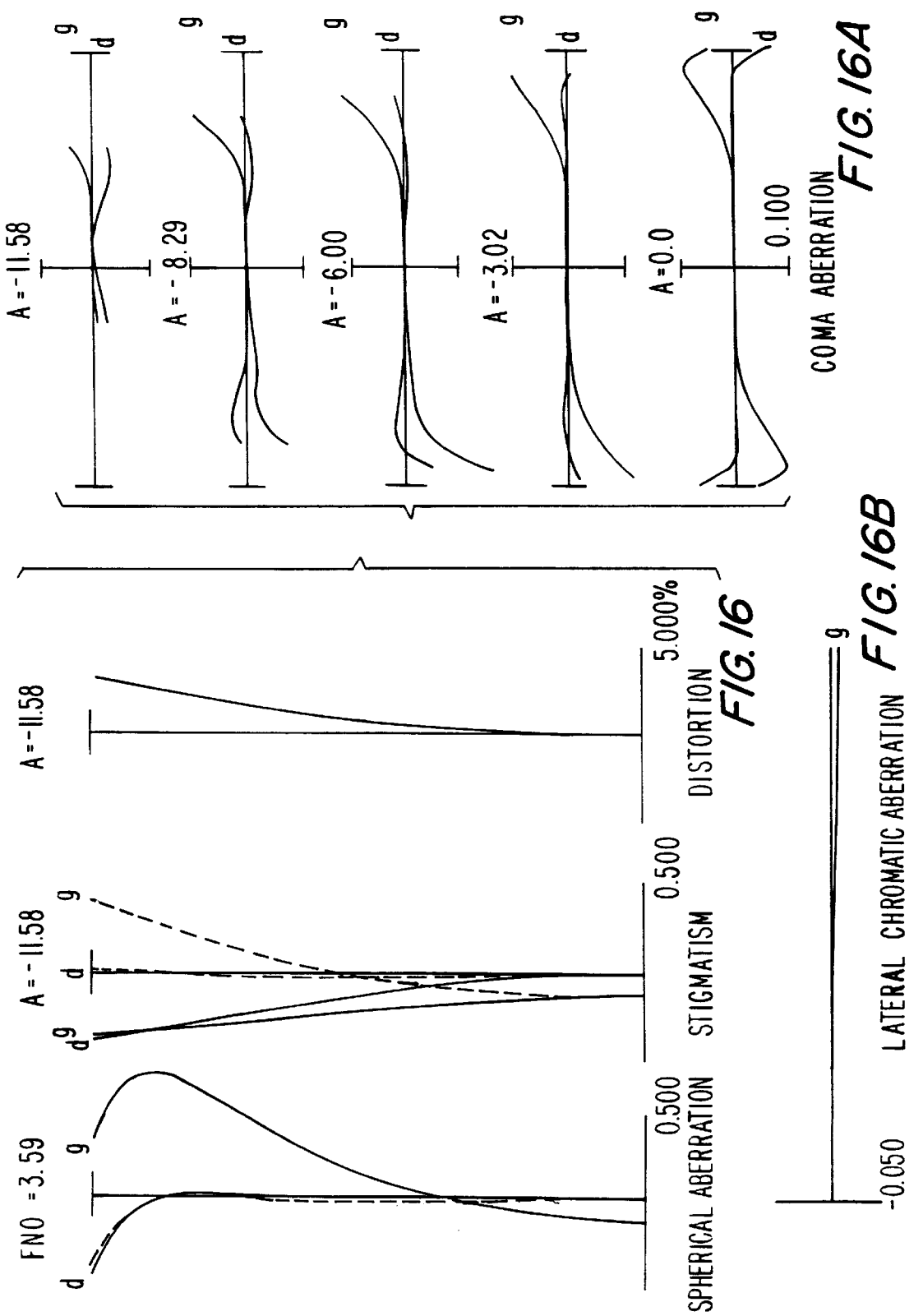
FIG. 16 is a diagram showing various aberrations of the zoom lens of Embodiment 3 at the telephoto end in the infinitely far objective distance state.

FIGS. 14, 15, and 16 are diagrams showing various aberrations of Embodiment 3. That is, FIG. 15 is a diagram showing various aberrations measured at the wide-angle end in the infinitely far objective length state. FIG. 16 is a diagram showing various aberrations at the infinitely far objective distance in the middle focal length state.

Figure 17:
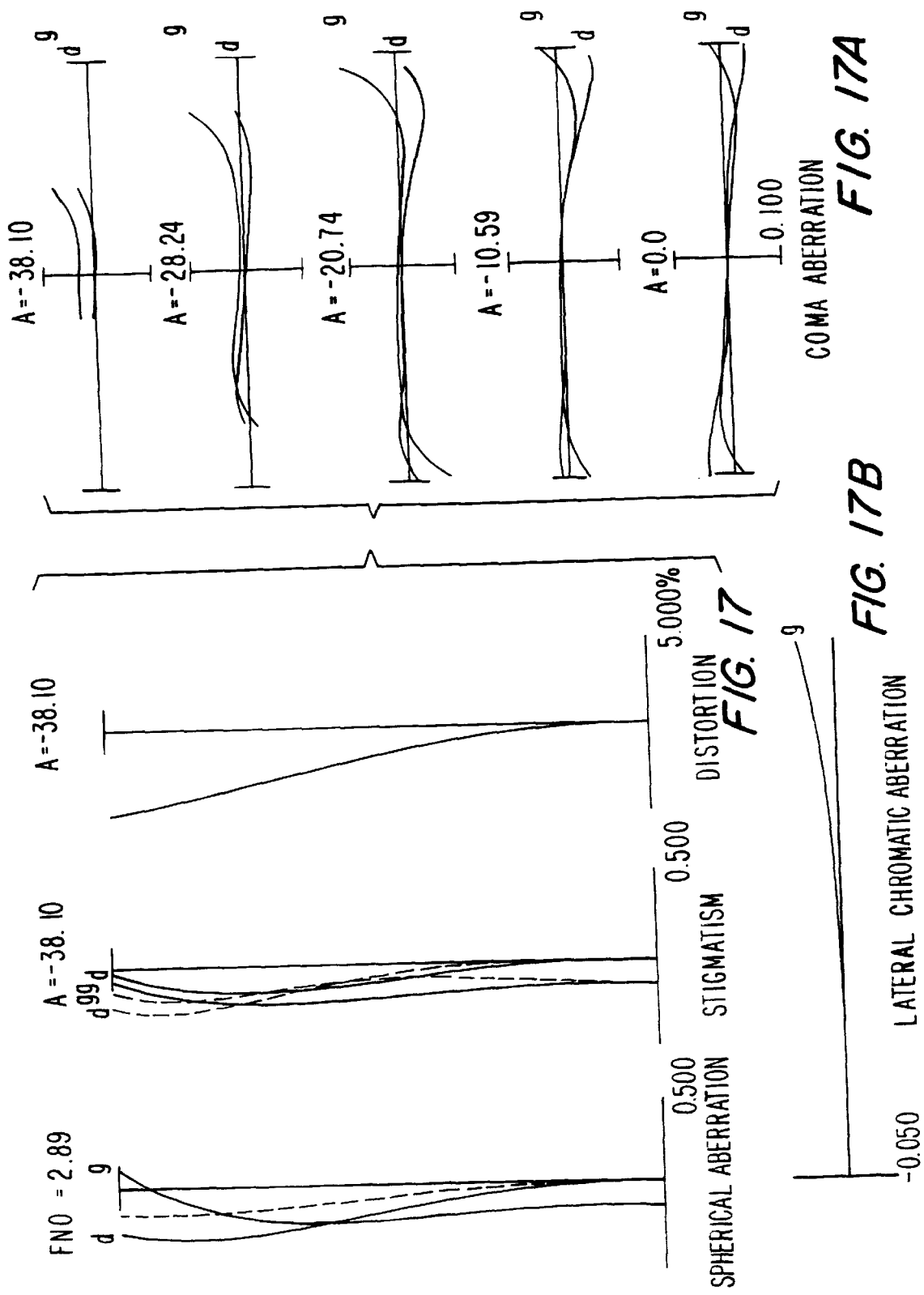
FIG. 17 is a diagram showing various aberrations of the zoom lens of Embodiment 3 measured at the wide-angle end in the infinitely far objective length state.
Figure 18:
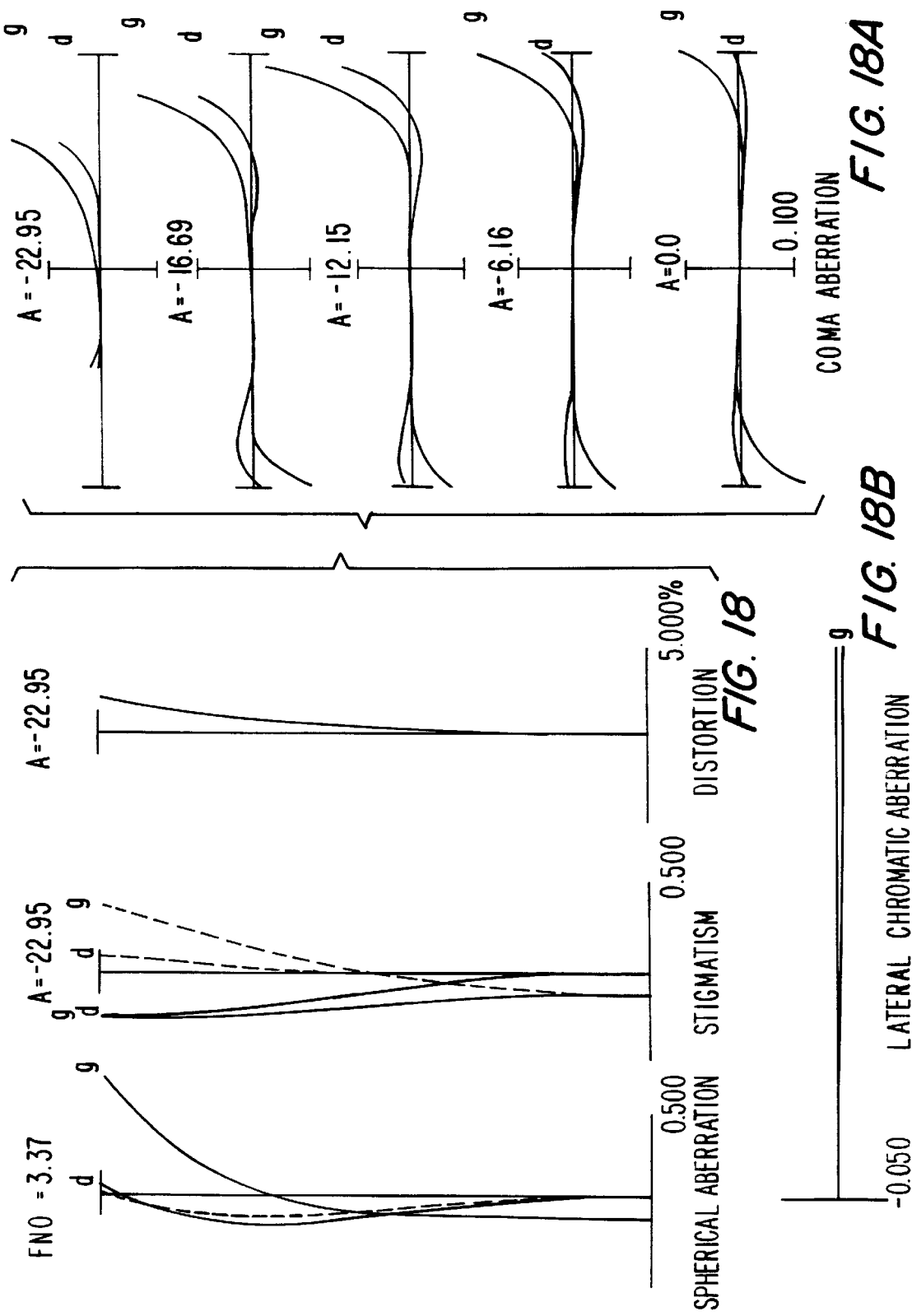
FIG. 18 is a diagram showing various aberrations of the zoom lens of Embodiment 3 measured at the infinitely far objective distance in the mid focal length state.
Figure 19:
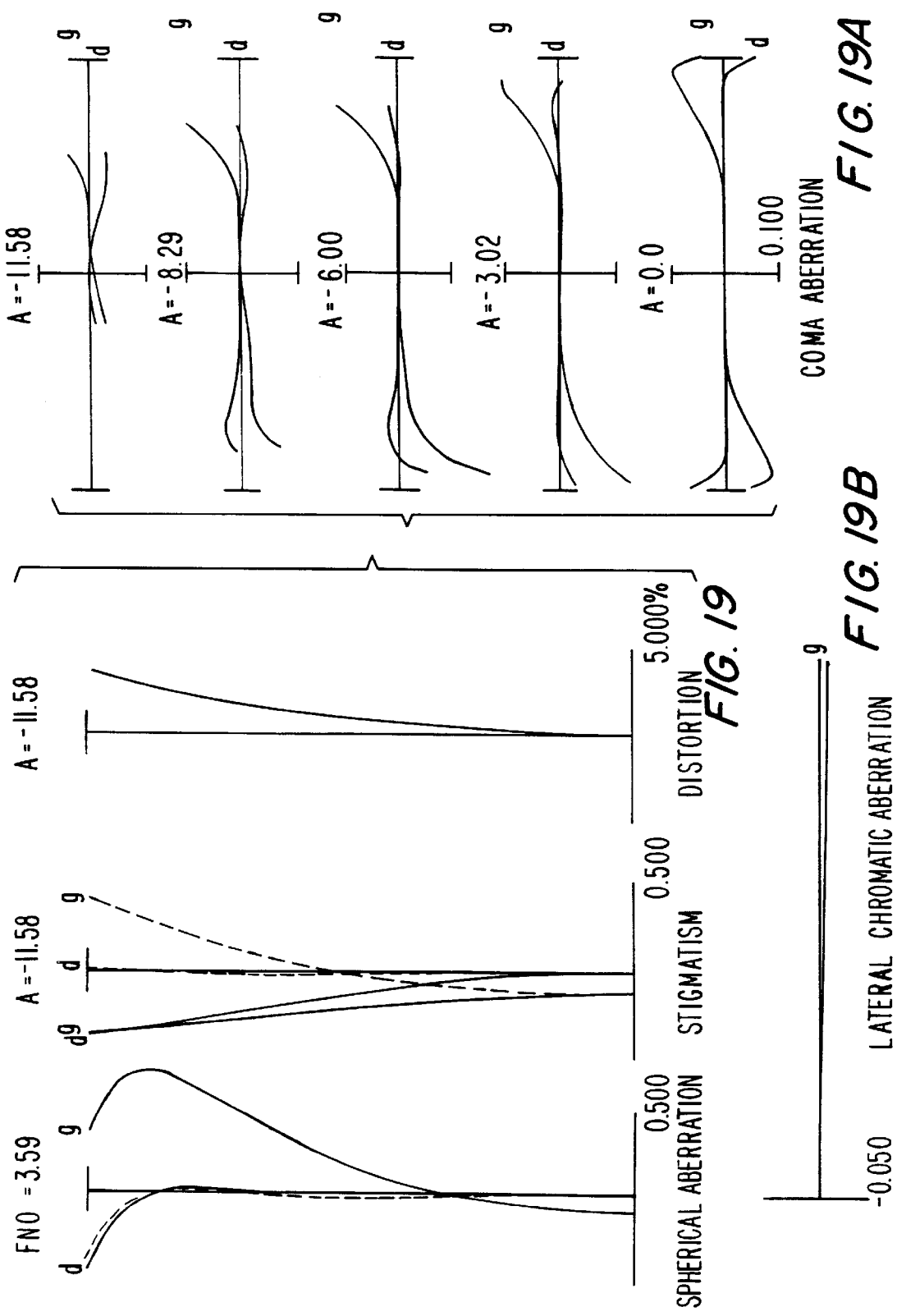
FIG. 19 is a diagram showing various aberrations of the zoom lens of Embodiment 3 at the telephoto end in the infinitely far objective distance state.
Figure 20:
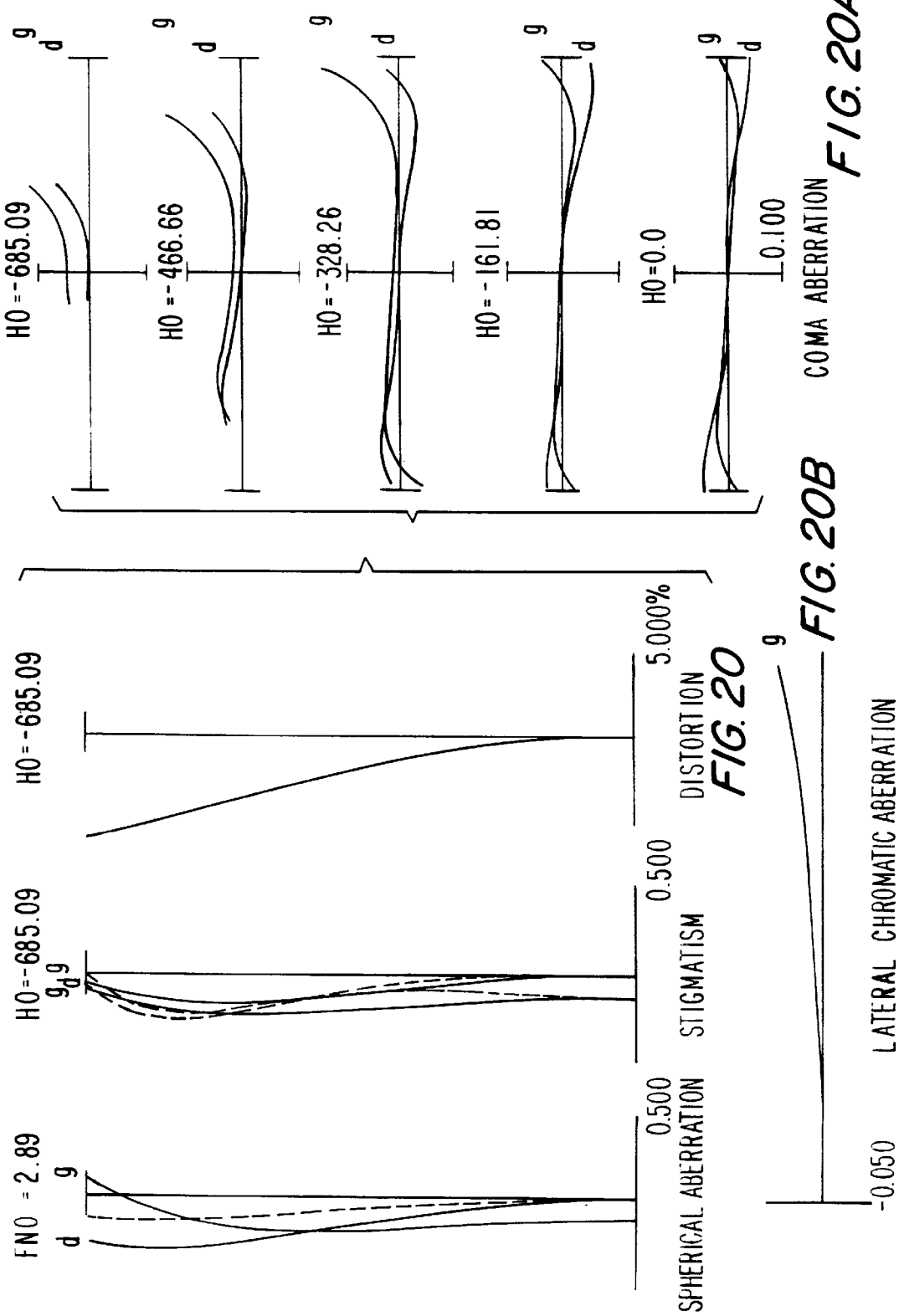
FIG. 20 is a diagram showing various aberrations of the zoom lens of Embodiment 3 measured at the wide-angle end at 1/30×.
Figure 21:
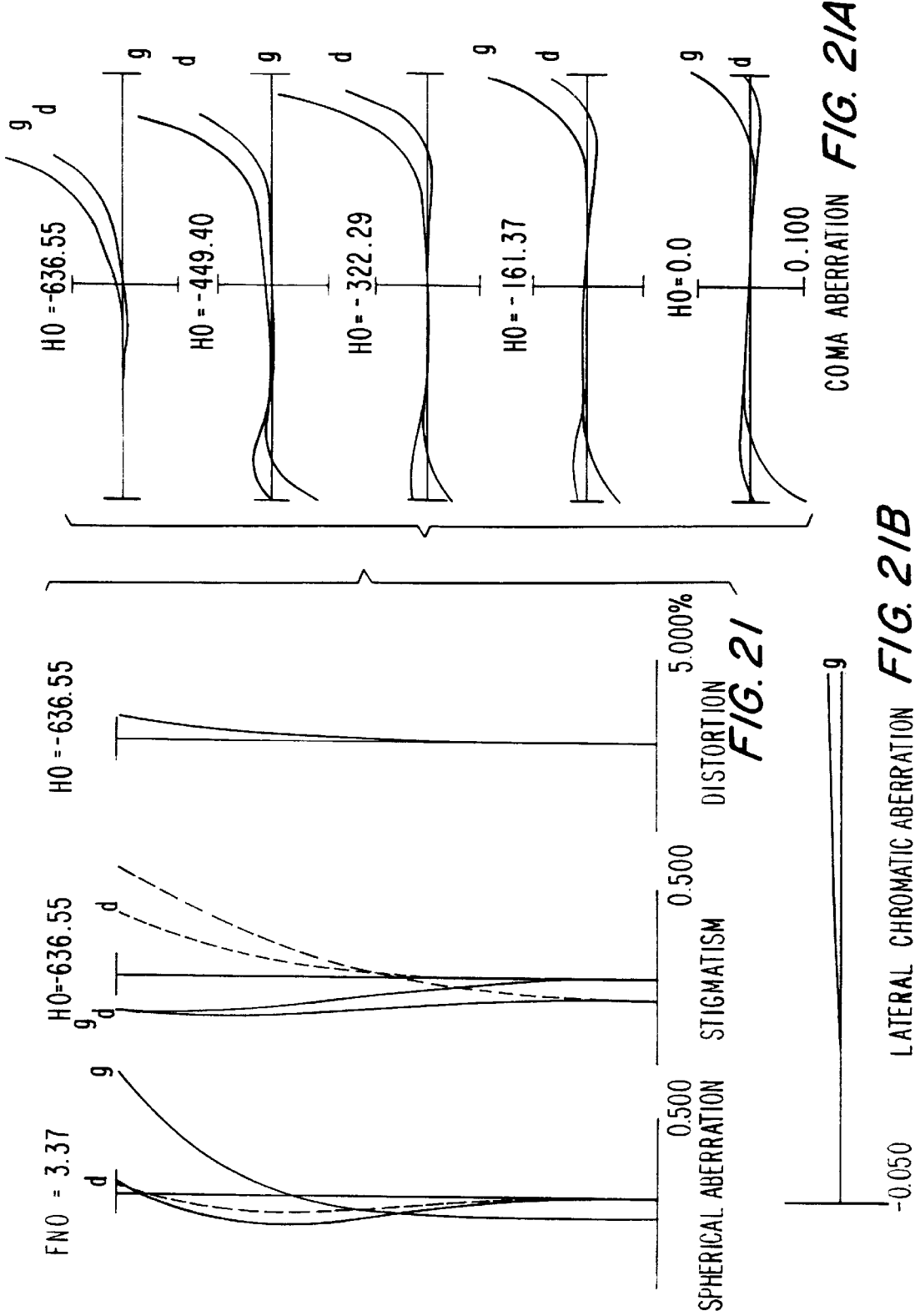
FIG. 21 is a diagram showing various aberrations of the zoom lens of Embodiment 3 in the mid focal length state at 1/30×.
Figure 22:
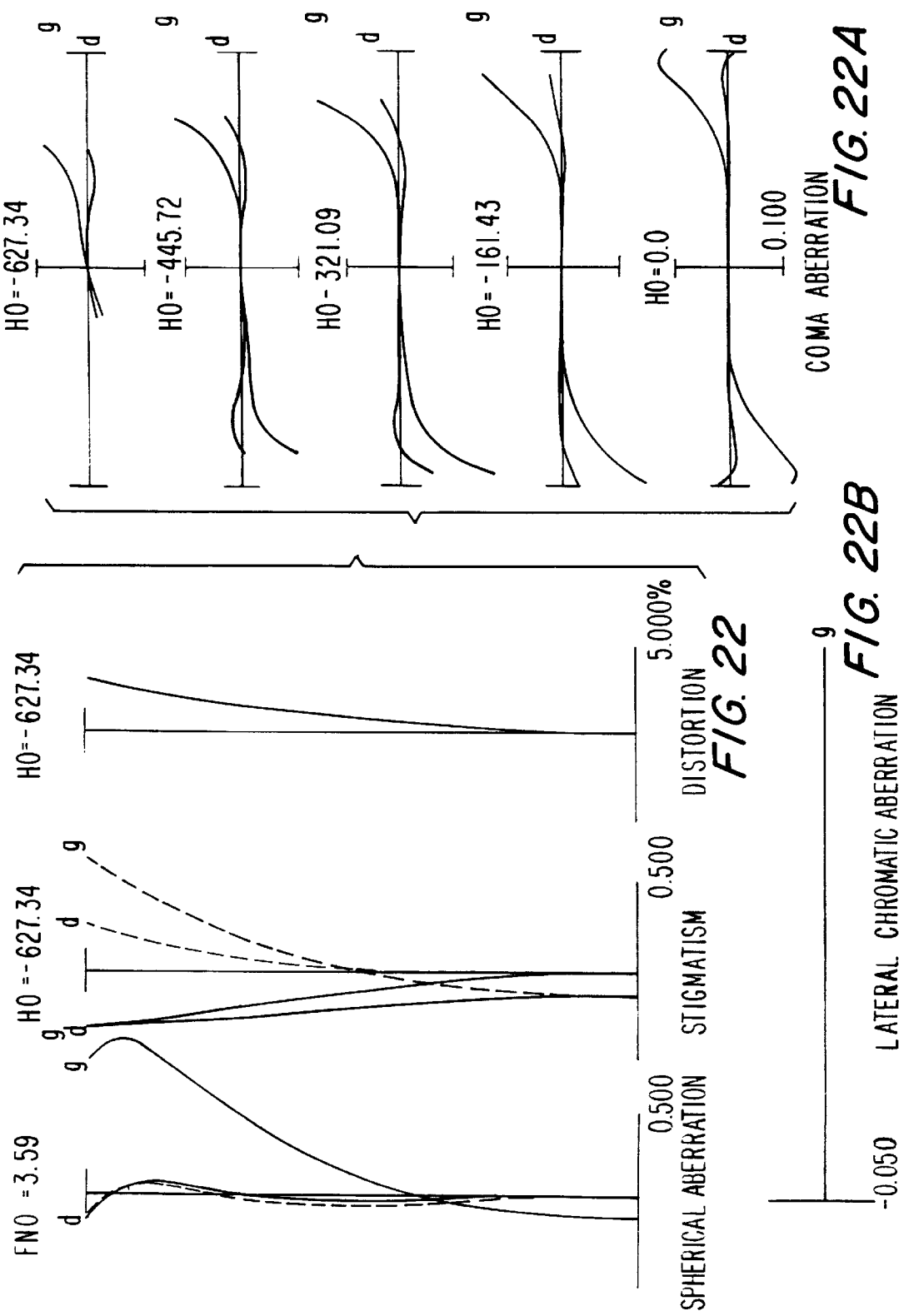
FIG. 22 is a diagram showing various aberrations of the zoom lens of Embodiment 3 at the telephoto end at 1/30×.

FIGS. 17 through 22 are diagrams showing various aberrations of Embodiment 4. That is, FIG. 17 is a diagram showing various aberrations measured at the wide-angle end in the infinitely far objective length state. FIG. 18 is a diagram showing various aberrations at the infinitely far objective distance in the mid focal length state. FIG. 19 is a diagram showing various aberrations at the telephoto end in the infinitely far objective length state. FIG. 20 is a diagram showing various aberrations at the wide-angle at 1/30×. FIG. 21 is a diagram showing various aberrations at the mid range focal length state at 1/30×. FIG. 22 is a diagram showing various aberrations at the telephoto end at 1/30×.

In each of the aberration diagrams, FNO is the F number, A is the ½ field angle, HO is the object height, d is the d line (λ=587.6 nm), and g is the g line (λ=435.8 nm). In each of the aberration diagrams showing astigmatism, a solid line shows the sagittal image plane, a broken line shows the meridional image plane. In addition, in the aberration diagrams showing spherical aberration, a broken line shows the sine condition.

It is apparent from the aberration diagram shown in FIGS. 14 and 17 that various aberrations are corrected covering a large field angle at the wide-angle end. It is apparent from FIGS. 15, 16, 18 and 19, which are the aberrations diagrams, various aberrations are corrected as well as at the wide-angle end.

Also, it is clear from FIG. 20 that various aberrations are corrected covering a large field angle at the wide-angle end. Aberration diagrams in FIGS. 21 and 22 show little fluctuation at a near distance. As is the case at the wide-angle end, all aberrations are excellently corrected with little fluctuation at the near distance.

As described, in Embodiment 4, all aberrations are excellently corrected at all focusing states and objective distances.

In each of the above embodiments, the third lens group G3 and an aperture stop are moved integrally for focusing. However, the zoom lens can be focused by moving the first lens group G1 or the second lens group G2. However, the third lens group G3 and an aperture stop can be moved independently. The zoom lens can be focused without moving the aperture stop but moving the third lens group G3 only. This operation requires a complex focusing mechanism, however, the primary light beam is not shielded with the shifting of an aperture stop in a large field angle during focusing. This makes it possible to have an even shorter objective distance.

As described, this invention provides a relatively compact large diameter high power zoom lens with a large lens, whose field angle is as big as 76.2° with an F number of about 2.8 and a magnification ratio of over 3.5.

Figure 23:
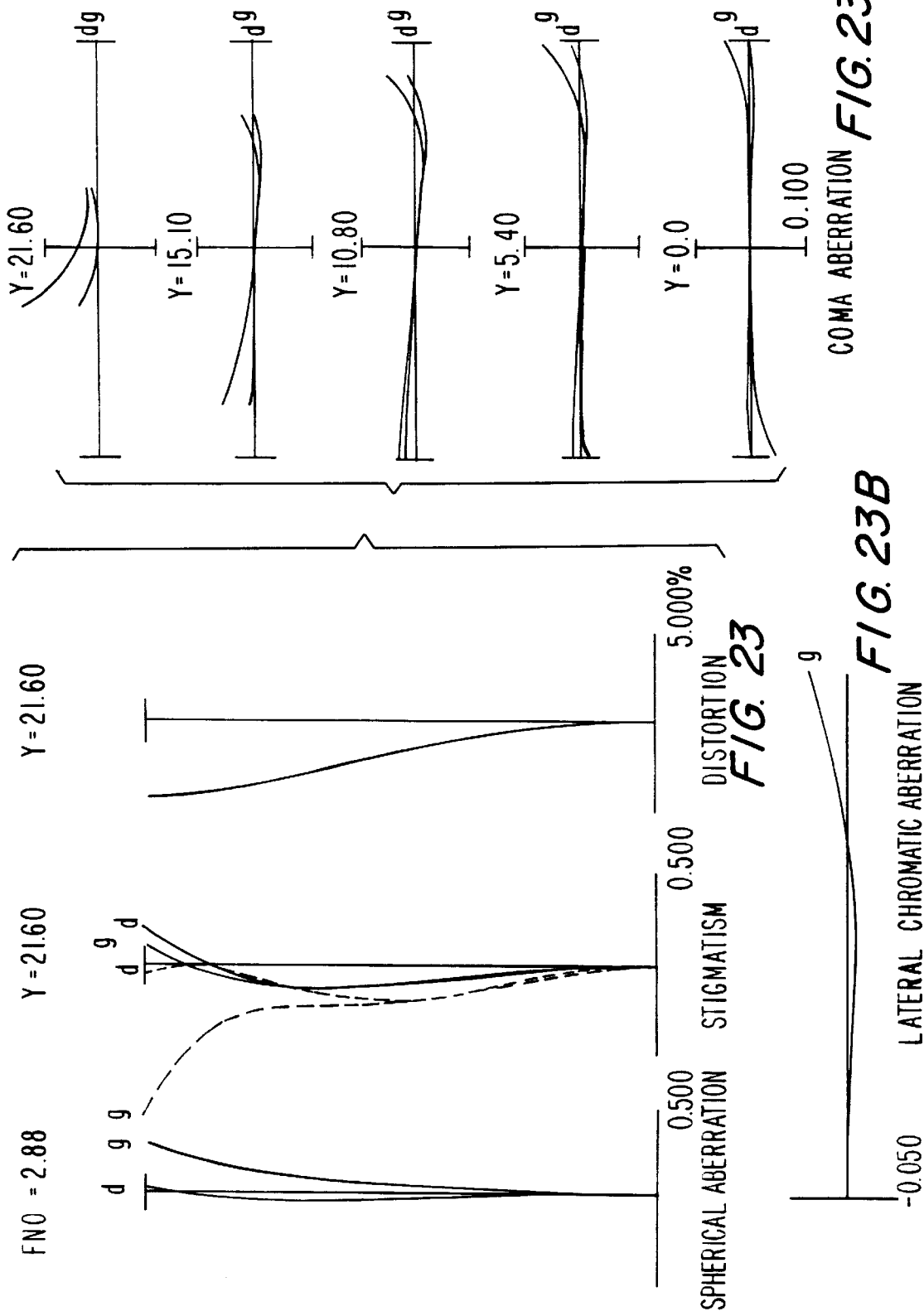
FIG. 23 is a diagram showing various aberrations of the zoom lens system of Embodiment 4 measured at the wide-angle end in the infinitely far objective length state.
Figure 24:
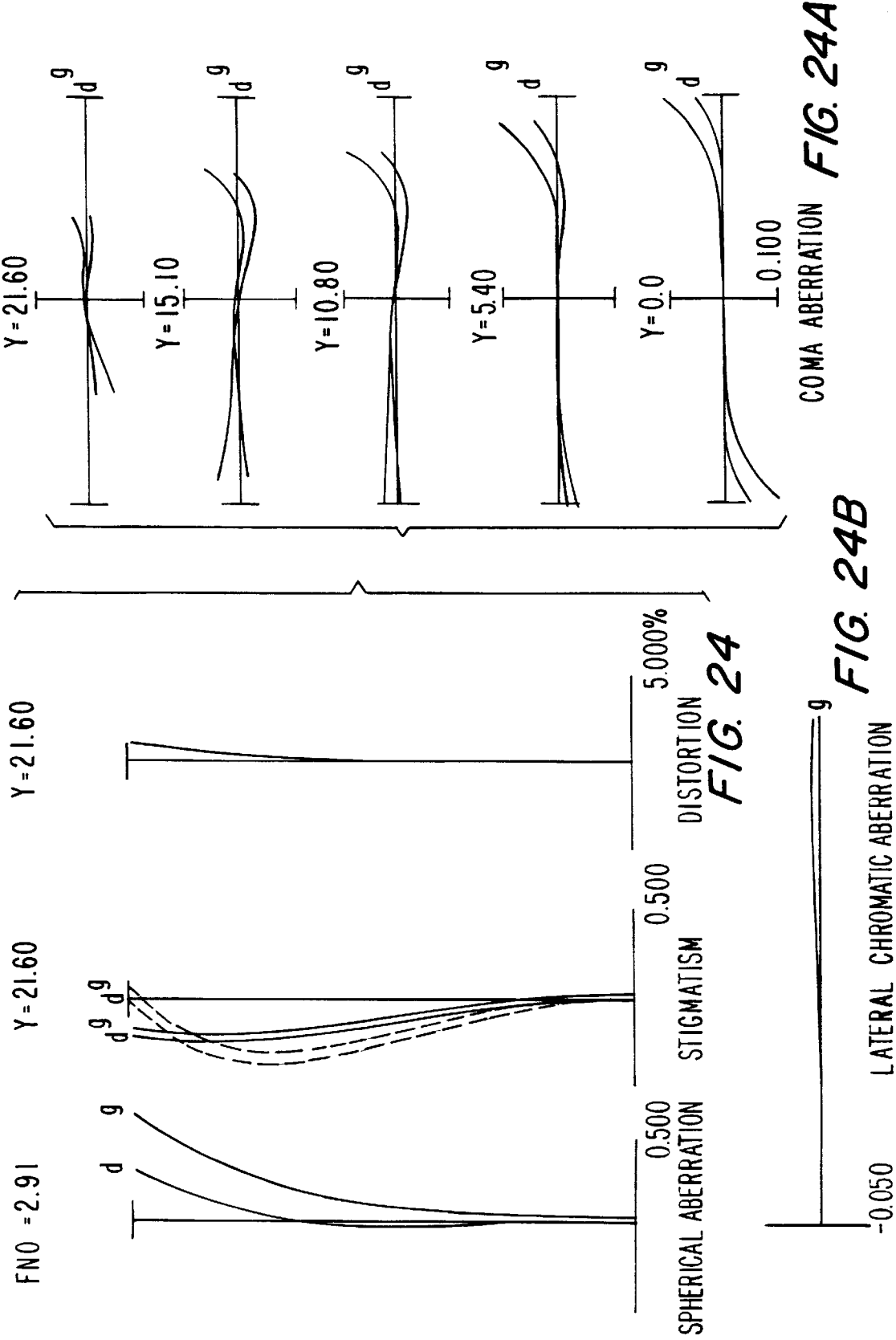
FIG. 24 is a diagram showing various aberrations of the zoom lens system of Embodiment 4 measured at the infinitely far objective distance in the mid focal length state.
Figure 25:
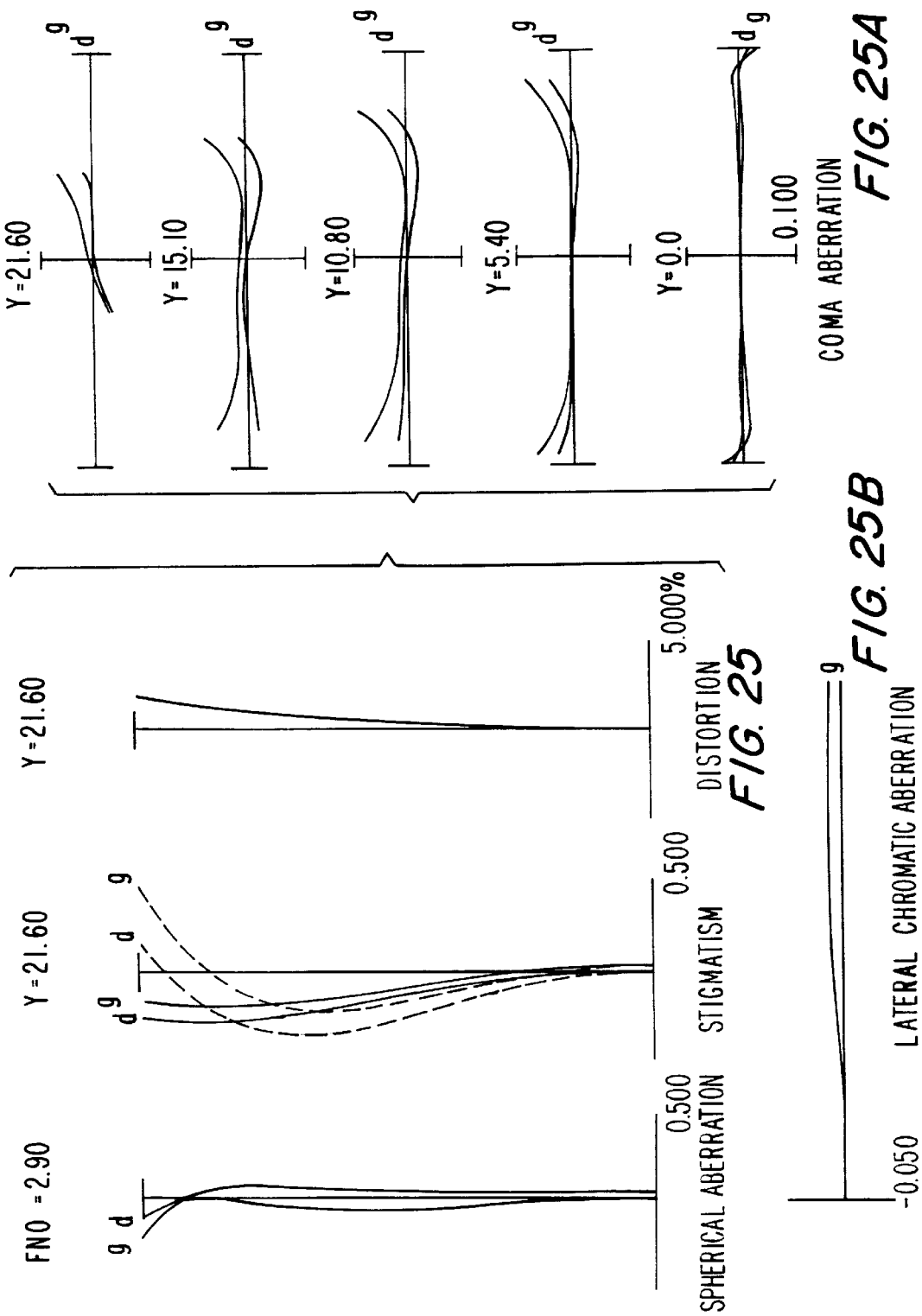
FIG. 25 is a diagram showing various aberrations of the zoom lens system of Embodiment 4 at the telephoto end in the infinitely far objective distance state.
Figure 27:
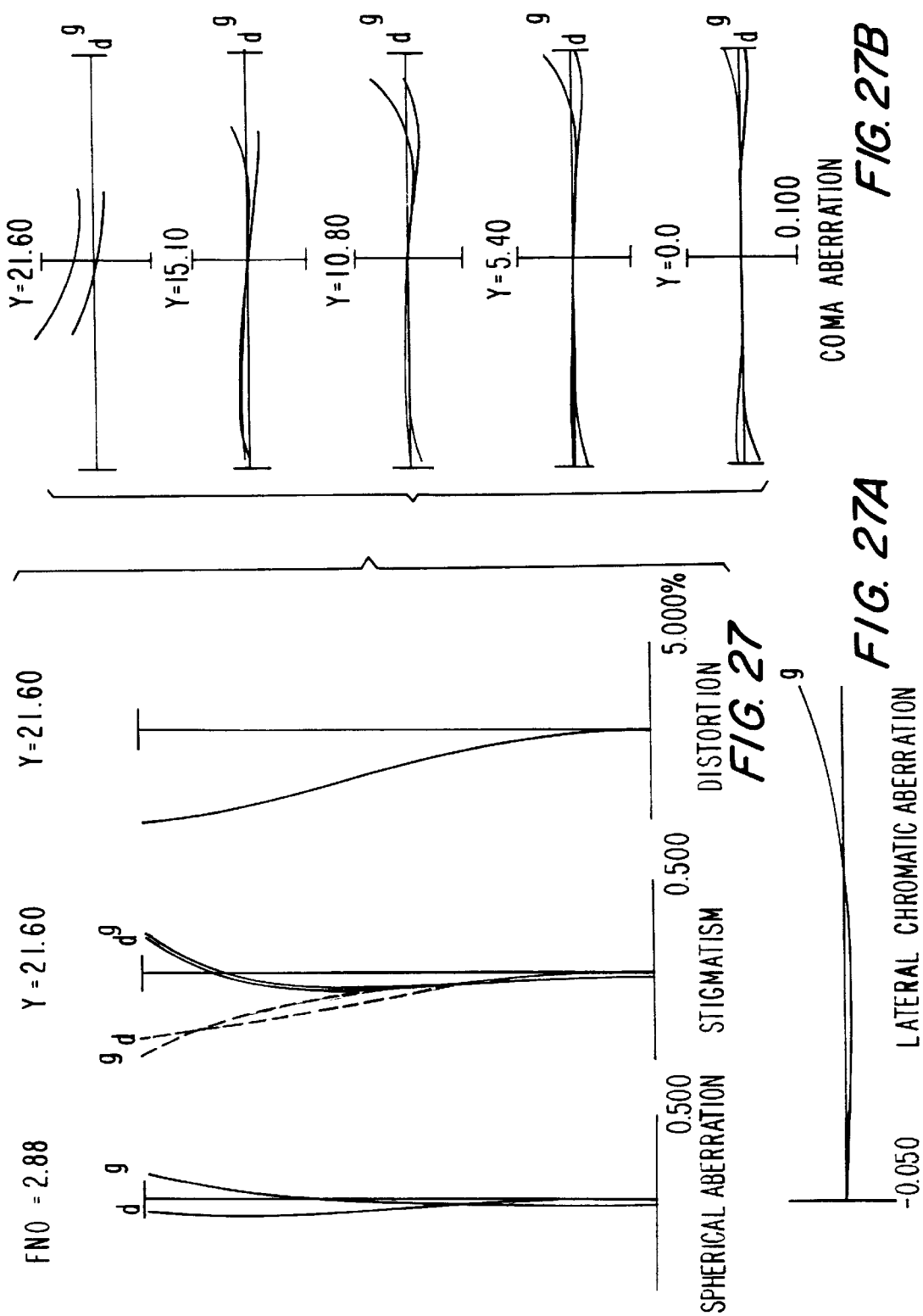
FIG. 27 is a diagram showing various aberrations of the zoom lens system of Embodiment 5 measured at the wide-angle end in the infinitely far objective an length state.
Figure 28:
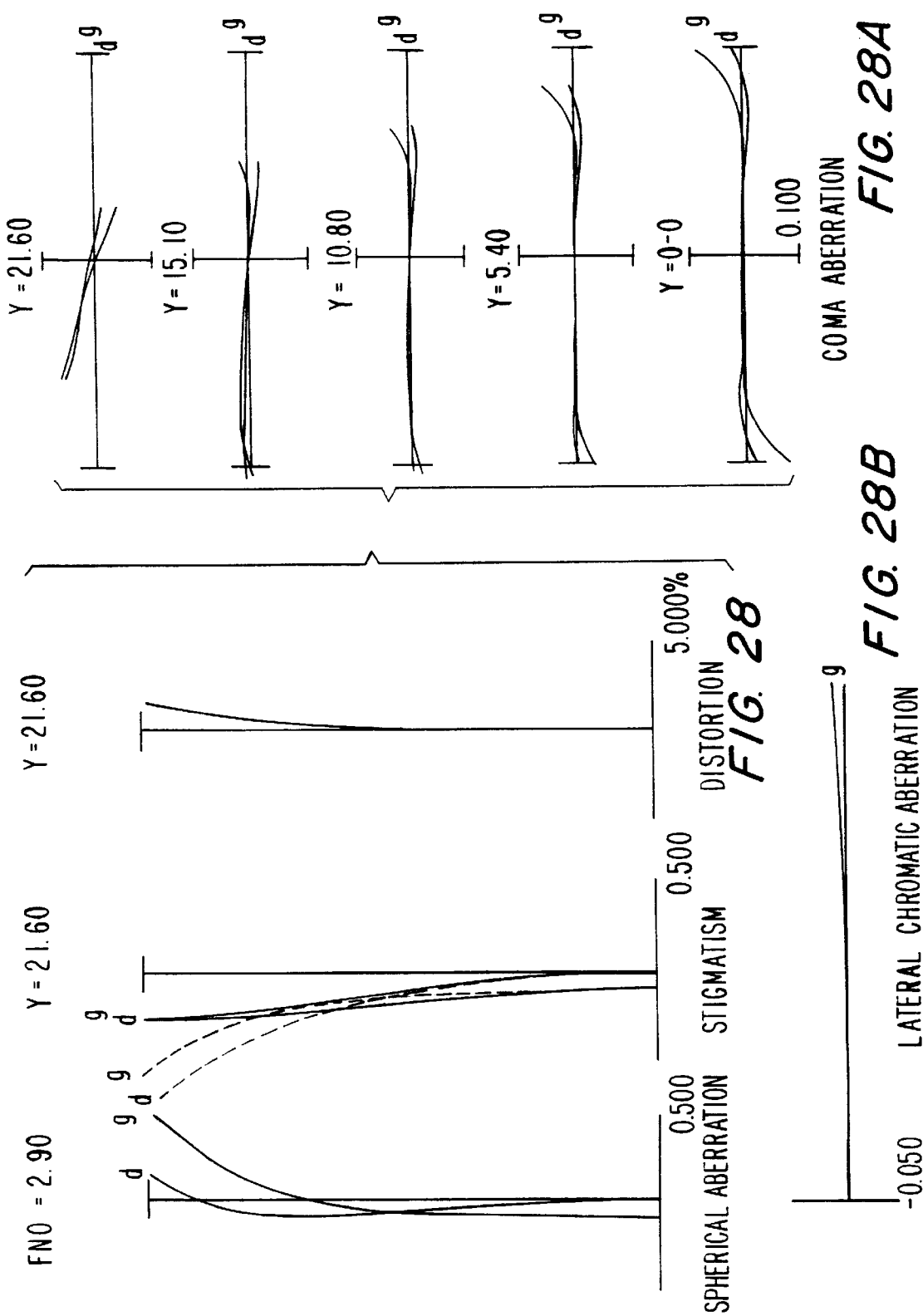
FIG. 28 is a diagram showing various aberrations of the zoom lens system of Embodiment 5 measured at the infinitely far objective distance in the mid focal length state.

FIGS. 23 through 25 are diagrams showing various aberrations of Embodiment 4. That is, FIG. 23 is a diagram showing various aberrations in the state in which an object at an infinitely far distance is focused at the wide-angle end. FIG. 27 is a diagram showing aberration in the state in which an object at the middle focal length is focused. FIG. 28 is a diagram showing various aberrations in the state in which an object at the infinitely far end is focused at the telephoto end.

Codes for each of the aberrations remains the same as in other embodiments. It is apparent from the aberration diagram shown in FIG. 23 that various aberrations are excellently corrected covering a large field angle at the wide-angle end. It is apparent from FIGS. 24 and 25, which are the aberrations diagrams, various aberrations are excellently corrected as is the case at the wide-angle end.

EMBODIMENT 5

It should be noted that the conditions of Embodiment 2 also apply to Embodiment 5.

Figure 26:
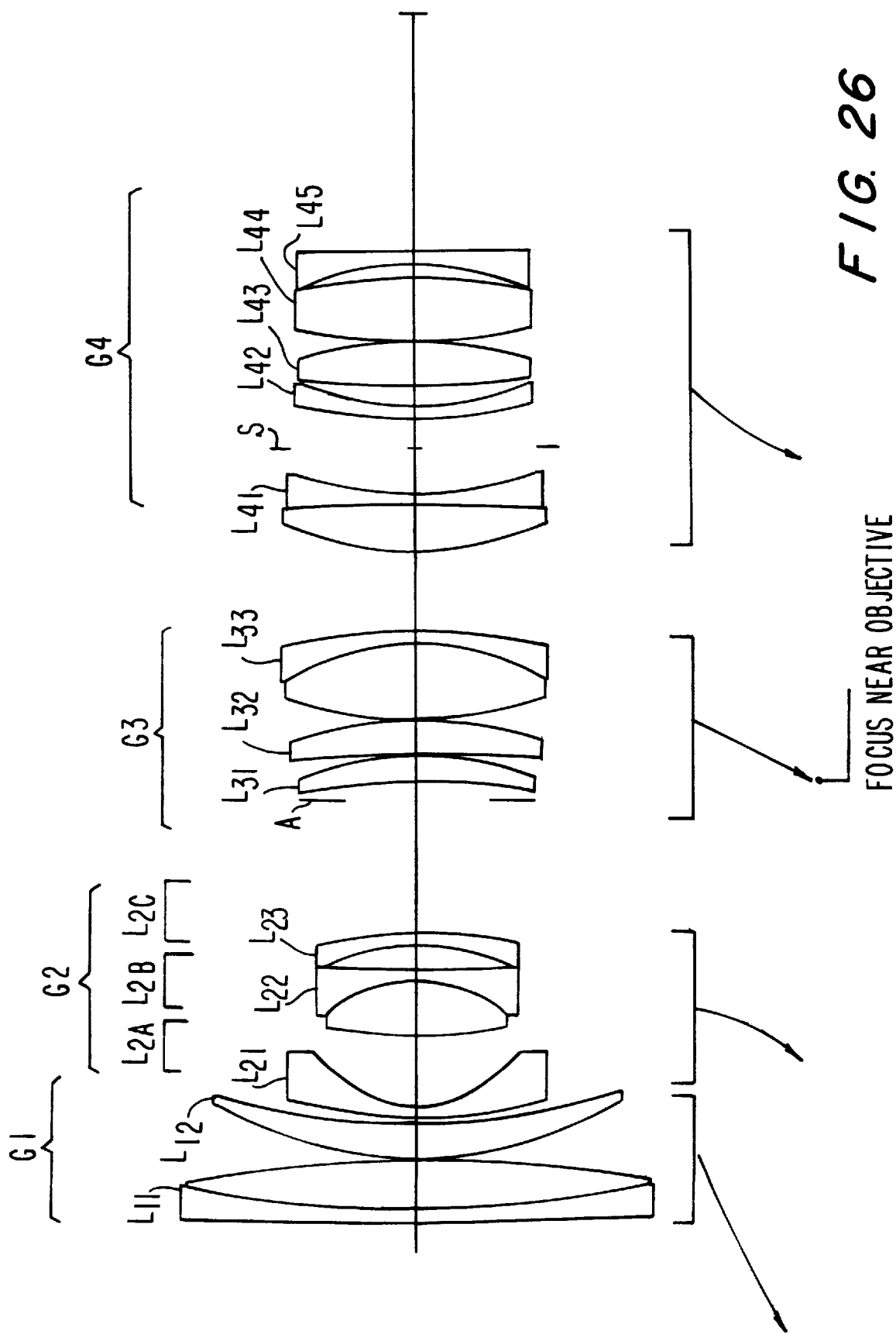
FIG. 26 is a diagram showing a lens layout and movement profile of the zoom lens system of Embodiment 5 of the present invention.

FIG. 26 is a diagram showing a lens layout and the movement profile of the zoom lens system of Embodiment 5 of the present invention. This embodiment comprises:
in order from the object end:
- a first lens group G1 having a positive refractive power;
- a second lens group G2 having a negative refractive power;
- a third lens group G3 having a positive refractive power; and
- a fourth lens group G4 having a positive refractive power.

In the zoom lens system of this embodiment, the first lens group G1 comprises, in order from the object end,
- a positive cemented lens L11 made up of a negative meniscus lens having a convex surface facing toward the object end and a bi-convex lens; and
- a positive meniscus lens L12 having a convex surface facing toward the object end.

The second lens group G2 comprises:
in order from the object end,
- a negative meniscus aspherical lens L21 having an aspherical convex surface facing toward the object end;
- a positive cemented lens L22 made up of a bi-convex lens and a bi-concave lens; and
- a negative meniscus aspherical lens L23 having a concave aspherical surface facing toward the object end.

Lens L2A is constructed of the negative meniscus aspherical surface lens L21. Lens L2B is constructed of the positive composite lens L22. Lens L2C is constructed with the negative meniscus lens L23.

Aperture stop A is formed near the object end in the third lens group G3. The third lens group G3 comprises:
in order from the object end,
- a positive meniscus lens L31 having a convex surface facing toward the image end;
- a positive meniscus lens L32 having a convex surface facing toward the image end;
- a positive composite lens L33 made up of a bi-convex lens and a negative meniscus lens having a concave surface facing toward the object end.

The fourth lens group G4 comprises:
in order from the object end,
- a positive composite lens L41 made up of a bi-convex lens and a bi-concave lens;
- a flare stop S;
- a negative meniscus lens L42 having a convex surface facing toward the object end;
- a bi-convex lens L43;
- a bi-convex lens L44; and
- a bi-concave lens L45.

FIG. 26 shows the lens layout at the wide-angle end. When magnified toward the telephoto end, all lens groups move toward the object end such that the spatial distance between the first lens group G1 and the second lens group G2 increases while that between the second lens group G2 and the third lens group G3 decreases. The third lens group G3 and the fourth lens group G4 move toward the object end. Also, when changing focus from the infinitely far object to the near object, the third lens group G3 is moved in the image direction.

WORKING EXAMPLE OF EMBODIMENT 5

Table 5 shows various values for this embodiment.

TABLE 5 f = 29.0 to 77.6
F NO = 2.86 to 2.90
2ω = 76.6° to 30.2°

|  | r | d | Abbe NO | N(d) |
|---|---|---|---|---|
|  |  | 0.0000 |  | 1.000000 |
| 1) | 922.4060 | 2.0000 | 37.35 | 1.834000 |
| 2) | 173.2713 | 8.0000 | 82.52 | 1.497820 |
| 3) | −208.3079 | 0.1000 |  | 1.000000 |
| 4) | 63.0348 | 5.5000 | 82.52 | 1.497820 |
| 5) | 107.1998 | (d5 = variable) |  | 1.000000 |
| *6) | 87.0165 | 1.7000 | 43.35 | 1.840421 |
| 7) | 19.3175 | 11.2137 |  | 1.000000 |
| 8) | 65.5226 | 9.0000 | 27.61 | 1.755200 |
| 9) | −22.1122 | 1.7000 | 49.45 | 1.772789 |
| 10) | 270.4192 | 4.0000 |  | 1.000000 |
| 11*) | −31.1321 | 1.7000 | 40.90 | 1.796310 |
| 12) | −73.0999 | (d12 = variable) |  | 1.000000 |
| 13) | aperture stop | 3.0000 |  | 1.000000 |
| 14) | −104.6470 | 4.0000 | 64.10 | 1.516800 |

TABLE 5-continued

| | | | | |
|---|---|---|---|---|
| 15) | −52.6211 | 0.1000 | | 1.000000 |
| 16) | −318.9001 | 5.5000 | 64.10 | 1.516800 |
| 17) | −64.7452 | 0.1000 | | 1.000000 |
| 18) | 60.2972 | 12.0000 | 82.52 | 1.497820 |
| 19) | −39.9901 | 2.0000 | 25.50 | 1.804581 |
| 20) | −102.3921 | (d20 = variable) | | 1.000000 |
| 21) | 49.7528 | 7.5000 | 58.54 | 1.612720 |
| 22) | −329.0999 | 1.8000 | 53.93 | 1.713000 |
| 23) | 64.7760 | 7.0000 | | 1.000000 |
| 24) | flare stop | 5.0267 | | 1.000000 (Variable Diameter) |
| 25) | 83.3893 | 2.0000 | 45.37 | 1.796681 |
| 26) | 50.4081 | 3.0000 | | 1.000000 |
| 27) | 137.6281 | 7.0000 | 58.54 | 1.612720 |
| 28) | −62.4447 | 0.1000 | | 1.000000 |
| 29) | 90.1249 | 10.0000 | 55.60 | 1.696800 |
| 30) | −85.5857 | 1.9555 | | 1.000000 |
| 31) | −48.6436 | 2.0000 | 40.90 | 1.796310 |
| 32) | 552.4782 | (bf) | | 1.000000 |

| | |
|---|---|
| Flare stop diameter (surface 24) | Fai = 30.00 to 29.10 to 37.14 |
| Aperture stop diameter (surface 16) | Fai = 23.40 to 28.00 to 32.60 |

| | Surface | k | $C_2$ | $C_4$ |
|---|---|---|---|---|
| (1) | 6 | 10.2317 | 0.00000E + 00 | 2.13210E − 06 |

| $C_6$ | $C_8$ | $C_{10}$ |
|---|---|---|
| −4.93930E − 09 | 8.01140E − 13 | −4.57860E − 15 |

| | Surface | k | $C_2$ | $C_4$ |
|---|---|---|---|---|
| (2) | 11 | −0.8597 | 0.00000E + 00 | −3.47430E − 06 |

| $C_6$ | $C_8$ | $C_{10}$ |
|---|---|---|
| 1.10860E − 08 | −7.03060E − 14 | 4.96120E − 14 |

(Variable Separations)

| | 1-POS | 2-POS | 3-POS | 4-POS | 5-POS | 6-POS |
|---|---|---|---|---|---|---|
| F&β | 29.00000 | 50.00000 | 77.60000 | −0.03333 | −0.03333 | −0.03333 |
| D0 | 0.0000 | 0.0000 | 0.0000 | 818.1055 | 1412.0083 | 2188.4106 |
| 1 d5: | 0.93938 | 24.79977 | 48.17001 | 0.93938 | 24.79977 | 48.17001 |
| 2 d12: | 21.31286 | 7.73498 | 1.34092 | 22.25178 | 8.37011 | 1.90731 |
| 3 d20: | 12.73417 | 3.99403 | 4.49317 | 11.79525 | 3.35890 | 3.92678 |
| 4 bf: | 37.63201 | 61.79593 | 82.00660 | 37.63201 | 61.79593 | 82.00660 |

| | 7-POS | 8-POS | 9-POS |
|---|---|---|---|
| F&β | −0.08048 | −0.13489 | −0.20178 |
| D0 | 308.3856 | 282.6795 | 244.9934 |
| 1 d5: | 0.93938 | 24.79977 | 48.17001 |
| 2 d12: | 23.60618 | 10.31641 | 4.76931 |
| 3 d20: | 10.44085 | 1.41260 | 1.06478 |
| 4 bf: | 37.63201 | 61.79593 | 82.00660 |

Corresponding Values

| | |
|---|---|
| (14) | $|ASc-Sc|/fw = 0.01076$ (φ = 28.86 mm) |
| (15) | $|ASa-Sa|/fw = 0.01349$ (φ = 39.42 mm) |
| (16) | nbn − nbp = 0.01759 |
| (17) | X2/fw = 0.5573 |
| (18) | f2/fw = −0.7586 |
| (19) | f2a/f2 = 1.3585 |
| (20) | f2c/f2 = 3.1519 |
| (21) | f2b/f2 = −5.5992 |

Figure 29:
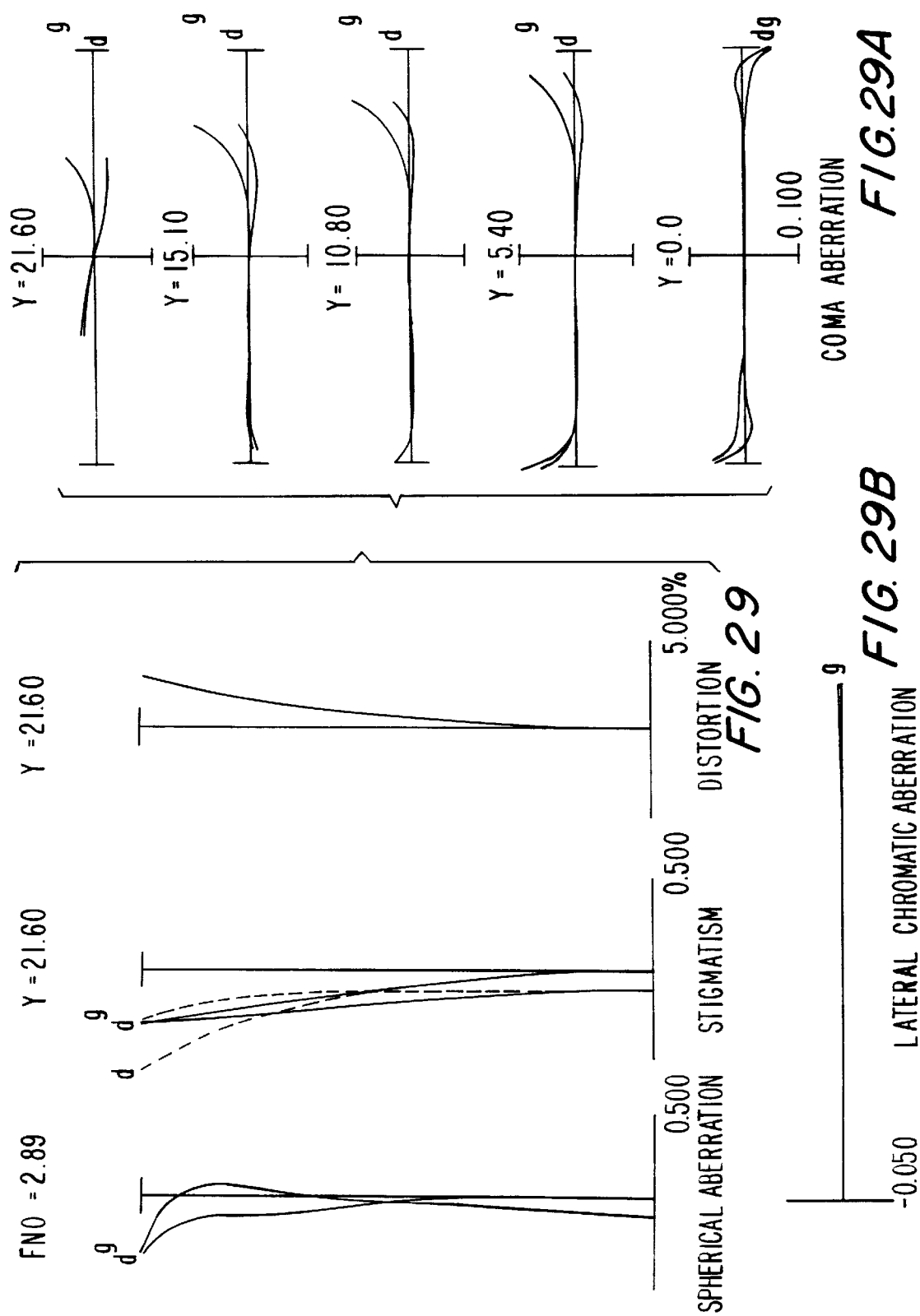
FIG. 29 is a diagram showing various aberrations of the zoom lens system of Embodiment 5 at the telephoto end in the infinitely far objective distance state.

FIGS. 27, 28, and 29 are diagrams showing various aberrations of this embodiment. That is, FIG. 27 is a diagram showing various aberrations measured at the wide-angle end in the infinitely far objective length state. FIG. 28 is a diagram showing various aberrations at the infinitely far objective distance in the middle focal length state. FIG. 29 shows various aberrations at the infinitely far objective distance at the telephoto end.

It is apparent from the aberration diagrams shown in FIG. 27 that various aberrations are corrected at the wide-angle end throughout a large field angle. It is also apparent from the aberration diagrams shown in FIGS. 28 and 29 that various aberrations are corrected as good as they are at the wide-angle end.

EMBODIMENT 6

It should be noted that the conditions of Embodiment 2 also apply to Embodiment 6.

Figure 30:
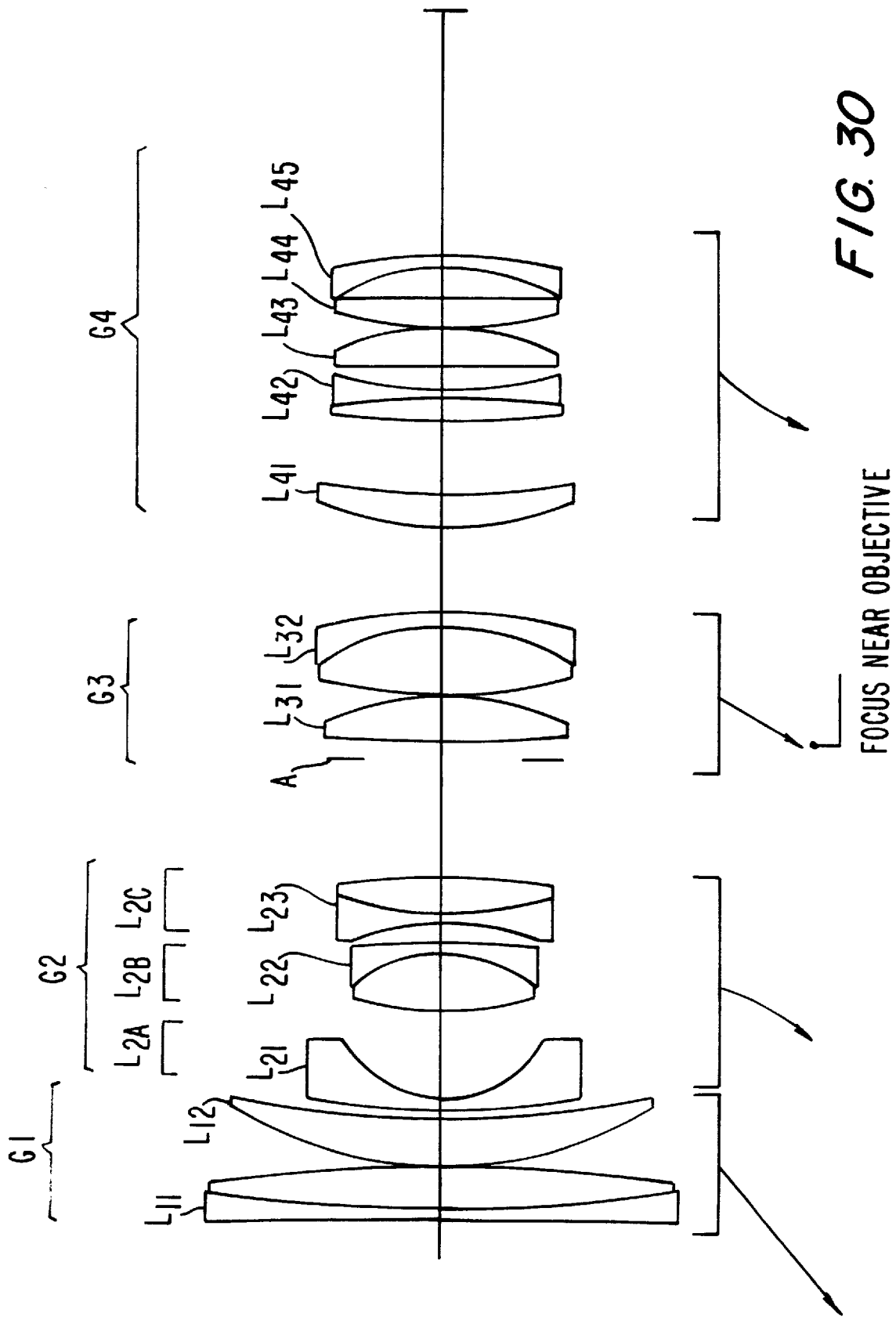
FIG. 30 is a diagram showing a lens layout and movement profile of the zoom lens system of Embodiment 6 of the present invention.

FIG. 30 is a diagram showing a lens layout and the movement profile of the zoom lens system of Embodiment 6 of the present invention. This embodiment comprises:
in order from the object end:
- a first lens group G1 having a positive refractive power;
- a second lens group G2 having a negative refractive power;
- a third lens group G3 having a positive refractive power; and
- a fourth lens group G4 having a positive refractive power.

In the zoom lens system of this embodiment, the first lens group G1 comprises, in order from the object end,
- a positive composite lens L11 made up of a bi-concave lens having a concave surface facing toward the object end and a bi-convex lens; and
- a positive meniscus lens L12 having a convex surface facing toward the object end.

The second lens group G2 comprises:
in order from the object end,
- a negative meniscus aspherical lens L21 having an aspherical convex surface facing toward the image end;
- a positive cemented lens L22 made up of a positive lens having a convex surface facing toward the object end and a negative meniscus lens having a concave surface facing toward the object end; and
- a negative cemented lens L23 made up of a bi-aspherical surface lens having a concave aspherical surface facing toward the object end and a bi-convex lens.

Lens L2A is constructed of the negative meniscus aspherical surface lens L21. Lens L2B is constructed of the positive cemented lens L23. Lens L2C is constructed of the negative meniscus lens L24.

Aperture stop A is formed near the object end in the third lens group G3. The third lens group G3 comprises:
in order from the object end,
- a bi-convex lens L31; and
- a positive cemented lens L32 made up of a bi-convex lens and a negative meniscus lens having a convex surface facing toward the image end.

The fourth lens group G4 comprises:
in order from the object end,
- a positive meniscus lens L41 having a convex surface facing toward the object end;
- a negative cemented lens made up of a bi-convex lens and a bi-concave lens;
- a bi-convex lens L43;
- a bi-convex lens L44; and
- a negative meniscus lens L45 having convex surface facing toward the image end.

FIG. 31 shows the lens layout at the wide-angle end. When magnified toward the telephoto end, all lens groups move toward the object end such that the spatial distance between the first lens group G1 and the second lens group G2 increases while that between the second lens group G2 and the third lens group G3 decreases. The third lens group G3 and the fourth lens group G4 move toward the object end. Also, when changing focus from the infinitely far object to the near object, the third lens group G3 is moved in the image direction.

WORKING EXAMPLE OF EMBODIMENT 6

Table 6 shows various values for an embodiment. Codes remains the same as Embodiment 1.

TABLE 6 f = 29.0 to 77.6
F N0 = 2.90
2ω = 76° to 30.4°

| | r | d | Abbe NO | N(d) |
|---|---|---|---|---|
| | | 0.0000 | | 1.000000 |
| 1) | −4424.2361 | 2.0000 | 23.01 | 1.860741 |
| 2) | 263.3742 | 6.5000 | 82.52 | 1.497820 |
| 3) | −276.9713 | 0.1000 | | 1.000000 |
| 4) | 63.8212 | 7.50000 | 58.50 | 1.651599 |
| 5) | 153.6678 | (d5) | | 1.000000 |
| *6) | 106.2130 | 1.7000 | 49.45 | 1.772789 |
| 7) | 16.7681 | 14.2656 | | 1.000000 |
| 8) | 48.6782 | 9.0000 | 27.83 | 1.699110 |
| 9) | −22.4975 | 1.7000 | 49.45 | 1.772789 |
| 10) | −155.8207 | 2.8000 | | 1.000000 |
| *11) | −38.5912 | 1.7000 | 45.37 | 1.796681 |
| 12) | 54.6263 | 5.5000 | 58.90 | 1.518230 |
| 13) | −140.4089 | (d13) | | 1.000000 |
| 14) | aperture stop | 2.5000 | | 1.000000 |
| 15) | 271.7899 | 7.0000 | 58.90 | 1.518230 |
| 16) | −47.5100 | 0.1000 | | 1.000000 |
| 17) | 69.4841 | 11.0000 | 58.90 | 1.518230 |
| 18) | −35.5935 | 2.0000 | 23.01 | 1.860741 |
| 19) | −93.3151 | (d19) | | 1.000000 |
| 20) | 47.6503 | 5.3000 | 58.90 | 1.518230 |
| 21) | 94.9464 | 11.7812 | | 1.000000 |
| 22) | 136.0334 | 3.5000 | 64.10 | 1.516800 |
| 23) | −211.0196 | 1.6000 | 45.37 | 1.796681 |
| 24) | 69.1637 | 3.6737 | | 1.000000 |
| 25) | 1875.5725 | 6.0000 | 58.50 | 1.651599 |
| 26) | −43.3126 | 0.2000 | | 1.000000 |
| 27) | 73.3868 | 5.0000 | 64.10 | 1.516800 |

TABLE 6-continued

| | | | | |
|---|---|---|---|---|
| 28) | −231.8568 | 4.0000 | | 1.000000 |
| 29) | −36.2115 | 2.0000 | 43.35 | 1.840421 |
| 30) | −90.3805 | (bf) | | 1.000000 |

| Flare stop diameter(Surface 14) | Fai = 24.50 to 29.20 to 33.40 |
|---|---|

| | Surface | K | $C_2$ | $C_4$ |
|---|---|---|---|---|
| (1) | 7 | 0.7520 | 0.00000E + 00 | −3.53320E − 06 |

| | $C_6$ | $C_8$ | $C_{10}$ |
|---|---|---|---|
| | −1.11750E − 08 | 5.11400E − 12 | −1.04520E − 13 |

| | Surface | K | $C_2$ | $C_4$ |
|---|---|---|---|---|
| (2) | 11 | 1.5280 | 0.00000E − 00 | 7.85200E − 06 |

| | $C_6$ | $C_8$ | $C_{10}$ |
|---|---|---|---|
| | 7.44480E − 09 | 7.85050E − 12 | −2.50230E − 14 |

(Variable Separations)

| | 1-POS | 2-POS | 3-POS | 4-POS | 5-POS | 6-POS |
|---|---|---|---|---|---|---|
| F&β | 29.00000 | 50.00000 | 77.60000 | −0.03333 | −0.03333 | −0.03333 |
| D0 | 0.0000 | 0.0000 | 0.0000 | 819.5456 | 1413.4570 | 2179.9110 |
| 1 d5: | 1.21871 | 21.36961 | 42.80060 | 1.21871 | 21.36961 | 42.80060 |
| 2 d13: | 19.06664 | 6.73020 | 1.31137 | 19.91209 | 7.35645 | 1.85021 |
| 3 d19: | 13.40077 | 3.52987 | 5.45856 | 12.55532 | 2.90362 | 4.81972 |
| 4 bf: | 38.64430 | 61.26511 | 75.70795 | 38.64430 | 61.26511 | 75.70795 |

| | 7-POS | 8-POS | 9-POS |
|---|---|---|---|
| F&β | −0.08061 | −0.13325 | −0.19189 |
| D0 | 309.2491 | 288.6848 | 256.3010 |
| 1 d5: | 1.21871 | 21.36961 | 42.80060 |
| 2 d13: | 21.13044 | 9.24417 | 4.99474 |
| 3 d19: | 11.33697 | 1.01590 | 1.77519 |
| 4 bf: | 38.64430 | 61.26511 | 75.70795 |

Corresponding Values

| | |
|---|---|
| (14) | $|ASc-Sc|/fw = 0.01100 (\phi = 28.2$ mm) |
| (15) | $|ASa-Sa|/fw = 0.05885 (\phi = 30.75$ mm) |
| (16) | nbn − nbp = 0.05999 |
| (17) | X2/fw = 0.3919 |
| (18) | f2/fw = −0.6897 |
| (19) | f2a/f2 = 1.299 |
| (20) | f2c/f2 = 2.301 |
| (21) | f2b/f2 = −3.152 |
| (22) | nCp − nCn = −0.27845 |

FIGS. 31, 32, and 33 are diagrams showing various aberrations of this embodiment. That is, FIG. 31 is a diagram showing various aberrations measured at the wide-angle end in the infinitely far objective length state. FIG. 32 is a diagram showing various aberrations at the infinitely far objective distance in the middle focal length state. It is also apparent from FIGS. 32 and 33 that various aberrations are corrected as good as they are at the wide-angle end.

In the present invention, an aspherical surface is formed on the second lens group. It is, however, possible that it is formed on the third and the fourth lens groups to have them participate in correcting spherical aberration and the upper coma aberration to promote making a high zoom ratio lens system of a larger aperature with a large field angle.

Also in the present invention, the third lens group G3 performs focusing. However, the first lens group G1 or the second lens group G2 may also perform focusing.

As described, this invention provides a relatively compact large aperature high zoom ratio lens system with a large lens, whose field angle is as large as 76.2° with an F number of about 2.8 with a magnification ratio of over 2.6x.

We claim:

1. A zoom lens system facing an object end and an image end on opposite ends thereof with said zoom lens system comprising, in order from said object end:

a first lens group G1 having a positive refractive power;

a second lens group G2 having a negative refractive power;

a third lens group G3 having a positive refractive power; wherein the lens separation of said first lens group G1 from said second lens group G2 is changed for magnification;

with said second lens group G2 comprising: in order from the object end, a negative lens component L2A at least one of whose surface is aspherical;

a cemented positive lens component L2B which is cemented with a positive lens having a convex surface facing toward the object end and a negative lens; and a negative lens component L2C having a concave surface facing toward the object end; whereby focusing from an object at the infinite object end to the object at the close object is performed by moving at least said third lens group G3 along the optical axis.

2. A zoom lens system as defined in claim 1 which fulfills the following condition:

$$(Rar+Raf)/(Rar-Raf) \leq -1 \qquad (1)$$

where

Raf: is the paraxial curvature radius of the surface at the object end of said lens component L2A;

Rar: is the paraxial curvature radius of the surface at the image end of said negative lens component.

3. A zoom lens system as defined in claim 2 which fulfills the following condition:

$$0.28 \leq dAB/d2 < 0.8 \qquad (2)$$

where dAB: is the lens separation on the axis of said negative lens component L2A from said positive cemented lens component L2B; and d2: is the thickness on the axis from the surface at the object end of said second lens group G2 to the image end.

4. A zoom lens system as defined in claim 3 which fulfills the following condition:

$$n2p-n2n \leq 0 \qquad (3)$$

where n2p: is the refractive index on the d line of said positive lens of said positive cemented lens component L2B and n2n: is the refractive index on the d line of said negative lens of said positive cemented lens component L2B.

5. A zoom lens system as defined in claim 4 which fulfills the following condition:

$$0.3 < f_3/f_T < 1 \qquad (4)$$

where f3: is the focal length of said third lens group G3 and fT: is the focal length of the overall system at the telephoto end.

6. A zoom lens system as defined in claim 5 which comprises at least one positive cemented lens Lc which is cemented with a positive lens and a negative lens and fulfills the following condition:

$$n3p-n3n < 0 \qquad (5)$$

where n3p: is the refractive index on the d line of said positive lens of said cemented lens Lc and n3n: is the refractive index on the d line of said negative lens of said positive cemented lens Lc.

7. A zoom lens system as defined in claim 1 which fulfills the following condition:

$$0.28 \leq dAB/d2 \leq 0.8 \qquad (2)$$

where dAB: is the lens separation on the axis of said negative lens component L2A from said positive cemented lens component L2B; and d2: is the thickness on the axis from the surface at the object end of said second lens group G2 to the image end.

8. A zoom lens system as defined in claim 1 which fulfills the following condition:

$$n2p-n2n < 0 \qquad (3)$$

where n2p: is the refractive index on the d line of said positive lens of said positive cemented lens component L2B and n2n: is the refractive index on the d line of said negative lens of said positive cemented lens component L2B.

9. A zoom lens system as defined in claim 1 which fulfills the following condition:

$$0.3 < f_3/fT < 1 \qquad (4)$$

where f3: is the focal length of said third lens group G3 and fT: is the focal length of the overall system at the telephoto end.

10. A zoom lens system facing an object end and an image end on opposite ends thereof with said zoom lens system comprising, in order from said object end:

a first lens group G1 having a positive refractive power and a second lens group G2 having a negative refractive power wherein the lens separation of said first lens group G1 from said second lens group G2 is changed for magnification;

with said second lens group G2 comprising in order from the object end;

a negative lens component L2A at least one of whose surfaces is aspherical;

a cemented positive lens component L2B which is cemented with a positive lens having a convex surface facing toward the object end and a negative lens; and a negative lens component L2C having a concave surface facing toward the object end.

11. A zoom lens system as defined in claim 10 which fulfills the following condition:

$$(Rar+Raf)/(Rar-Raf) \leq -1 \qquad (1)$$

where

Raf: is the paraxial curvature radius of the surface at the object end of said lens component L2A;

Rar: is the paraxial curvature radius of the surface at the image end of said negative lens component.

12. A zoom lens system as defined in claim 11 which fulfills the following condition:

$$0.28 \leq dAB/d2 \leq 0.8 \qquad (2)$$

where dAB: is the lens separation on the axis of said negative lens component L2A from said positive cemented lens component L2B; and d2: is the thickness on the axis from the surface at the object end of said second lens group G2 to the image end.

13. A zoom lens system as defined in claim 12 which fulfills the following condition:

$$nbp-nbn < 0 \qquad (3)$$

where
- nbp: is the refractive index on the d line of said positive lens of said positive cemented lens component L2B and
- nbn: is the refractive index on the d line of said negative lens of said positive cemented lens component L2B.

14. A zoom lens system as defined in claim 13 which fulfills the following condition:

$$-0.8 < f_2/fT < -0.1 \quad (4)$$

where
- f2: is the focal length of said second lens group G2 and
- fT: is the focal length of the overall system at the telephoto end.

15. A zoom lens system as defined in claim 10 which fulfills the following condition:

$$0.28 \leq dAB/d2 \leq 0.8 \quad (2)$$

where
- dAB: is the lens separation on the axis of said negative lens component L2A from said positive cemented lens component L2B; and
- d2: is the thickness on the axis from the surface at the object end of said second lens group G2 to the image end.

16. A zoom lens system as defined in claim 15 which fulfills the following condition:

$$nbp - nbn < 0 \quad (3)$$

where
- nbp: is the refractive index on the d line of said positive lens of said positive cemented lens component L2B and
- nbn: is the refractive index on the d line of said negative lens of said positive cemented lens component L2B.

17. A zoom lens system as defined in claim 10 which fulfills the following condition:

$$nbp - nbn < 0 \quad (3)$$

where
- nbp: is the refractive index on the d line of said positive lens of said positive cemented lens component L2B and
- nbn: is the refractive index on the d line of said negative lens of said positive cemented lens component L2B.

18. A zoom lens system as set forth in claim 17 which fulfills the following condition:

$$-0.8 < f_2/fT < -0.1 \quad (4)$$

where
- f2: is the focal length of said second lens group G2 and
- fT: is the focal length of the overall system at the telephoto end.

19. A zoom lens system as set forth in claim 10 which fulfills the following condition:

$$-0.8 < f_2/f_T < -0.1 \quad (4)$$

where
- $f_2$: is the focal length of said second lens group G2 and
- fT: is the focal length of the overall system at the telephoto end.

20. A zoom lens system as defined in claim 19 which fulfills the following condition:

$$0.8 < fa/f2 < 4 \quad (5)$$

where
- fa: is the focal length of said negative lens component L2A and
- f2: is the focal length of said second lens group G2.

21. A zoom lens system as defined in claim 20 which fulfills the following condition:

$$-20 < fb/f2 < -0.5 \quad (6)$$

where
- fb: is the focal length of said positive lens of said positive cemented lens component L2B and
- f2: is the focal length of said second lens group G2.

22. A zoom lens system as defined in claim 10 which fulfills the following condition:

$$0.8 < fa/f2 < 4 \quad (5)$$

where
- fa: is the focal length of said negative lens component L2A and
- f2: is the focal length of said second lens group G2.

23. A zoom lens system as defined in claim 22 which fulfills the following condition:

$$-20 < fb/f2 < -0.5 \quad (6)$$

where
- fb: is the focal length of said positive lens of said positive cemented lens component L2B and
- f2: is the focal length of said second lens group G2.

24. A zoom lens system as defined in claim 10 wherein said negative lens component L2A has an aspherical surface which fulfills the following mathematical equation:

$$S(y) = (y^2/R)/\{1+(1-Ka \cdot y^2/R^2)^{1/2}\} + C_2 \cdot y^2 + C_4 \cdot y^4 + C_6 \cdot y^6 + C_8 \cdot y^8 + C_{10} \cdot y^{10}$$

where
- y: is the height in the direction perpendicular to the optical axis;
- S(y): is the displacement amount along the optical axial direction at the height y (the sag amount: the distance along the optical axis between the tangent planes at the peaks of each of the aspherical surfaces);
- R: is the reference curvature radius;
- Ka: is the conic constant which fulfills the following condition:

$$Ka < 1.0; \quad (7)$$

and
- $C_n$: is the n-order aspherical surface constant.

25. A zoom lens system as defined in claim 24 wherein the surface at the image end of said negative lens component L2A is formed aspherically.

26. A zoom lens system as defined in claim 25 wherein at least one of the two surfaces of said negative lens component L2C is formed aspherically and fulfills the following mathematical equation:

$$S(y) = (y^2/R)/\{1+(1-KC \cdot y^2/R^2)^{1/2}\} + C_2 \cdot y^2 + C_4 \cdot y^4 + C_6 \cdot y^6 + C_8 \cdot y^8 + C_{10} \cdot y^{10}$$

where
- y: is the height in the direction perpendicular to the optical axis;

S(y): is the displacement amount along the optical axial direction at the height y (the sag amount: the distance along the optical axis between the tangent planes at the peaks of each of the aspherical surfaces);
R: is the reference curvature radius;
KC: is the conic constant which fulfills the following condition:

$$KC<1.0; \tag{8}$$

and
$C_n$: is the n-order aspherical surface constant.

27. A zoom lens system as defined in claim 10 wherein the surface at the image end of said negative lens component L2A is formed aspherically.

28. A zoom lens system as defined 10 which fulfills the following condition:

$$1 \leq (Rcr+Rcf)/(Rcr-Rcf) \tag{9}$$

where
Rcf: is the paraxial curvature radius of the surface facing toward the object end of said negative lens component L2C and
Rcr: is the paraxial curvature radius of the surface facing toward the image end of said negative lens component L2C.

29. A zoom lens system as defined in claim 28 which fulfills the following condition:

$$0.28 \leq dAB/d2 \leq 0.8 \tag{2}$$

where
dAB: is the lens separation on the axis of said negative lens component L2A from said positive cemented lens component L2B; and
d2: is the thickness on the axis from the surface at the object end of said second lens group G2 to the image end.

30. A zoom lens system as defined in claim 10 wherein said negative lens component L2C comprises: in order from the object end,
a negative cemented lens with a negative lens and a positive lens.

31. A zoom lens system as defined in claim 30 which fulfills the following condition:

$$0.28 \leq dAB/d2 \leq 0.8 \tag{2}$$

where
dAB: is the lens separation on the axis of said negative lens component L2A from said positive cemented lens component L2B; and
d2: is the thickness on the axis from the surface at the object end of said second lens group G2 to the image end.

32. A zoom lens system as defined in claim 10 which fulfills the following condition:

$$ncp-ncn<0 \tag{11}$$

where
ncn: is the refractive index on the d line of said negative lens of said negative lens component L2C and
ncp: is the refractive index on the d line of said positive lens of said negative lens component L2C.

33. A zoom lens system as defined in claim 32 which fulfills the following condition:

$$0.28 \leq dAB/d2 \leq 0.8 \tag{2}$$

where
dAB: is the lens separation on the axis of said negative lens component L2A from said positive cemented lens component L2B; and
d2: is the thickness on the axis from the surface at the object end of said second lens group G2 to the image end.

34. The zoom lens system of claim 10, wherein said negative lens component L2A has an aspherical surface which fulfills the following mathematical equation:

$$S(y)=(y^2/R)/\{1+(1-Ka \cdot y^2/R^2)^{1/2}\}+C_2 \cdot y^2+C_4 \cdot y^4+C_6 \cdot y^6+C_8 \cdot y^8+C_{10} \cdot y^{10}$$

and said conic constant $K_a$ fulfills the following condition:

$$Ka<1.0 \tag{7}$$

where
y: is the height in the direction perpendicular to the optical axis;
S(y): is the displacement amount along the optical axial direction at the height y (the sag amount: the distance along the optical axis between the tangent planes at the peaks of each of the aspherical surfaces);
R: is the reference curvature radius;
Ka: is the conic constant; and
$C_n$: is the n-order aspherical surface constant.

35. The zoom lens system of claim 34, wherein the surface at the image end of said negative lens component L2A is formed aspherically.

36. The zoom lens system of claim 35, wherein at least one of the two surfaces of said negative lens component L2C is formed aspherically and fulfills the following mathematical equation:

$$S(y)=(y^2/R)/\{1+(1-KC \cdot y^2/R^2)^{1/2}\}+C_2 \cdot y^2+C_4 \cdot y^4+C_6 \cdot y^6+C_8 \cdot y^8+C_{10} \cdot y^{10}$$

and said conic constant $K_C$ fulfills the following condition:

$$KC<1.0 \tag{8}$$

where
y: is the height in the direction perpendicular to the optical axis;
S(y): is the displacement amount along the optical axial direction at the height y (the sag amount: the distance along the optical axis between the tangent planes at the peaks of each of the aspherical surfaces);
R: is the reference curvature radius;
KC: is the conic constant; and
$C_n$: is the n-order aspherical surface constant.

37. The zoom lens system of claim 36, which fulfills the following condition:

$$1 \leq (Rcr+Rcf)/(Rcr-Rcf) \tag{9}$$

where
Rcf: is the paraxial curvature radius of the surface facing toward the object end of said negative lens component L2C and
Rcr: is the paraxial curvature radius of the surface facing toward the image end of said negative lens component L2C.

38. The zoom lens system of claim 37, which fulfills the following condition:

$$0.03 \leq dBC/d2 \leq 0.3 \quad (10)$$

where
- dBC: is the lens separation on the axis of said positive cemented lens component L2B from said negative lens component L2C;
- d2: is the total thickness on the axis from the surface at the object end to the surface at the image end of said second lens group G2.

39. The zoom lens system of claim 38, wherein said negative lens component L2C comprises: in order from the object end, a negative cemented lens cemented with a negative lens and a positive lens.

40. The zoom lens system of claim 10, wherein at least one of the two surfaces of said negative lens component L2C is formed aspherically and fulfills the following mathematical equation:

$$S(y)=(y^2/R)/\{1+(1-KC \cdot y^2/R^2)^{1/2}\}+C_2 \cdot y^2+C_4 \cdot y^4+C_6 \cdot y^6+C_8 \cdot y^8+C_{10} \cdot y^{10}$$

and said conic constant $K_C$ fulfills the following condition:

$$KC<1.0 \quad (8)$$

where
- y: is the height in the direction perpendicular to the optical axis;
- S(y): is the displacement amount along the optical axial direction at the height y (the sag amount: the distance along the optical axis between the tangent planes at the peaks of each of the aspherical surfaces);
- R: is the reference curvature radius;
- KC: is the conic constant; and
- $C_n$: is the n-order aspherical surface constant.

41. The zoom lens system of claim 40, which fulfills the following condition:

$$1 \leq (Rcr+Rcf)/(Rcr-Rcf) \quad (9)$$

where
- Rcf: is the paraxial curvature radius of the surface facing toward the object end of said negative lens component L2C and
- Rcr: is the paraxial curvature radius of the surface facing toward the image end of said negative lens component L2C.

42. The zoom lens system of claim 41, which fulfills the following condition:

$$0.03 \leq dBC/d2 \leq 0.3 \quad (10)$$

where
- dBC: is the lens separation on the axis of said positive cemented lens component L2B from said negative lens component L2C;
- d2: is the total thickness on the axis from the surface at the object end to the surface at the image end of said second lens group G2.

43. The zoom lens system of claim 42, wherein said negative lens component L2C comprises: in order from the object end, a negative cemented lens cemented with a negative lens and a positive lens.

44. The zoom lens system of claim 10, which fulfills the following condition:

$$1 \leq (Rcr+Rcf)/(Rcr-Rcf) \quad (9)$$

where
- Rcf: is the paraxial curvature radius of the surface facing toward the object end of said negative lens component L2C and
- Rcr: is the paraxial curvature radius of the surface facing toward the image end of said negative lens component L2C.

45. The zoom lens system of claim 44, which fulfills the following condition:

$$0.03 \leq dBC/d2 \leq 0.3 \quad (10)$$

where
- dBC: is the lens separation on the axis of said positive cemented lens component L2B from said negative lens component L2C;
- d2: is the total thickness on the axis from the surface at the object end to the surface at the image end of said second lens group G2.

46. The zoom lens system of claim 45, wherein said negative lens component L2C comprises: in order from the object end,
a negative cemented lens cemented with a negative lens and a positive lens.

47. The zoom lens system of claim 10, which fulfills the following condition:

$$0.03 \leq dBC/d2 \; 0.3 \quad (10)$$

where
- dBC: is the lens separation on the axis of said positive cemented lens component L2B from said negative lens component L2C;
- d2: is the total thickness on the axis from the surface at the object end to the surface at the image end of said second lens group G2.

48. The zoom lens system of claim 47, wherein said negative lens component L2C comprises: in order from the object end,
a negative cemented lens cemented with a negative lens and a positive lens.

49. A zoom lens system facing an object end and an image end on opposite ends thereof with said zoom lens system comprising, in order from said object end:
a first lens group G1 having a positive refractive power; and
a second lens group G2 having a negative refractive power; wherein the lens separation of said first lens group G1 from said second lens group G2 is changed for magnification;
said second lens group G2 comprises: in order from the object end,
a negative lens component L2A at least one of whose surfaces is aspherical;
a positive lens component L2B having of a positive lens with a convex surface facing toward the object end; and
a negative lens component L2C having a concave surface facing toward the object end and at least one aspherical surface; wherein
said aspherical surface has a shape which gives the lens a smaller negative refractive power or larger positive refractive power from the center to the periphery of said aspherical surface.

50. A zoom lens system as defined in claim 49, in which at least one of said aspherical surfaces included in said negative lens component L2C in said second lens group G2 and which fulfills the following condition:

$$0<|ASc-Sc|/fw \leq 0.1 \qquad (1)$$

where
  ASc−Sc: is the deviation of said aspherical surface in the optical axial direction around the periphery of its effective diameter from a reference spherical surface having a predetermined peak curvature radius;
  fw: is the focal length of the overall zoom lens system at the wide angle end.

51. A zoom lens system as defined in claim 50, in which at least one of said aspherical surfaces included in said negative lens of said negative lens component L2A in said second lens group G2 has a smaller negative refractive power or larger positive refractive power from the center to the periphery of said aspherical surface.

52. A zoom lens system as defined in claim 51, in which at least one of said aspherical surfaces included in said negative lens component L2A in said second lens group G2 and which fulfills the following condition:

$$0<|ASa-Sa|/fw \leq 0.15 \qquad (2)$$

where
  ASa−Sa: is the deviation of said aspherical surface in the optical axis around the periphery of its effective diameter from a reference spherical surface having a predetermined peak curvature radius;
  fw: is the focal length of the overall zoom lens system at the wide angle end.

53. A zoom lens system as defined in claim 52, in which said positive lens component L2B having a positive refractive power comprises at least a positive cemented lens with positive lens L2Bp and negative lens L2Bn and wherein the following condition is fulfilled:

$$nbp<nbn \qquad (3)$$

where
  nbp: is the refractive index on the d line of said positive lens L2Bp of said positive cemented lens component L2B and
  nbn: is the refractive index on the d line of said negative lens L2Bn of said positive cemented lens component L2B.

54. A zoom lens system as defined in claim 49, in which at least one of said aspherical surfaces included in said negative lens of said negative lens component L2A in said second lens group G2 has a smaller negative refractive power or larger positive refractive power from the center to the periphery of said aspherical surface.

55. A zoom lens system as defined in claim 54, in which at least one of said aspherical surfaces included in said negative lens component L2A in said second lens group G2 and fulfills the following condition:

$$0<|ASa-Sa|/fw \leq 0.15 \qquad (2)$$

where
  ASa−Sa: is the deviation of said aspherical surface in the optical axis around the periphery of its effective diameter from a reference spherical surface having a predetermined peak curvature radius;
  fw: is the focal length of the overall zoom lens system at the wide angle end.

56. A zoom lens system as defined in claim 55, in which said positive lens component L2B having a positive refractive power comprises at least a positive cemented lens with positive lens L2Bp and negative lens L2Bn and wherein the following condition is fulfilled:

$$nbp<nbn \qquad (3)$$

where
  nbp: is the refractive index on the d line of said positive lens L2Bp of said positive cemented lens component L2B and
  nbn: is the refractive index on the d line of said negative lens L2Bn of said positive cemented lens component L2B.

57. A zoom lens system as defined in claim 54, in which at least one of said aspherical surfaces included in said negative lens component L2A in said second lens group G2 fulfills the following condition:

$$0<|ASa-Sa|/fw \leq 0.15 \qquad (2)$$

where
  ASa−Sa: is the deviation of said aspherical surface in the optical axis around the periphery of its effective diameter from a reference spherical surface having a predetermined peak curvature radius;
  fw: is the focal length of the overall zoom lens system at the wide angle end.

58. A zoom lens system as defined in claim 57, in which the following condition is fulfilled:

$$0.2<X2/fw<2 \qquad (4)$$

where
  X2: is the positive deviation of said second lens group G2, which moves from the wide-angle end to the telephoto end in the direction toward the object end for magnification; and
  fw: is the focal length of the overall system at the wide-angle end.

59. A zoom lens system as defined in claim 57, in which said positive lens component L2B having a positive refractive power comprises at least a positive cemented lens with positive lens L2Bp and negative lens L2Bn wherein the following condition is fulfilled:

$$nbp<nbn \qquad (3)$$

where
  nbp: is the refractive index on the d line of said positive lens L2Bp of said positive cemented lens component L2B; and
  nbn: is the refractive index on the d line of said negative lens L2Bn of said positive cemented lens component L2B.

60. A zoom lens system as defined in claim 59, in which the following condition is fulfilled:

$$0.2<X2/fw<2 \qquad (4)$$

where
  X2: is the positive deviation of said second lens group G2, which moves from the wide-angle end to the telephoto end in the direction toward the object end for magnification; and fw: is the focal length of the overall system at the wide-angle end.

61. A zoom lens system as defined in claim 59, in which the following condition is fulfilled:

$$0.2 < X2/fw < 2 \qquad (4)$$

where
- X2: is the positive deviation of said second lens group G2, which moves from the wide-angle end to the telephoto end in the direction toward the object end for magnification; and
- fw: is the focal length of the overall system at the wide-angle end.

62. A zoom lens system as defined in claim 61, in which said negative lens component L2C having a negative refractive power comprises at least a negative cemented lens with of negative lens L2Cn and positive lens L2Cp wherein the following condition is fulfilled:

$$nCp < nCn \qquad (9)$$

where
- nCp: is the refractive index on the d line of said positive lens L2Cp of said positive cemented lens component L2C; and
- nCn: is the refractive index on the d line of said negative lens L2Cn of said positive cemented lens component L2C.

63. A zoom lens system as defined in claim 61, in which the following condition is fulfilled:

$$-1.2 < f2/fw < -0.4 \qquad (5)$$

where
- f2: is the overall focal length of said second lens group G2; and
- fw: is the overall focal length of said zoom lens system at the wide-angle end.

64. A zoom lens system as defined in claim 63, in which the following condition is fulfilled:

$$0.8 < f2a/f2 < 2.5 \qquad (6)$$

where
- f2a: is the focal length of said negative lens component L2A; and
- f2: is the overall focal length of said second lens group G2.

65. A zoom lens system as defined in claim 64, in which the following condition is fulfilled:

$$1 < f2c/f2 < 5 \qquad (7)$$

where
- f2c: is the focal length of said negative lens component L2C; and
- f2: is the overall focal length of said second lens group G2.

66. A zoom lens system as defined in claim 63, in which the following condition is fulfilled:

$$0.8 < f2a/f2 < 2.5 \qquad (6)$$

where
- f2a: is the focal length of said negative lens component L2A; and
- f2: is the overall focal length of said second lens group G2.

67. A zoom lens system as defined in claim 66, in which the following condition is fulfilled:

$$1 < f2c/f2 < 5 \qquad (7)$$

where
- f2c: is the focal length of said negative lens component L2C; and
- f2: is the overall focal length of said second lens group G2.

68. A zoom lens system as defined in claim 67, in which the following condition is fulfilled:

$$-8 < f2b/f2 < -1.5 \qquad (8)$$

where
- f2b: is the focal length of said positive lens component L2B; and
- f2: is the overall focal length of said second lens group G2.

69. A zoom lens system as defined in claim 66, in which said negative lens component L2C having a negative refractive power cemented at least a negative composite lens with negative lens L2Cn and positive lens L2Cp wherein the following condition is fulfilled:

$$nCp < nCn \qquad (9)$$

where
- nCp: is the index of refraction on the d line of said positive lens L2Cp of said positive cemented lens component L2C; and
- nCn: is the index of refraction on the d line of said negative lens L2Cn of said positive cemented lens component L2C.

* * * * *